(12) United States Patent
Van der Blom

(10) Patent No.: US 6,978,711 B1
(45) Date of Patent: Dec. 27, 2005

(54) COMBINATION OF A CHAMBER AND A PISTON, A PUMP, A MOTOR, A SHOCK ABSORBER AND A TRANSDUCER INCORPORATING THE COMBINATION

(76) Inventor: Nicolaas Van der Blom, Gærdet 12, 3460 Birkerød (DK)

( * ) Notice: Subject to any disclaimer, the term of this patent is extended or adjusted under 35 U.S.C. 154(b) by 0 days.

(21) Appl. No.: 10/030,242

(22) PCT Filed: Apr. 25, 2000

(86) PCT No.: PCT/DK00/00207

§ 371 (c)(1),
(2), (4) Date: Oct. 22, 2001

(87) PCT Pub. No.: WO00/70227

PCT Pub. Date: Nov. 23, 2000

(51) Int. Cl.[7] ............................................. F01B 31/00
(52) U.S. Cl. ........................................................ 92/6 R
(58) Field of Search ................... 92/6 R, 6 D; 188/288

(56) References Cited

U.S. PATENT DOCUMENTS

| | | | |
|---|---|---|---|
| 2,710,077 A * | 6/1955 | Fabel et al. | 188/288 |
| 3,229,589 A * | 1/1966 | Langas | 91/416 |
| 3,908,512 A * | 9/1975 | Strubin | 92/6 R |
| 4,901,828 A * | 2/1990 | Schmidt et al. | 188/288 |

FOREIGN PATENT DOCUMENTS

| | | |
|---|---|---|
| GB | 2023715 A | 9/1980 |
| GB | 2070731 A | 9/1981 |

* cited by examiner

Primary Examiner—F.. Daniel Lopez
(74) Attorney, Agent, or Firm—Davidson Berquist Jackson & Gowdey LLP

(57) ABSTRACT

A combination of a piston and a chamber, wherein the chamber defines an elongate chamber having a longitudinal axis, the chamber having, at a first longitudinal position thereof, a first cross-sectional area thereof and, at a second longitudinal position thereof, a second cross-sectional area, the second cross-sectional area being 95% or less of the first cross-sectional area, the change in cross-section of the chamber being at least substantially continuous between the first and second longitudinal positions, the piston being adapted to adapt itself to the cross-section of the chamber when moving from the first to the second longitudinal position of the chamber. The piston may comprise an umbrella-like support structure or a fibre enforced deformable container comprising a foam or a fluid. The combination may be used in a pump, a linear actuator, a motor, or a shock absorber.

3 Claims, 33 Drawing Sheets

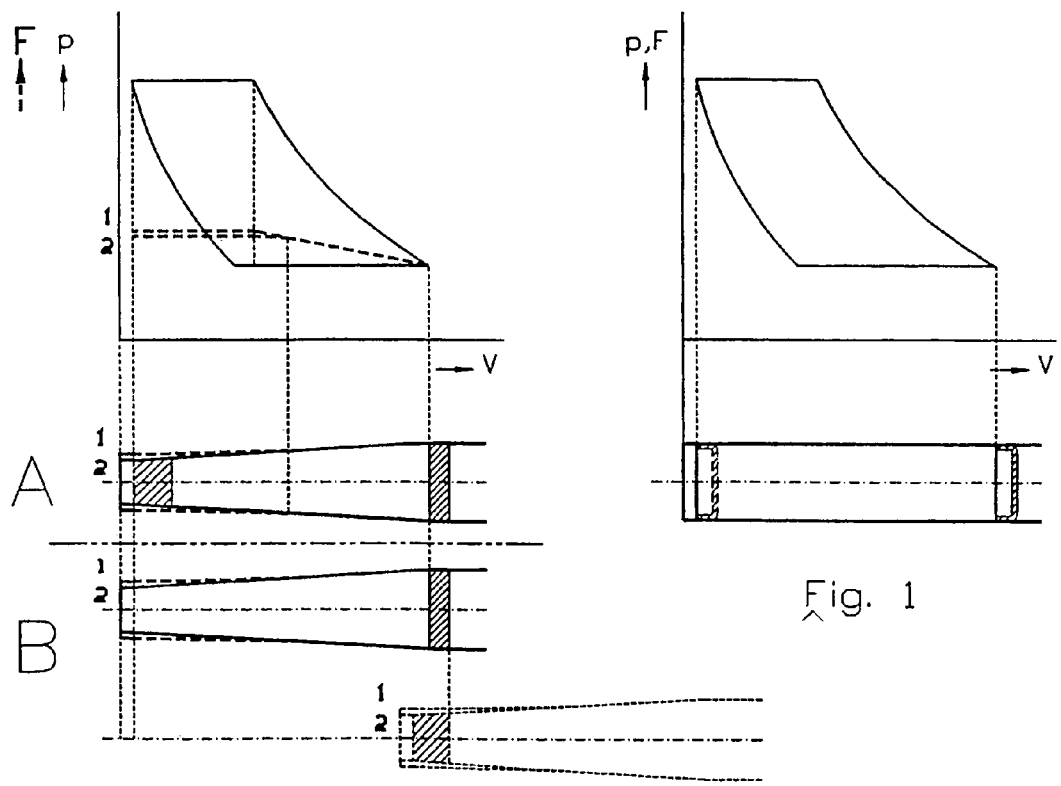
Fig. 2A
Fig. 1
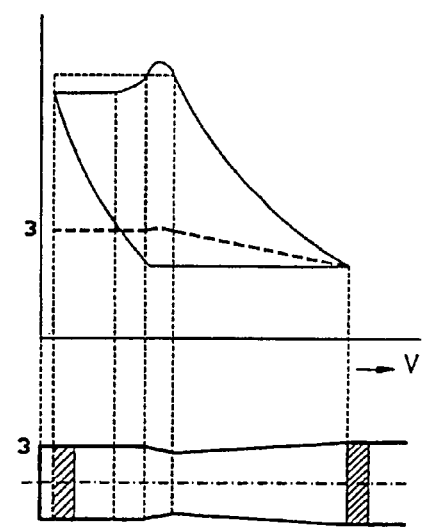
Fig. 2B

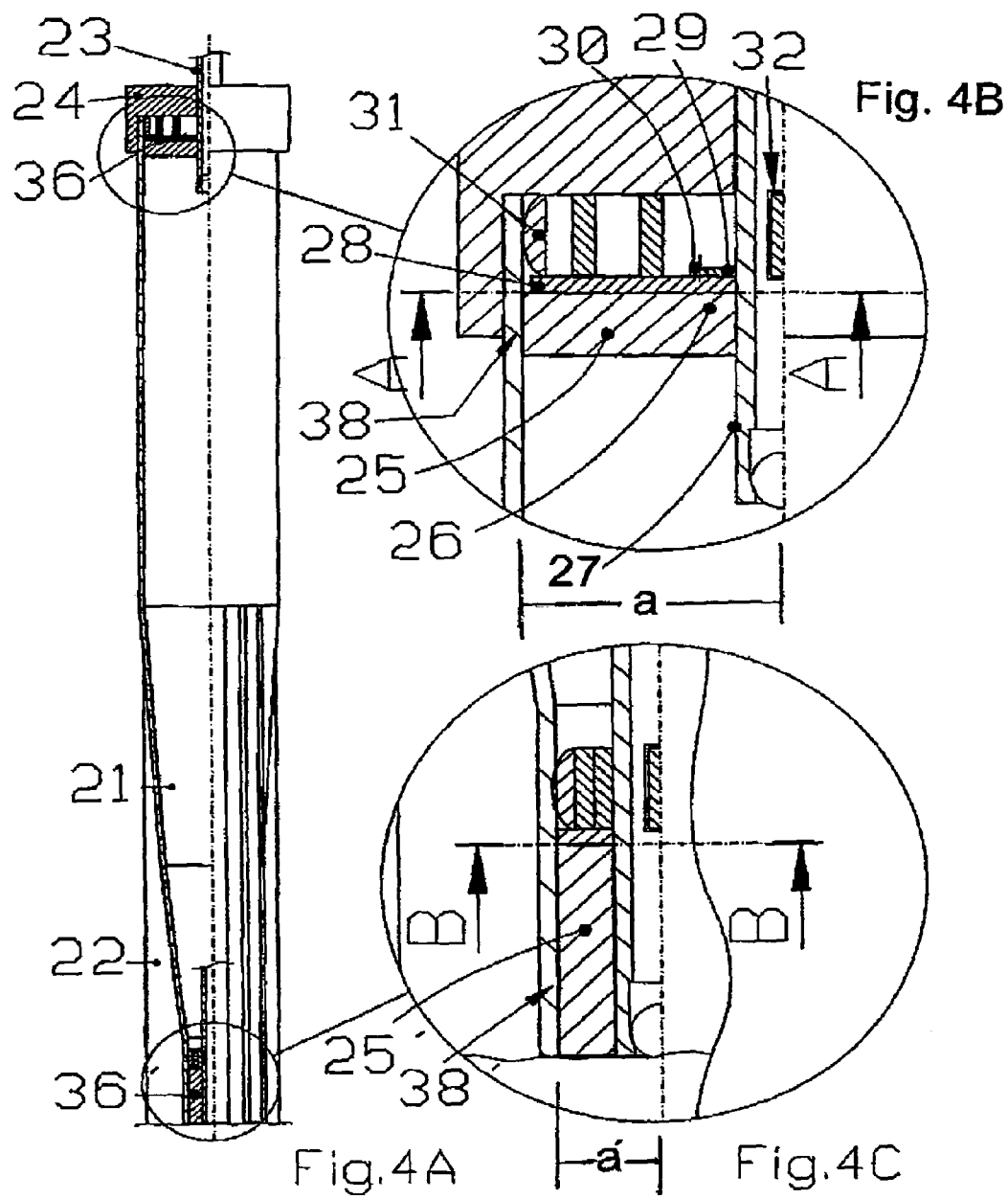

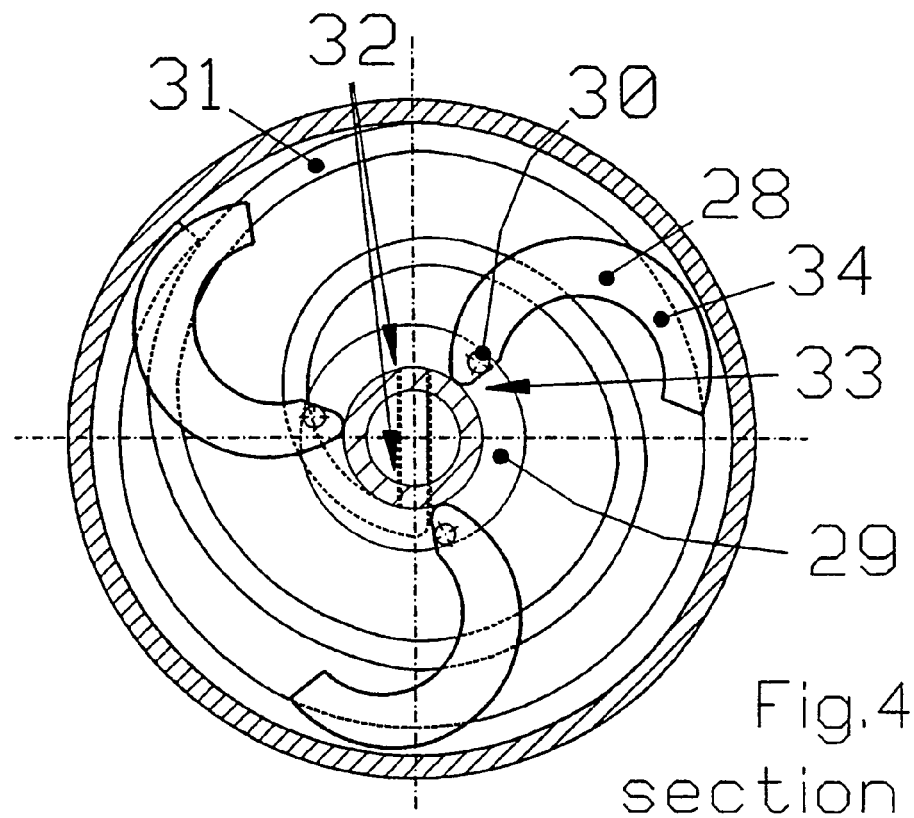
Fig.4D section A-A
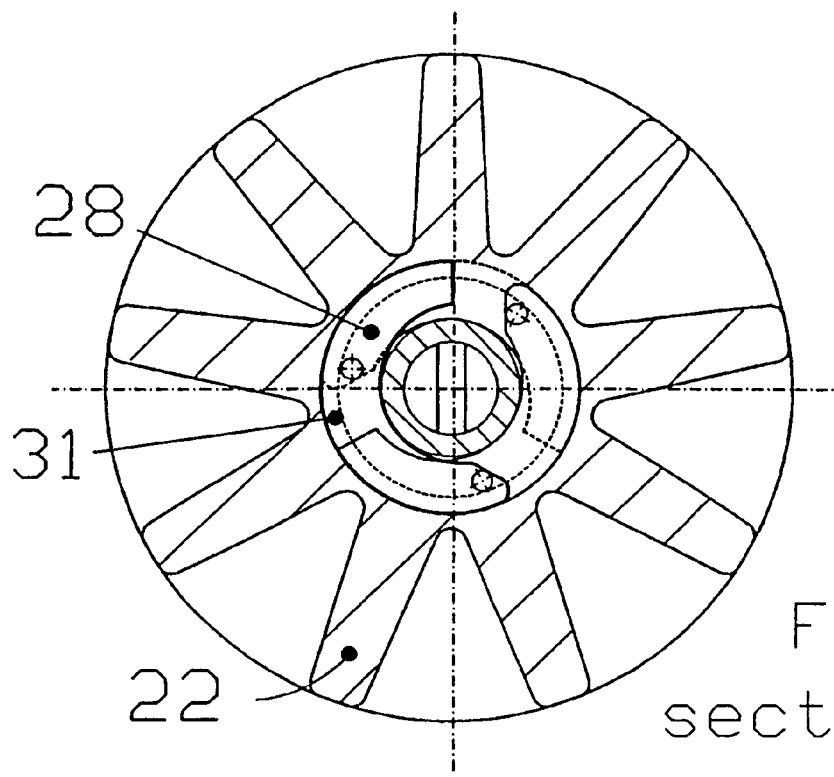
Fig.4E section B-B section A-A

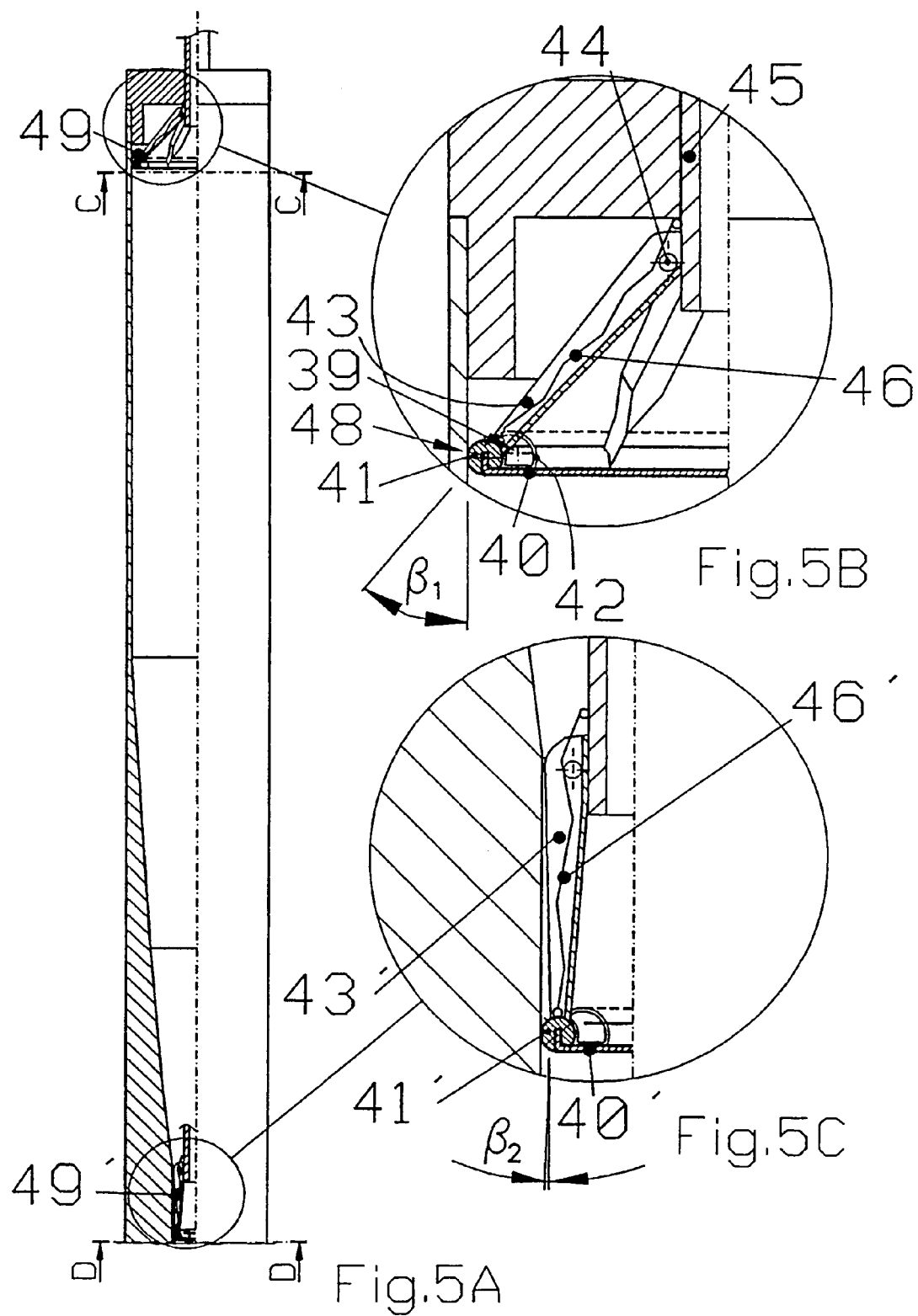

section C-C section D-D

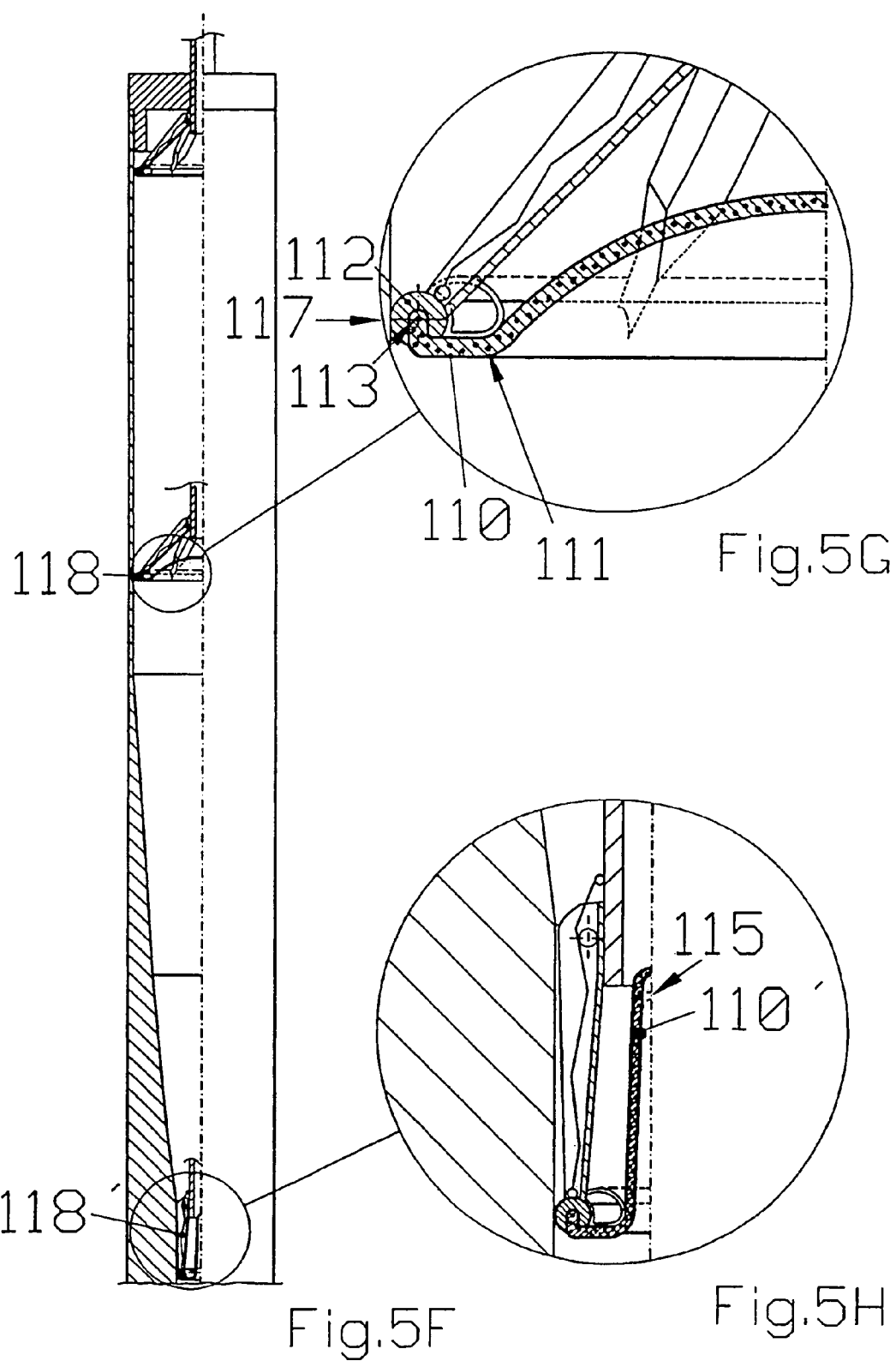

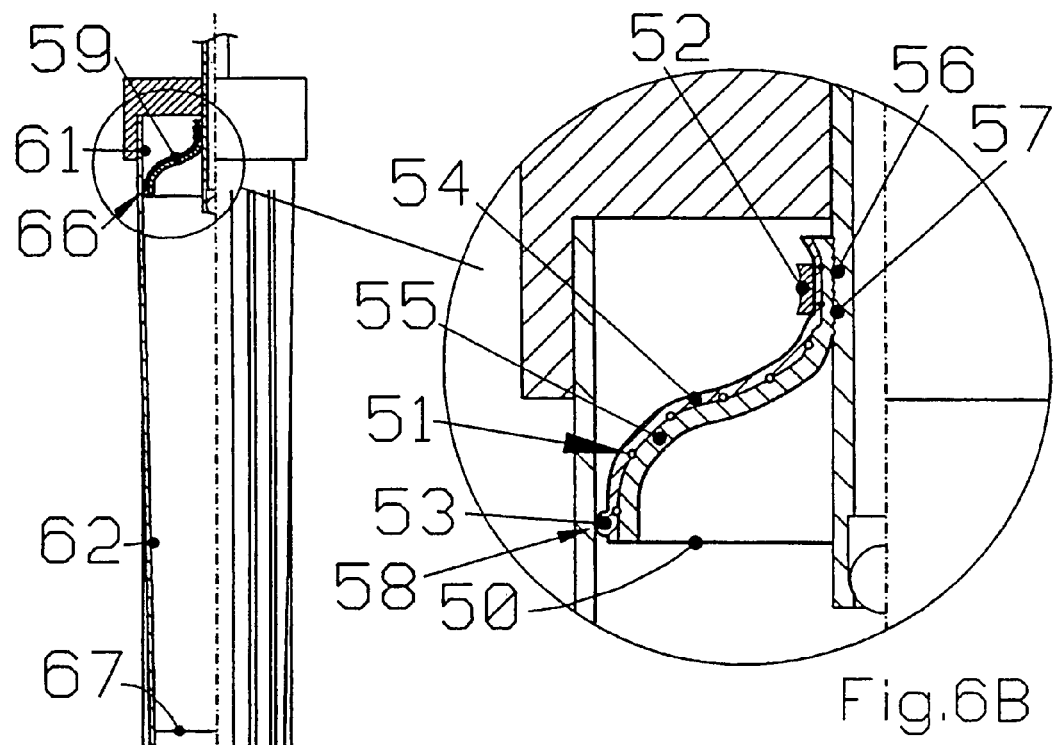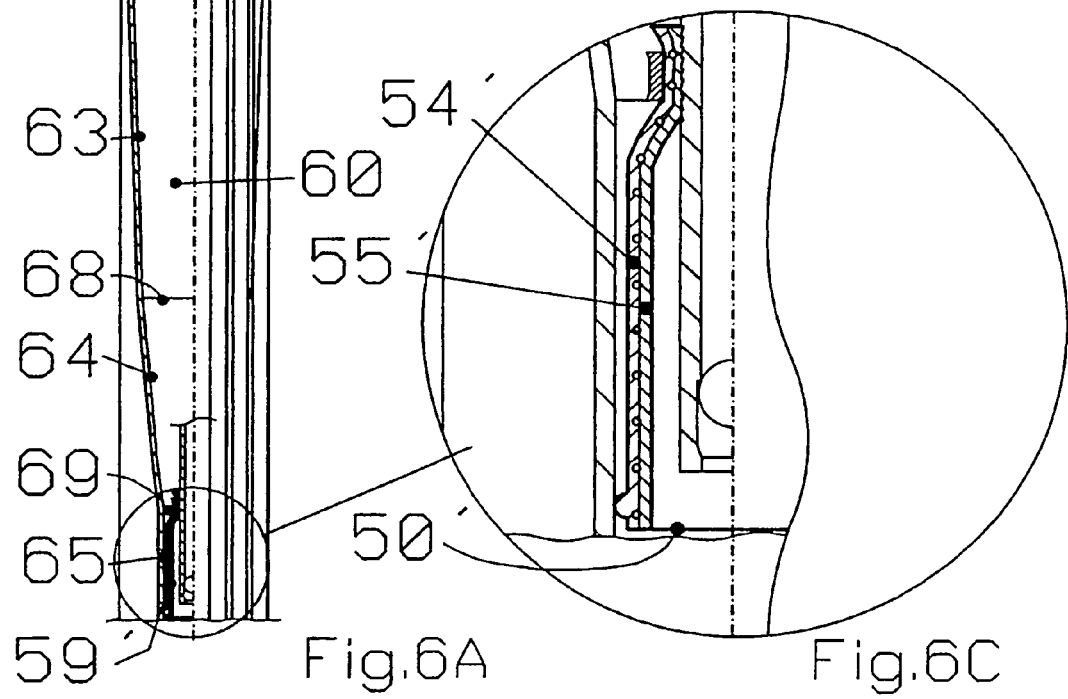

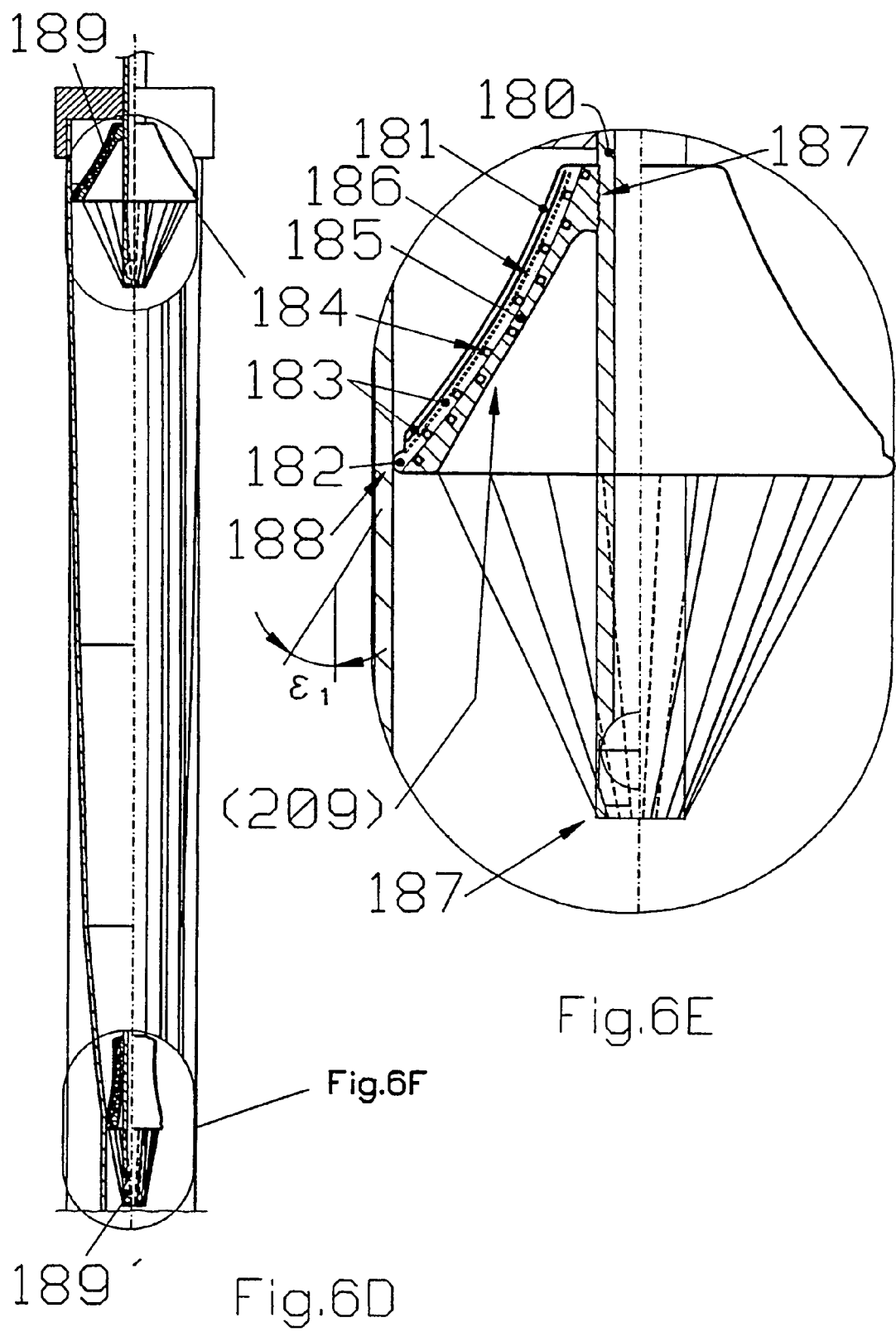

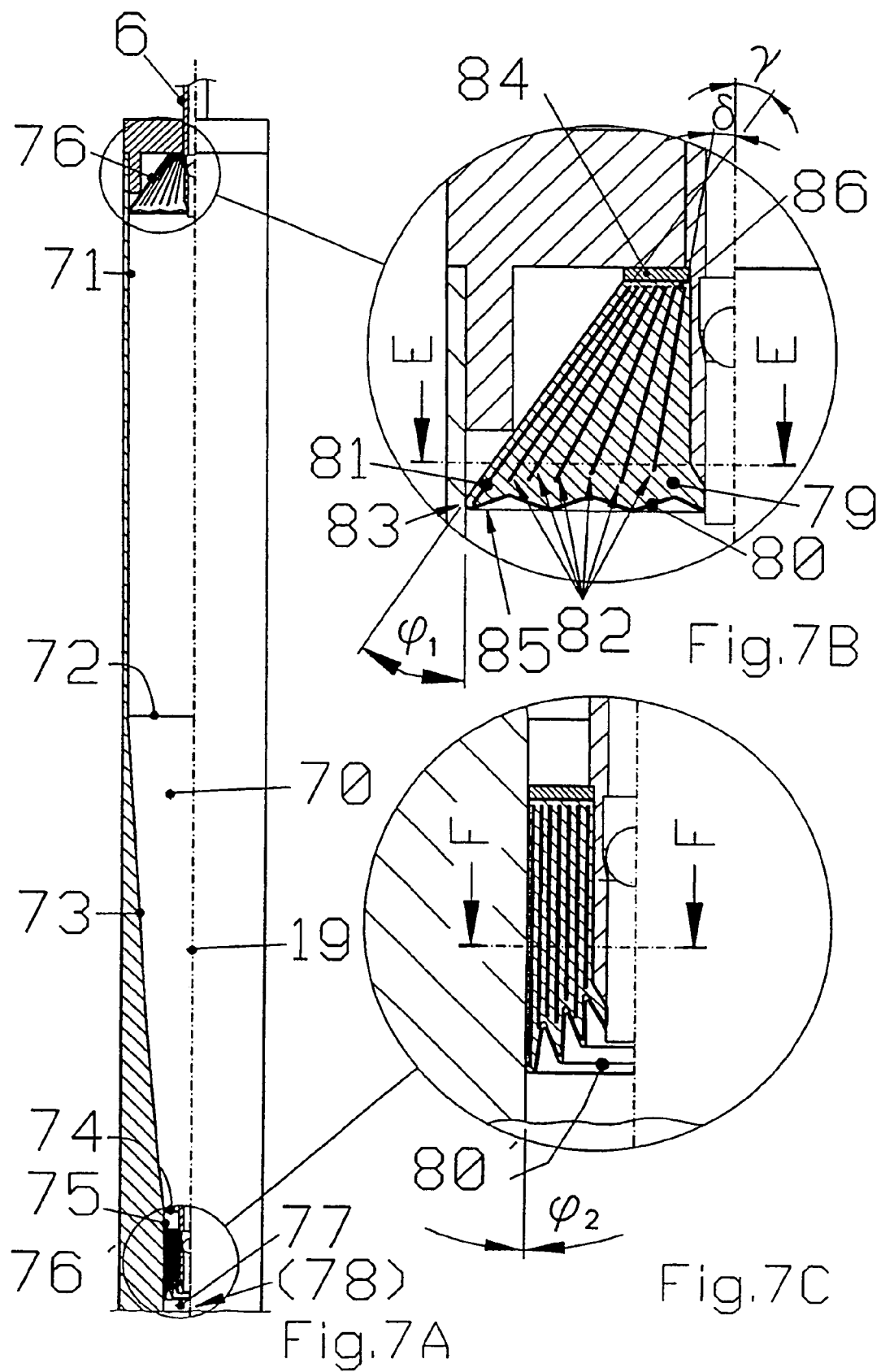

section E-E section F-F

Fig.7H section H-H (G-G)

Fig.7I section I-I (G-G)

section H-H (G-G)

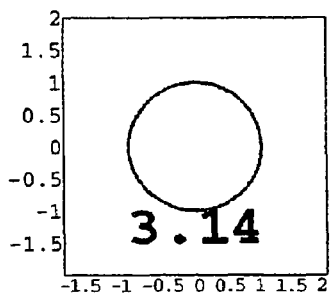
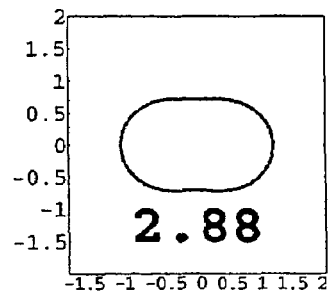
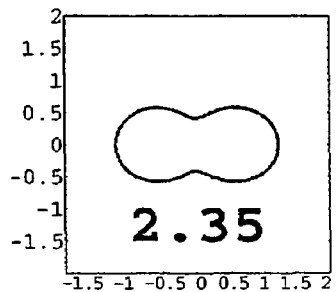
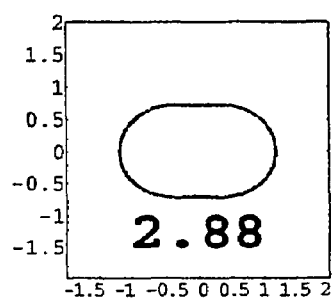
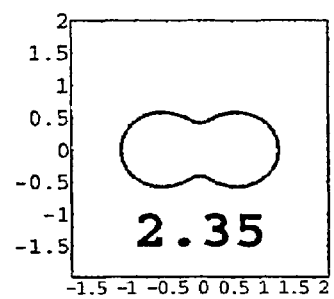
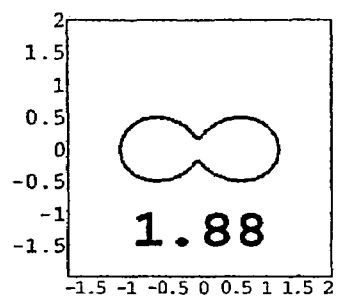
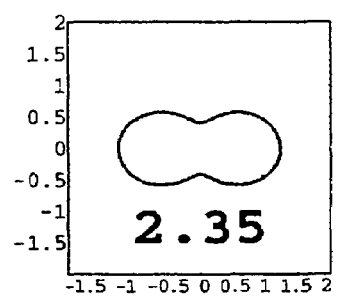
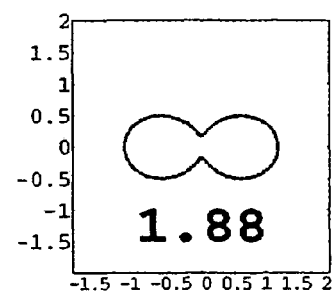
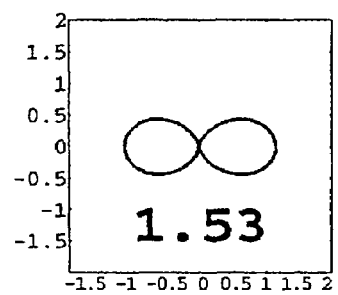
$\frac{c_0}{2} = 1$
$c_1 = 0$
$c_2 = p+q$
$p = 0, 0.25, 0.5$
$q = 0, 0.25, 0.5$
Fig. 7K

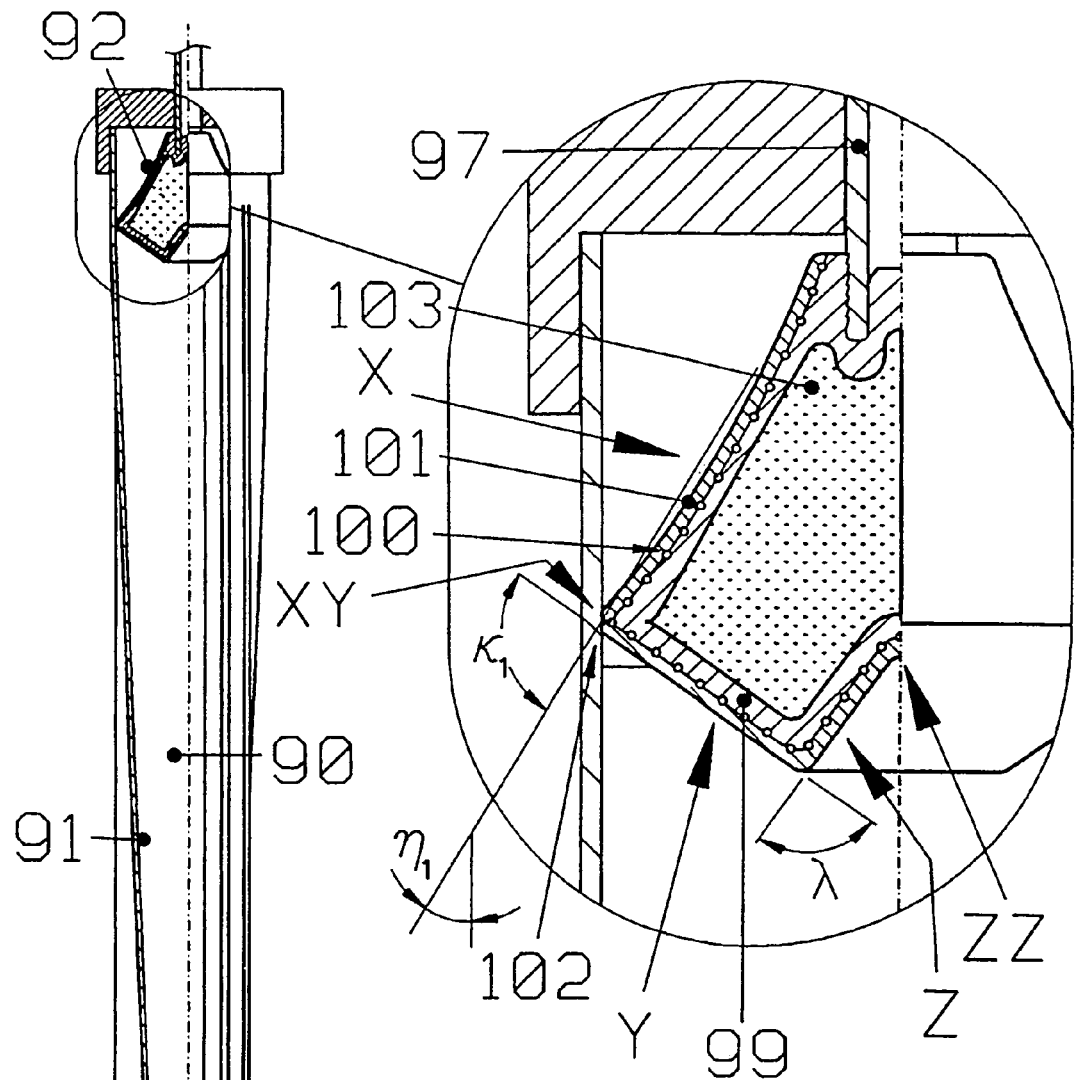
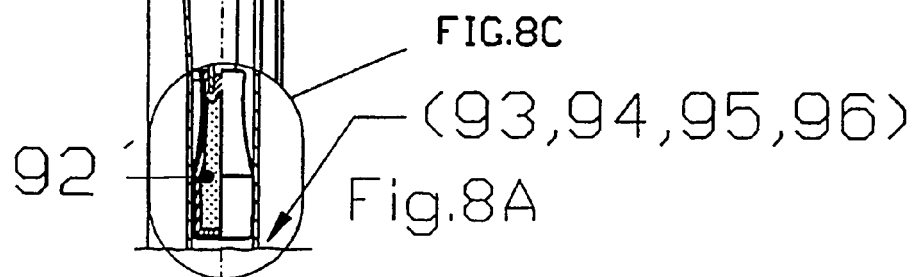
Fig. 8B
Fig. 8C
Fig. 8A

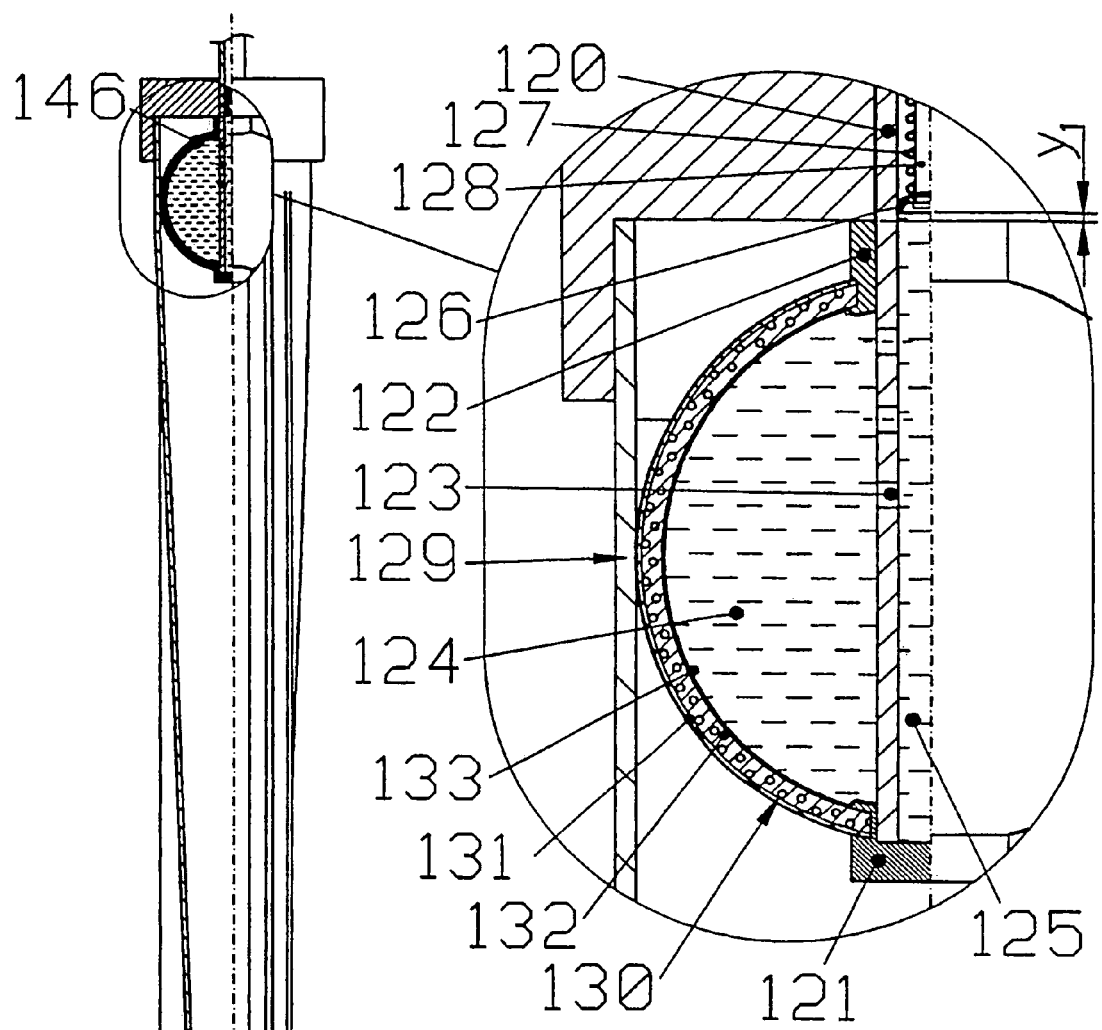
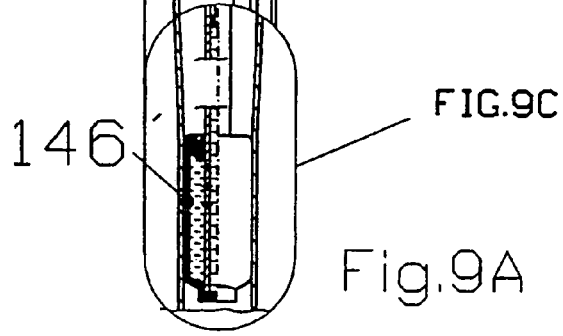
Fig.9B
Fig.9C
Fig.9A

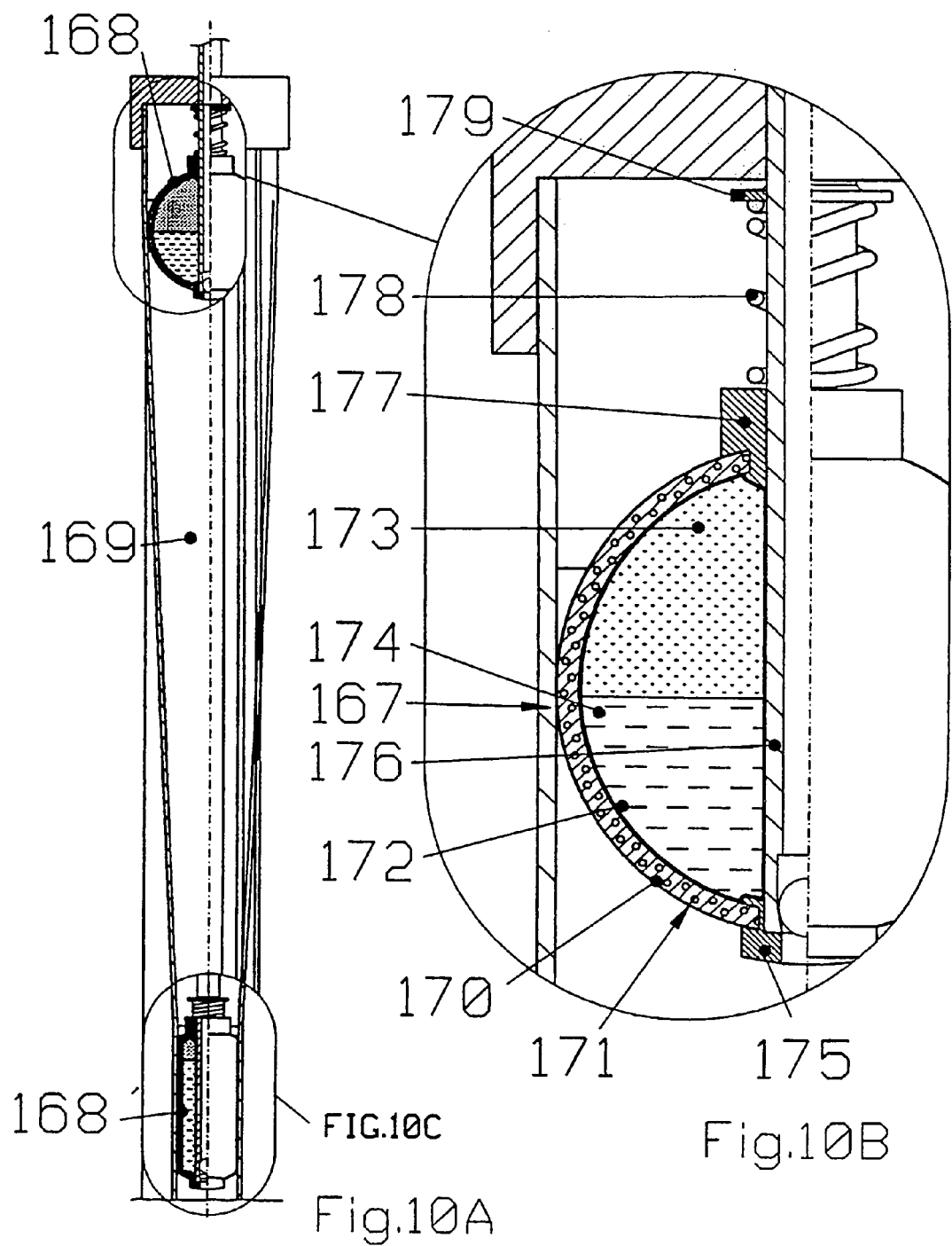

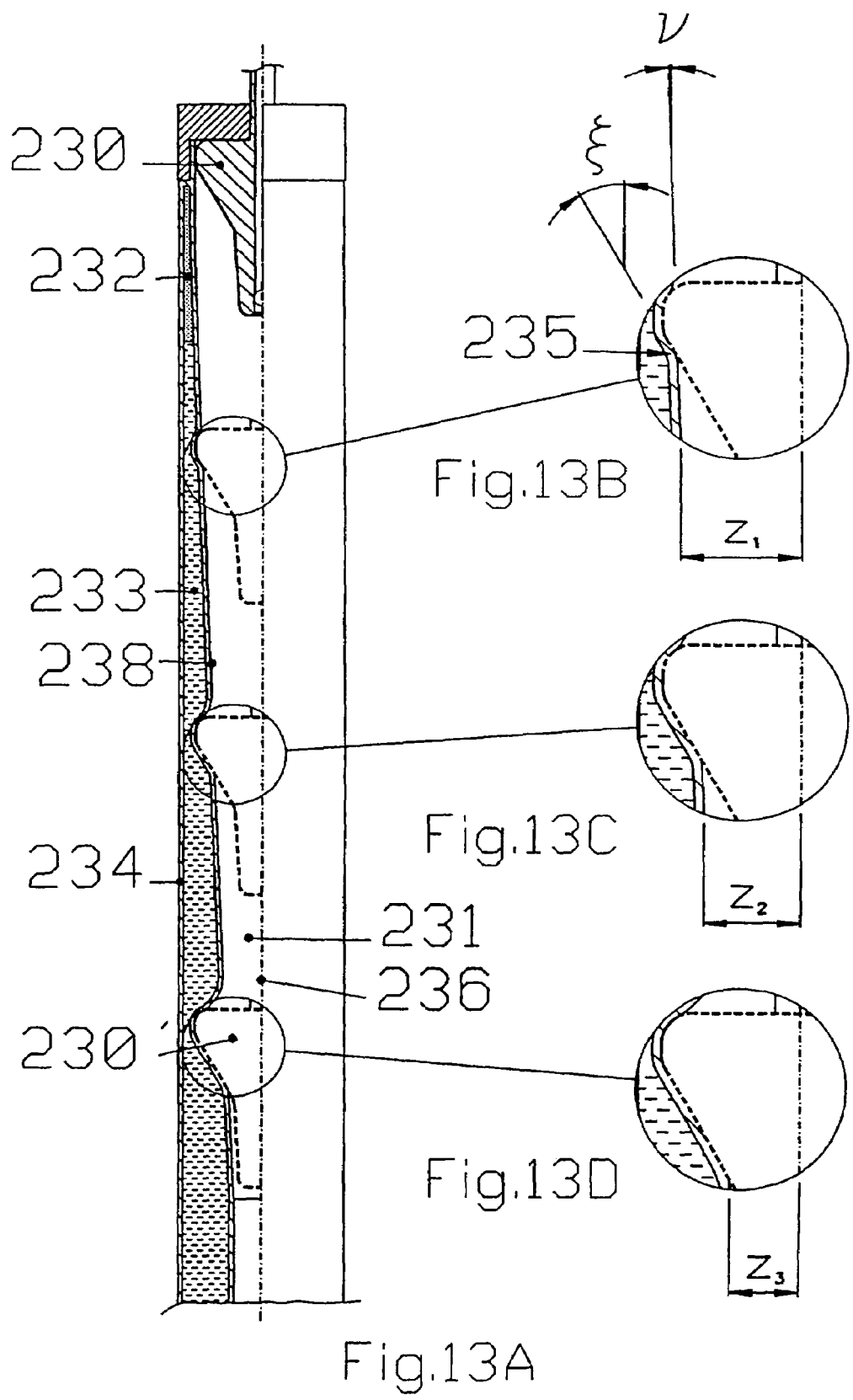

COMBINATION OF A CHAMBER AND A PISTON, A PUMP, A MOTOR, A SHOCK ABSORBER AND A TRANSDUCER INCORPORATING THE COMBINATION

TECHNICAL FIELD

This invention concerns a device comprising a combination of a chamber and a piston positioned in the chamber, said chamber and said piston relatively movable to each other in a predetermined direction of movement between a first and a second position. Such combinations can be used in any device where a combination of a chamber and a piston is needed. Examples of these devices are any kind of piston pumps, specifically manually operated piston pumps, actuators, shock absorbers, motors etc.

BACKGROUND OF THE INVENTION

A problem with existing manually operated piston pumps is that the arms or leg(s) of the user of the pump are loaded directly. The force that needs to be applied to operate the pump increases with every stroke, if the pressure of a gaseous and/or liquid medium inside a closed body, e.g. a tyre, is to be increased. The force remains the same if the medium is a non-compressable liquid, as e.g. water in water pumps. This gives the user a wrong feeling. In the design process the magnitude of these forces is often decided as a compromise between the expected weight and the initiating power of the arms or leg(s) of the user and the time it takes to pump the body. The diameter of the piston defines the level of force to be applied to operate the pump. The pumping time is also defined by the length of the cylinder of the pump. This limits the use of the pump to persons of a certain height. Bicycle and car pumps are clear examples. Especially high-pressure pumps are optimized for male users (design starting point: 75 kg weight, 1.75 m length) despite the fact that women and teenagers make up the largest group of racer bike users.

When pressures ranging from 4–13 Bar have to be optained using the same pump, e.g. a high-pressure bike pump, the combination of low pumping time for low-pressure high-volume tyres and low forces for high-pressure low-volume tyres becomes a problem, if the pump is a hand-operated (floor)pump. If a low-pressure tyre with a relatively large volume has to be pumped by a high-pressure pump, it takes longer time than necessary and the user does not feel any reaction forces at all which gives the user a wrong feeling. It is often difficult to get the right tire pressure of a high pressure tire with e.g. a high pressure floor pump, because often only a part of a last pump stroke is required, mostly not at the end of the stroke. Therefore it is difficult to control the movement and stop of the piston because of a too high operating force. New types of bicycles and tyres were introduced at the beginning of the 1980's. These new bicycles are widely used as transportation means. Therefore, universal piston pumps have been observed in the patent literature. These pumps can pump both low-pressure and high-pressure tyres by means of a reasonable amount of force and time. This is accomplished through the simultaneously application of several coaxial/parallel cylinders and pistons that can be switched on and off (e.g. DE 195 18 242 A1, DE 44 39 830 A1, DE 44 34 508 A1, PCT/SE96/00158). These solutions are expensive and sensitive towards malfunctioning due to the fact that key parts are incorporated in the pumps several times.

A bicycle floor pump which has from the outside the form of a pure single truncated cone with a movable piston is known from the early bicycle literature. The aim is apparently to reduce the operating force, as the cone is standing upside down. There exists apparently no prior art of pistons which can move in a chamber with different diameters and which seal properly and tight. This is not surprising because it is not so easy to produce a reliable piston of that kind, specifically not with the state of the art at that time even when only low pressure high volume tires existed. A leakage would not cause a big problem for such a consumer product. For current high pressure pumps or those for professional purposes it is descisive that no leakage exist. The demands towards the piston construction for high pressure levels and/or low and high pressure levels, causing no leakage are different from those which solely have to do with lower pressure levels.

U.S. Pat. No. 5,503,188 concerns an organical constructed pipeline flow stopper with an inflatable impervious bag. This stopper cannot be compared with a moving piston. In a pump can the media to be compressed and/or moved continuously cause a dynamic load on the piston while the wall of the pressurized chamber of the pump can change its cross-section regarding area and/or shape perpendicular to the direction of movement of the piston between one point and another which gives specific sealing problems. These sealing problems are solved by the present invention.

GB 2 023 715A and GB 2 070 731A concern pumps with a cylinder having a slight internal taper due to production technical reasons as the cylinders are being diecast moulded. The taper aims the cylinder be able to be taken out of the mould. The piston has a seal having a feather end respectively two split seal rings displacebly supported by the piston to remain fully effective throughout the whole stroke. A taper of 0.15 mm on a diameter of 50–100 mm cannot be compared with those of the present invention, as the reduction of the area between two transversal cross sections along the longitudibal axis of the chamber is so small (approx. 0.5%) that it has almost no effect on the circumferical length of the transversal cross-sections, or on the operating force of the pump during the stroke, also because the pressure in the pump is very low. The small feather edge respectively split seal rings of the piston can easily tighten the very small above mentioned taper. The pistons shown in the present application cannot be compared with those of this prior art, as the present pistons are primarily designed to overcome changes in the transversal cross-sectional area's of a much bigger magnitude. The tapers illustrated in the present invention are on scale (unless otherwise stated) and not for ease of illustration exaggerated as it is the case in GB 2 070 731A.

THE OBJECT OF THE INVENTION

The object of the invention is to provide a reliable and inexpensive device comprising a combination of a chamber and a piston, to which its design has to comply to specific demands towards the operating force.

These devices can be specifically be piston pumps but also devices like actuators, shock absorbers or motors etc. Manually operated piston pumps will be comfortable to use by the target group without compromising pumping time, while devices which are not manually operated will gain a substantial reduction of investments and operational costs, due to a lower operating force. The invention aims to overcome the above mentioned problems.

SUMMARY OF THE INVENTION

In general, a new design for a combination of a chamber and a piston for e.g. a pump must ensure that the force to be applied to operate the pump during the entire pumping operation is low enough to be felt as being comfortable by the user, that the length of a stroke is suitable, especially for women and teenagers, that the pumping time is not prolonged, and that the pump has a minimum of components reliable and almost free of maintenance time.

In a first aspect, the invention relates to a combination of a piston and a chamber, wherein:
the chamber defines an elongate chamber having a longitudinal axis,
the chamber having, at a first longitudinal position thereof, a first cross-sectional area thereof and, at a second longitudinal position thereof, a second cross-sectional area, the second cross-sectional area being 95% or less of the first cross-sectional area, the change in cross-section of the chamber being at least substantially continuous between the first and second longitudinal positions, the piston being adapted to adapt itself to the cross-section of the chamber when moving from the first to the second longitudinal position of the chamber.

In the present context, the cross-sections are preferably taken perpendicularly to the longitudinal axis.

Also, due to the fact that in order for the piston to be able to seal against the inner wall of the chamber during movement between the first and second longitudinal positions, the variation of the cross-section of the chamber is preferably at least substantially continuous—that is, without abrupt changes in a longitudinal cross section of the inner wall.

In the present context, the cross-sectional area of the chamber is the cross-sectional area of the inner space thereof in the cross-section selected.

Thus, as will become clear in the following, the fact that the area of the inner chamber changes brings about the possibility of actually tailoring the combination to a number of situations.

In a preferred embodiment, the combination is used as a pump, whereby the movement of the piston will compress air and output this through a valve into e.g. a tyre. The area of the piston and the pressure on the other side of the valve will determine the force required in order to provide a flow of air through the valve. Thus, an adaptation of the force required may take place. Also, he volume of air provided will depend on the area of the piston. However, in order to compress the air, the first translation of the piston will be relatively easy (the pressure is relatively low), whereby this may be performed with a large area. Thus, totally, a larger amount of air may be provided at a given pressure during a single stroke of a certain length.

Naturally, the actual reduction of the area may depend on the intended use of the combination as well as the force in question.

Preferably, the second cross-sectional area is 95–15%, such as 95–70% of the first cross-sectional area. In certain situations, the second cross-sectional area is approximately 50% of the first cross-sectional area.

A number of different technologies may be used in order to realise this combination. These technologies are described further in relation to the subsequent aspects of the invention.

One such technology is one wherein the piston comprises:
a plurality of at least substantially stiff support members rotatably fastened to a common member,
elastically deformable means, supported by the supporting members, for sealing against an inner wall of the chamber, the support members being rotatable between 10° and 40° relative to the longitudinal axis.

In that situation, the common member may be attached to a handle for use by an operator, and wherein the support members extend, in the chamber, in a direction relatively away from the handle.

Preferably, the support members are rotatable so as to be at least approximately parallel to the longitudinal axis.

Also, the combination may further comprise means for biasing the support members against an inner wall of the chamber.

Another technology is one wherein the piston comprises an elastically deformable container comprising a deformable material.

In that situation, the deformable material may be a fluid or a mixture of fluids, such as water, steam, and/or gas, or a foam.

Also, in a cross-section through the longitudinal direction, the container may have a first shape at the first longitudinal direction and a second shape at the second longitudinal direction, the first shape being different from the second shape.

Then, at least part of the deformable material may be compressible and wherein the first shape has an area being larger than an area of the second shape.

Alternatively, the deformable material may be at least substantially incompressible.

The piston may comprise an enclosed space communicating with the deformable container, the enclosed space having a variable volume. The volume may be varied by an operator, and it may comprise a spring-biased piston.

Yet another technology is one, wherein the first cross-sectional shape is different from the second cross-sectional shape, the change in cross-sectional shape of the chamber being at least substantially continuous between the first and second longitudinal positions.

In that situation, the first cross-sectional area may be at least 5%, preferably at least 10%, such as at least 20%, preferably at least 30%, such as at least 40%, preferably at least 50%, such as at least 60%, preferably at least 70%, such as at least 80, such as at least 90% larger than the second cross-sectional area.

Also, the first cross-sectional shape may be at least substantially circular and wherein the second cross-sectional shape is elongate, such as oval, having a first dimension being at least 2, such as at least 3, preferably at least 4 times a dimension at an angle to the first dimension.

In addition, the first cross-sectional shape may be at least substantially circular and wherein the second cross-sectional shape comprises two or more at least substantially elongate, such as lobe-shaped, parts.

Also, in the cross-section at the first longitudinal position, a first circumference of the chamber may be 80–120%, such as 85–115%, preferably 90–110, such as 95–105, preferably 98–102% of a second circumference of the chamber in the cross-section at the second longitudinal direction. Preferably, the first and second circumferences are at least substantially identical.

An optional or additional technology is one wherein the piston comprises:
an elastically deformable material being adapted to adapt itself to the cross-section of the chamber when moving from the first to the second longitudinal position of the chamber, and a coiled flat spring having a central axis at least substantially along the longitudinal axis, the spring being positioned adjacently to the elastically deformable material so as to support the elastically deformable material in the longitudinal direction.

In that situation, the piston may further comprise a number of flat supporting means positioned between the elastically deformable material and the spring, the supporting means being rotatable along an interface between the spring and the elastically deformable material.

The supporting means may be adapted to rotate from a first position to a second position where, in the first position, an outer boundary thereof may be comprised within the first cross-sectional area and where, in the second position, an outer boundary thereof may be comprised within the second cross-sectional area.

In a second aspect, the invention relates to a combination of a piston and a chamber, wherein:

the chamber defines an elongate chamber having a longitudinal axis,
  the chamber having, at a first longitudinal position thereof, a first cross-sectional area thereof and, at a second longitudinal position thereof, a second cross-sectional area, the first cross-sectional area being larger than the second cross-sectional area, the change in cross-section of the chamber being at least substantially continuous between the first and second longitudinal positions,
the piston being adapted to adapt itself to the cross-section of the chamber when moving from the first to the second longitudinal position of the chamber,
the piston comprising:
  a plurality of at least substantially stiff support members rotatably fastened to a common member,
  elastically deformable means, supported by the supporting members, for sealing against an inner wall of the chamber
the support members being rotatable between 10° and 40° relative to the longitudinal axis.

Preferably, the support members are rotatable so as to be at least approximately parallel to the longitudinal axis.

Thus, the manner in which the piston is able to adapt to different areas and/or shapes is one wherein the piston comprises a number of rotatably fastened means holding a sealing means. One preferred embodiment is one wherein the piston has the overall shape of an umbrella.

Preferably, the common member is attached to a handle for use by an operator, such as when the combination is used as a pump, and wherein the support members extend, in the chamber, in a direction relatively away from the handle. This has the advantage that increasing the pressure by forcing the handle into the chamber, will simply force the supporting means and the sealing means against the wall of the chamber—thus increasing the sealing.

In order to ensure sealing also after a stroke, the combination preferably comprises means for biasing the support members against an inner wall of the chamber.

In a third aspect, the invention relates to a combination of a piston and a chamber, wherein:

the chamber defines an elongate chamber having a longitudinal axis,
  the chamber having, at a first longitudinal position thereof, a first cross-sectional area thereof and, at a second longitudinal position thereof, a second cross-sectional area, the first cross-sectional area being larger than the second cross-sectional area, the change in cross-section of the chamber being at least substantially continuous between the first and second longitudinal positions,
the piston being adapted to adapt itself to the cross-section of the chamber when moving from the first to the second longitudinal position of the chamber
the piston comprising an elastically deformable container comprising a deformable material.

Thus, by providing an elastically deformable container, changes in area and/or shape may be provided. Naturally, this container should be sufficiently fastened to the piston in order for it to follow the remainder of the piston when the piston is moved in the chamber.

The deformable material may be a fluid or a mixture of fluids, such as water, steam, and/or gas, or foam. This material, or a part thereof, may be compressible, such as gas or a mixture of water and gas, or it may be at least substantially incompressible.

When the cross-sectional area changes, the volume of the container may change. Thus, in a cross-section through the longitudinal direction, the container may have a first shape at the first longitudinal direction and a second shape at the second longitudinal direction, the first shape being different from the second shape. In one situation, at least part of the deformable material is compressible and the first shape has an area being larger than an area of the second shape. In that situation, the overall volume of the container changes, whereby the fluid should be compressible. Alternatively or optionally, piston may comprise a second enclosed space communicating with the deformable container, the enclosed space having a variable volume. In that manner, that enclosed space may take up fluid when the deformable container changes volume. The volume of the second container may be varied by an operator. In that manner, the overall pressure or maximum/minimum pressure of the container may be altered. Also, the second enclosed space may comprise a spring-biased piston.

It may be preferred to provide means for defining the volume of the enclosed space so that a pressure of fluid in the enclosed space relates to a pressure of fluid between the piston and the second longitudinal position of the container. In this manner, the pressure of the deformable container may be varied in order to obtain a suitable sealing.

A simple manner would be to have the defining means adapted to define the pressure in the enclosed space at least substantially identical to the pressure between the piston and the second longitudinal position of the container. In this situation, a simple piston between the two pressures may be provided (in order to not loose any of the fluid in the deformable container).

In fact, the use of this piston may define any relation between the pressures in that the enclosed space in which the piston translates may taper in the same manner as the main chamber of the combination.

In order to withstand both the friction against the chamber wall and the shape/dimension changes, the container may comprise an elastically deformable material comprising enforcement means, such as a fibre enforcement.

In order to achieve and maintain a appropriate sealing between the container and the chamber wall, it is preferred that an internal pressure, such as a pressure generated by a fluid in the container, is higher than the highest pressure of the surrounding atmosphere during translation of the piston from the first longitudinal position to the second longitudinal position or vice versa.

In yet another aspect, the invention relates to a combination of a piston and a chamber, wherein:

the chamber defines an elongate chamber having a longitudinal axis, the chamber having, at a first longitudinal position thereof, a first cross-sectional shape and area thereof and, at a second longitudinal position thereof, a second cross-sectional shape and area, the first cross-sectional shape being different from the second cross-sectional shape, the change in cross-sectional shape of the chamber being at least substantially continuous between the first and second longitudinal positions, the piston being adapted to adapt itself to the cross-section of the chamber when moving from the first to the second longitudinal position of the chamber.

This very interesting aspect is based on the fact that different shapes of e.g. a geometrical figure have varying relations between the circumference and the area thereof. Also, changing between two shapes may take place in a continuous manner so that the chamber may have one cross-sectional shape at one longitudinal position thereof and another at a second longitudinal position while maintaining the preferred smooth variations of the surface in the chamber.

In the present context, the shape of a cross-section is the overall shape thereof—notwithstanding the size thereof. Two circles have the same shape even though one has a diameter different from that of the other.

Preferably, the first cross-sectional area is at least 5%, preferably at least 10%, such as at least 20%, preferably at least 30%, such as at least 40%, preferably at least 50%, such as at least 60%, preferably at least 70%, such as at least 80, such as at least 90% larger than the second cross-sectional area.

In a preferred embodiment, the first cross-sectional shape is at least substantially circular and wherein the second cross-sectional shape is elongate, such as oval, having a first dimension being at least 2, such as at least 3, preferably at least 4 times a dimension at an angle to the first dimension.

In another preferred embodiment, the first cross-sectional shape is at least substantially circular and wherein the second cross-sectional shape comprises two or more at least substantially elongate, such as lobe-shaped, parts.

When, in the cross-section at the first longitudinal position, a first circumference of the chamber is 80–120%, such as 85–115%, preferably 90–110, such as 95–105, preferably 98–102% of a second circumference of the chamber in the cross-section at the second longitudinal direction, a number of advantages are seen. Problems may arise when attempting to seal against a wall having varying dimensions due to the fact that the sealing material should both provide a sufficient sealing and change its dimensions. If, as is the situation in the preferred embodiment, the circumference changes only to a small degree, the sealing may be controlled more easily. Preferably, the first and second circumferences are at least substantially identical so that the sealing material is only bent and not stretched to any significant degree.

Alternatively, the circumference may be desired to change slightly in that when bending or deforming a sealing material, e.g. a bending will cause one side thereof to be compressed and another stretched. Overall, it is desired to provide the desired shape with a circumference at least close to that which the sealing material would automatically "choose".

One type of piston, which may be used in this type of combination, is the one comprising:

a plurality of at least substantially stiff support members rotatably fastened to a common member, elastically deformable means, supported by the supporting members, for sealing against an inner wall of the chamber.

Another type of piston is the one comprising an elastically deformable container comprising a deformable material.

Another aspect of the invention relates to a combination of a piston and a chamber, wherein:

the chamber defines an elongate chamber having a longitudinal axis, the chamber having, at a first longitudinal position thereof, a first cross-sectional area thereof and, at a second longitudinal position thereof, a second cross-sectional area, the first cross-sectional area being larger than the second cross-sectional area, the change in cross-section of the chamber being at least substantially continuous between the first and second longitudinal positions, the piston comprising:

an elastically deformable material being adapted to adapt itself to the cross-section of the chamber when moving from the first to the second longitudinal position of the chamber, and a coiled flat spring having a central axis at least substantially along the longitudinal axis, the spring being positioned adjacently to the elastically deformable material so as to support the elastically deformable material in the longitudinal direction.

This embodiment solves the potential problem of merely providing a large mass of a resilient material as a piston. The fact that the material is resilient will provide the problem of deformation of the piston and, if the pressure increases, lack of sealing due to the resiliency of the material. This is especially a problem if the dimension changes required are large.

In the present aspect, the resilient material is supported by a helical flat spring. A helical spring is able to be expanded and compressed in order to follow the area of the chamber while the flat structure of the material of the spring will ensure that the spring is not deformed by the pressure.

In order to e.g. increase the area of engagement between the spring and the deformable material, the piston may further comprise a number of flat supporting means positioned between the elastically deformable material and the spring, the supporting means being rotatable along an interface between the spring and the elastically deformable material.

Preferably, the supporting means are adapted to rotate from a first position to a second position where, in the first position, an outer boundary thereof may be comprised within the first cross-sectional area and where, in the second position, an outer boundary thereof may be comprised within the second cross-sectional area.

Another aspect of the invention is one relating to a combination of a piston and a chamber, wherein:

the chamber defines an elongate chamber having a longitudinal axis, the piston being movable in the chamber from a first longitudinal position to a second longitudinal position, the chamber having an elastically deformable inner wall along at least part of the inner chamber wall between the first and second longitudinal positions, the chamber having, at a first longitudinal position thereof when the piston is positioned at that position, a first cross-sectional area thereof and, at a second longitudinal position thereof when the piston is positioned at that position, a second cross-sectional area, the first cross-sectional area being larger than the second cross-sectional area, the change in cross-section of the chamber being at least substantially continuous between the first and second longitudinal positions when the piston is moved between the first and second longitudinal positions.

Thus, alternatively to the combinations where the piston adapts to the cross-sectional changes of the chamber, this aspect relates to a chamber having adapting capabilities.

Naturally, the piston may be made of an at least substantially incompressible material—or a combination may be made of the adapting chamber and an adapting piston—such as a piston according to the above aspects.

Preferably, the piston has, in a cross section along the longitudinal axis, a shape tapering in a direction from to the second longitudinal positions.

A preferred manner of providing an adapting chamber is to have the chamber comprise:
an outer supporting structure enclosing the inner wall and
a fluid held by a space defined by the outer supporting structure and the inner wall.

In that manner, the choice of fluid or a combination of fluids may help defining the properties of the chamber, such as the sealing between the wall and the piston as well as the force required etc.

It is clear that depending on from where the combination is seen, one of the piston and the chamber may be stationary and the other moving—or both may be moving. This has no impact on the function of the combination.

Naturally, the present combination may be used for a number of purposes in that it primarily focuses on a novel manner of providing an additional manner of tailoring translation of a piston to the force required/taken up. In fact, the area/shape of the cross-section may be varied along the length of the chamber in order to adapt the combination for specific purposes and/or forces. One purpose is to provide a pump for use by women or teenagers—a pump that nevertheless should be able to provide a certain pressure. In that situation, an ergonomically improved pump may be required by determining the force which the person may provide at which position of the piston—and thereby provide a chamber with a suitable cross-sectional area/shape.

Another use of the combination would be for a shock absorber where the area/shape would determine what translation a certain shock (force) would require. Also, an actuator may be provided where the amount of fluid introduced into the chamber will provide differing translation of the piston depending on the actual position of the piston prior to the introducing of the fluid.

In fact, the nature of the piston, the relative positions of the first and the second longitudinal positions and the arrangement of any valves connected to the chamber may provide pumps, motors, actuators, shock absorbers etc. with different pressure characteristics and different force characteristics.

If the piston pump is a handpump for tire inflation purposes it can have an integrated connector according to those disclosed in PCT/DK96/00055 (including the US Continuation in Part of 18 Apr. 1997), PCT/DK97/00223 and/or PCT/DK98/00507. The connectors can have an integrated pressure gauge of any type. In a piston pump according to the invention used as e.g. a floor pump or 'carpump' for inflation purposes a pressure gauge arrangement can be integrated in this pump.

Certain piston types as e.g. those of FIGS. 4A–F, 7A–E, 7J, 12A–C may be combined with any type of chamber.

The combination of certain mechanical pistons as e.g. the one shown in FIGS. 3A–C, and and of certain composite pistons as e.g. the one shown in FIGS. 6D–F and chambers having a constant circumferical length of the convex type as e.g. the one shown in FIG. 7L may be a good combination.

The combination of composite pistons as e.g. those shown in FIGS. 9–12 may be used well with chambers of a convex type, irrespective of a possible change in the circumferical length.

Pistons of the 'embrella type' shown in this application have their open side at the side where the pressure of the medium in the chamber is loading the 'embrella' at the open side. It may also very well possible that the 'embrella' is working upside down.

The inflatable pistons with a skin with a fiber architecture which has been shown have an overpressure in the piston in relation to the pressure in the chamber. It is however also possible to have an equal or lower pressure in the piston than in the chamber—the fibers are than under pressure instead of under tension. The resulting shape may be different than those which are shown in the drawings. In that case, any loading regulating means may have to be tuned differently, and the fibers may have to be supported. The load regulating means showed in e.g. FIG. 9D or 12B may then be constructed so that the movement of the piston of the means gives a suction in the piston, e.g. by an elongation of the piston rod, so that the pistons are now at the other side of the holes in the piston rod. The change in the form of the piston is than different and a collaps may be obtained. This may reduce the life-time.

Through these embodiments, reliable and inexpensive pumps optimized for manual operation, e.g. universal bike pumps to be operated by women and teenagers, can be obtained. The shape of the walls of the pressurerizing chamber (longitudinal and/or transversal cross-section) and/or piston means of the pumps shown are examples and may be changed depending on the pump design specification. The invention can also be used with all kinds of pumps e.g. multiple-stage piston pumps as well as with dual-function pumps, piston pumps driven by a motor, pumps where e.g. only the chamber or piston is moving as well as types where both the chamber and the piston are moving simultaneously. Any kind of medium may be pumped in the piston pumps. Those pumps may be used for all kinds of applications, e.g. in pneumatic and/or hydraulic applications. And, the invention is also applicable for pumps which are not manually operated. The reduction of the applied force means a substantial reduction of investments for equipment and a substantial reduction of energy during operation. The chambers may be produced e.g. by injection moulding, from taper swaged tubes etc.

In a piston pump a medium is sucted into a chamber which may thereafter be closed by a valve arrangement. The medium is compressed by the movement of the chamber and/or the piston and a valve may release this compressed medium from the chamber. In an actuator a medium may be pressed into a chamber through a valve arrangement and the piston and/or the chamber is moving, initiating the movement of an attached devise. In shock absorbers the chamber may be completely closed, wherein the chamber a compressable medium can be compressed by the movement of the chamber and/or the piston. In the case of a non-compressable medium is inside the chamber, e.g. the piston may be equiped with several small channels which give a dynamic friction, so that the movement is slowed down.

Further, the invention can also be used in propulsion applications where a medium may be used to move a piston and/or a chamber, which can turn around an axis as e.g. in a motor. The above combinations are applicable on all above mentioned applications.

Thus, the invention also relates to a pump for pumping a fluid, the pump comprising:
- a combination according to any of the above aspects,
- means for engaging the piston from a position outside the chamber,
- a fluid entrance connected to the chamber and comprising a valve means, and
- a fluid exit connected to the chamber.

In one situation, the engaging means may have an outer position where the piston is in its first longitudinal position, and an inner position where the piston is in its second longitudinal position. A pump of this type is preferred when a pressurised fluid is desired.

In another situation, the engaging means may have an outer position where the piston is in its second longitudinal position, and an inner position where the piston is in its first longitudinal position. A pump of this type is preferred when no substantial pressure is desired but merely transport of the fluid.

In the situation where the pump is adapted for standing on the floor and the piston/engaging means to compress fluid, such as air, by being forced downwards, the largest force may, ergonomically, be provided at the lowest position of the piston/engaging means/handle. Thus, in the first situation, this means that the highest pressure is provided there. In the second situation, this merely means that the largest area and thereby the largest volume is seen at the lowest position. However, due to the fact that a pressure exceeding that in the e.g. tyre is required in order to open the valve of the tyre, the smallest cross-sectional area may be desired shortly before the lowest position of the engaging means in order for the resulting pressure to open the valve and a larger cross-sectional area to force more fluid into the tyre (See FIG. 2B).

Also, the invention relates to a shock absorber comprising:
- a combination according to any of the combination aspects,
- means for engaging the piston from a position outside the chamber, wherein the engaging means have an outer position where the piston is in its first longitudinal position, and an inner position where the piston is in its second longitudinal position.

The absorber may further comprise a fluid entrance connected to the chamber and comprising a valve means.

Also, the absorber may comprise a fluid exit connected to the chamber and comprising a valve means.

It may be preferred that the chamber and the piston forms an at least substantially sealed cavity comprising a fluid, the fluid being compressed when the piston moves from the first to the second longitudinal positions.

Normally, the absorber would comprise means for biasing the piston toward the first longitudinal position.

Finally, the invention also relates to an actuator comprising:
- a combination according to any of the combination aspects,
- means for engaging the piston from a position outside the chamber,
- means for introducing fluid into the chamber in order to displace the piston between the first and the second longitudinal positions.

The actuator may comprise a fluid entrance connected to the chamber and comprising a valve means.

Also, a fluid exit connected to the chamber and comprising a valve means may be provided.

Additionally, the actuator may comprise means for biasing the piston toward the first or second longitudinal position.

BRIEF DESCRIPTION OF THE DRAWINGS

In the following, preferred embodiments of the invention will be described with reference to the drawing wherein:

The invention is explained in detail below by means of diagrams and drawings. The following is shown in the diagrams or drawings—a transversal cross-section means a cross-section perpendicular to the moving direction of the piston and/or the chamber, while the longitudinal cross-section is the one in the direction of said moving direction:

FIG. 1 shows a so-called indicator diagram of a one-stage single working piston pump with a cylinder and a piston with a fixed diameter.

FIG. 2A shows an indicator diagram of a piston pump according the invention part A shows the option where the piston is moving, while part B shows the option where the chamber is moving.

FIG. 2B shows an indicator diagram of a pump according to the invention where the transversal cross-section increases again from a certain point of the pump stroke, by still increasing pressure.

FIG. 4A shows a longitudinal cross-section of a pump with fixed different areas of the transversal cross-sections of the pressurizing chamber and a piston with radially/partially axially changing dimensions during the stroke—the piston arrangement is shown at the beginning and at the end of the pump stroke (second embodiment).

FIG. 4B shows an enlargement of the piston arrangement of FIG. 4A at the beginning of a stroke.

FIG. 4C shows an enlargement of the piston arrangement of FIG. 4A at the end of a stroke.

FIG. 4D shows section A—A of FIG. 4B.

FIG. 4E shows section B—B of FIG. 4C.

FIG. 5A shows a longitudinal cross-section of a pump with fixed different areas of the transversal cross-sections of the pressurizing chamber and a piston with radially-axially changing dimensions during the stroke—the piston arrangement is shown at the beginning and at the end of the pump stroke (third embodiment).

FIG. 5B shows an enlargement of the piston arrangement of FIG. 5A at the beginning of a stroke.

FIG. 5C shows an enlargement of the piston arrangement of FIG. 5A at the end of a stroke.

FIG. 5F shows the pressurizing chamber of FIG. 5A with a piston means with sealing means which is made of a composite of materials.

FIG. 5G shows an enlargement of the piston means of FIG. 5F during a stroke.

FIG. 5H shows an enlargement of the piston means of FIG. 5F at the end of a stroke, both while it is still under pressure and while it is not anymore under pressure.

FIG. 6A shows a longitudinal cross-section of a pump with fixed different areas of the transversal cross-sections of the pressurizing chamber and a fourth embodiment of the piston with radially-axially changing dimensions during the stroke—the piston arrangement is shown at the beginning and at the end of the pump stroke.

FIG. 6B shows an enlargement of the piston arrangement of FIG. 6A at the beginning of a stroke.

FIG. 6C shows an enlargement of the piston arrangement of FIG. 6A at the end of a stroke.

FIG. 6D shows the pressurizing chamber of FIG. 6A and a fifth embodiment of the piston with radially-axially changing dimensions during the stroke—the piston arrangement is shown at the beginning and at the end of a pump stroke.

FIG. 6E shows an enlargement of the piston arrangement of FIG. 6D at the beginning of a stroke.

FIG. 7A shows a longitudinal cross-section of a pump comprising a concave portion of the wall of the pressurizing chamber with fixed dimensions and a sixth embodiment of the piston with radially-axially changing dimensions during the stroke—the piston arrangement is shown at the beginning and at the end of the pump stroke.

FIG. 7B shows an enlargement of the piston arrangement of FIG. 5A at the beginning of a stroke.

FIG. 7C shows an enlargement of the piston arrangement of FIG. 5A at the end of a stroke.

FIG. 7H shows transversal cross-section G—G (dotted lines) and H—H of the longitudinal cross section of FIG. 7G.

FIG. 7I shows transversal cross-section G—G (dotted lines) and I—I of the longitudinal cross section of FIG. 7H.

FIG. 7K shows other examples of transversal cross-sections made by Fourier Series Expansions of a pressurizing chamber of which the transversal cross-sectional area decreases, while the circumpherical size remains constant.

FIG. 8A shows a longitudinal cross-section of a pump comprising a convex portion of the wall of the pressurizing chamber with fixed dimensions and a seventh embodiment of the piston with radially-axially changing dimensions during the stroke—the piston arrangement is shown at the beginning and at the end of a pump stroke.

FIG. 8B shows an enlargement of the piston arrangement of FIG. 5A at the beginning of a stroke.

FIG. 9A shows a longitudinal cross-section of a pump with fixed different areas of the transversal cross-sections of the pressurizing chamber and an eight embodiment of the piston with radially-axially changing dimensions during the stroke—the piston arrangement is shown at the beginning and at the end of a pump stroke.

FIG. 9B shows an enlargement of the piston arrangement of FIG. 9A at the beginning of a stroke.

FIG. 10A shows a nineth embodiment of the piston similar to the one of FIG. 9A with fixed different areas of the transversal cross-section of the pressurizing chamber.

FIG. 10B shows an enlargement of the piston of FIG. 10A at the beginning of a stroke.

FIG. 13A shows a longitudinal cross-section of a pump with variable different areas of the transversal cross-section of the pressurizing chamber and a piston with fixed geometrical sizes—the arrangement of the combination is shown at the beginning and at the end of the pump stroke.

FIG. 13B shows an enlargement of the arrangement of the combination at the beginning of a pump stroke.

FIG. 13C shows an enlargement of the arrangement of the combination during a pump stroke.

FIG. 13D shows an enlargement of the arrangement of the combination at the end of a pump stroke.

DESCRIPTION OF PREFERRED EMBODIMENTS

FIG. 1 shows the so-called indicator diagram. This diagram schematically shows the adiabatic relation between the pressure p and the pump stroke volume V of a traditional single-stage one-way working piston pump with a cylinder with a fixed diameter. The increase in the operating force to be applied per stroke can be read directly from the diagram and is quadratic to the diameter of the cylinder. The pressure p, and thus the operating force F, increases during the stroke normally until the valve of the body to be inflated has been opened.

FIG. 2A shows the indicator diagram of a piston pump according the invention. It shows that the diagram for pressure p is simular to that of traditional pumps, but that the operating force is different and depends entirely on the chosen area of the transversal cross-section of the pressurizing chamber. This depends entirely on the specification, e.g. that the operating force should not exceed a certain maximum or that the size of the operating force is fluctuating according to ergonomic demands. This is specifically demanded in the case when a manually operated pump is only transporting the media without significant change in the pressure as it is e.g. the case with water pumps. The shape of the longitudinal and/or transversal cross-section of the pressurizing chamber may be any kind of curve and/or line. It is also possible that the transversal cross-section e.g. increases by increasing pressure (FIG. 2B). An example of the operating force is the dashed thick line, 1 or 2. The different wall possibilities marked 1 and 2 correspond to the earlier mentioned lines 1,2 of the diagram. The A-section relates to a pump of which only the piston is moving, while the B-section relates to pumps where only the chamber is moving. A combination of both movements at the same time is also possible.

FIG. 2B shows an example of an indicator diagram of a piston pump that has a chamber with a transversal cross-section that increases by increasing pressure.

Figures 3A, 3B, 3C:
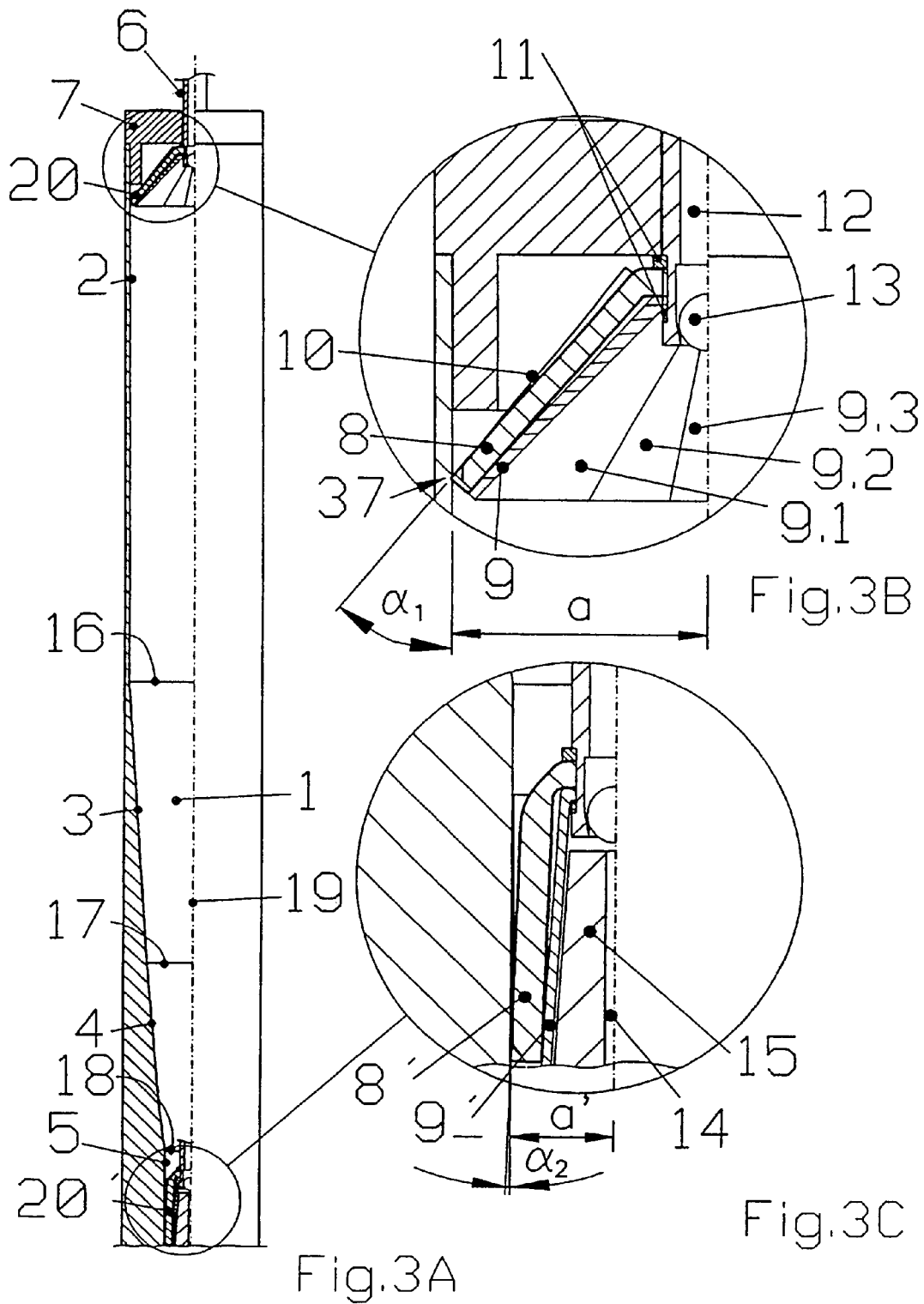
FIG. 3A shows a longitudinal cross-section of a pump with fixed different areas of transversal cross-sections of the pressurizing chamber and a piston with radially-axially changing dimensions during the stroke—the piston arrangement is shown at the beginning and at the end of a pump stroke (first embodiment).
FIG. 3B shows an enlargement of the piston arrangement of FIG. 3A at the beginning of a stroke.
FIG. 3C shows an enlargement of the piston arrangement of FIG. 3A at the end of a stroke.

FIGS. 3A,B,C,D show details of the first embodiment. The piston moves in the pressurizing chamber which comprises cylindrical and cone-shaped portions with circular transversal cross-sections with diameters that decrease when the pressure of the gaseous and/or liquid media increases. This is based on the specification that the operating force should not exceed a certain maximum. The transition between the various diameters is gradual without discrete steps. This means that the piston can slide easily in the chamber and adapt itself to the changing areas and/or shapes of the transversal cross-sections without loss of sealing ability. If the operating force has to be lowered by increasing pressure, the transversal cross-sectional area of the piston is decreasing and by that the length of the circumference as well. The circumferical length reduction is based on compression up to the buckling level or by relaxation. The longitudinal cross-section of the piston means is trapezoid with variable angle α less than e.g. 40° with the wall of the pressurizing chamber, so that it cannot deflect backwards. The dimensions of the sealing means change in three dimensions during every stroke. A supporting portion of the piston means, e.g. a disk or integrated ribs in the sealing means, e.g. positioned on the non-pressurized side during a pumping stroke of the piston protects against deflection under pressure. A loading portion of the piston means, e.g. a spring washer with several segments, may also be mounted e.g. on the pressurized side of the piston. This squeezes the flexible sealing portion towards the wall. This is expedient if the pump has not been used for some time and the piston means has been folded for some time. By moving the piston rod, the sides of the trapezoid cross-section of the sealing portion of the piston means will be pushed axially and radially, so that the sealing edge of the piston follows the decreasing diameter of the pressurizing chamber. At the end of the stroke, the bottom of the chamber in the centre has become higher in order to reduce the volume of the dead room. The piston rod may mainly be guided in the cap which locks the pressurizing chamber. As the piston in both directions of its movement seals to the wall of the chamber, the piston rod e.g. comprises an inlet channel with a spring force-operated valve, which is closed in case of overpressure in the chamber. Without the use of the loading portion in the piston means, this separate valve may be superfluous. In the pump design according to the invention, the parts of the pump have been optimized for working forces. The inside diameter pump is over the main part of the pump chamber length larger than that of existing pumps. Consequently, the inlet volume is higher, even though the volume of the remaining part of the chamber is lower than that of existing pumps. This ensures that the pump can pump quicker than existing pumps, maximum operating force required is significantly reduced and lower than the level reported by consumers to be comfortable. The length of the chamber can be reduced, so that the pump becomes practical, even for women and teenagers. The volume of a stroke is still higher than that of existing pumps.

FIG. 3A shows a piston pump with a pressurizing chamber 1 with portions of different areas of its transversal cross-sections of wall sections 2,3,4 and 5. The piston rod 6. The cap 7 stops the piston means and guides the piston rod 6. The transitions 16,17 and 18 between the section with the walls 2,3,4 and 5. The longitudinal centre axis 19 of the chamber 1. The piston 20 at the beginning and 20' at the end of the pump stroke.

FIG. 3B shows the sealing portion 8 made of an elastic material and the loading portion 9, e.g. a spring washer with segments 9.1, 9.2 and 9.3 (other segments not shown) and a support portion 10 of the piston means attached to the piston rod 6 between two portions of locking means 11. The piston rod 6 has an inlet 12 and a valve 13. The angle $\alpha_1$ between the sealing portion 8 of the piston means and the wall 2 of the pressurizing chamber 1. The sealing edge 37. The distance a is the distance from the sealing edge 37 to the central axis of the chamber 1 in a transversal cross-section at the beginning of the stroke.

FIG. 3C shows outlet channel 14 in a means 15 which reduces the volume of the dead room. Angle $\alpha_2$ between the sealing portion 8' of the piston means and the wall 5 of the pressurizing chamber 1. The distance a' is the distance from the sealing edge 37 to the central axis of the chamber 1 in a transversal cross-section at the end of the stroke. Shown is that distance a' is approximately 41% of distance a. The loading portion 9'.

Figure 3D:
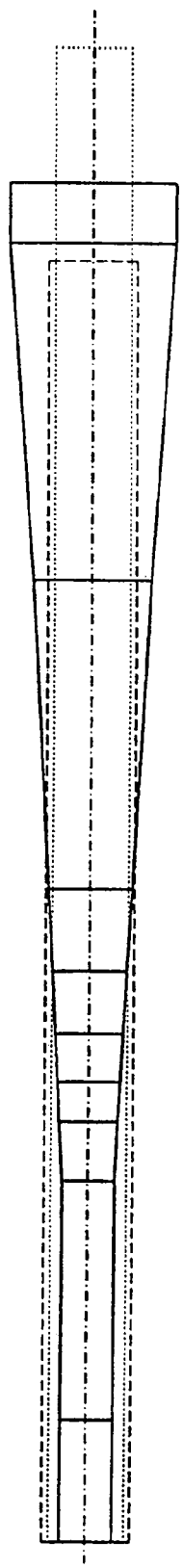
FIG. 3D shows a longitudinal cross-section of a chamber of a floor pump according to the invention with such dimensions that the operating force remains approximately constant—as a comparison the cylinder of an existing low pressure (dotted) and high pressure floor (dashed) pump are shown simultaneously.

FIG. 3D shows the longitudinal cross-section of the chamber of a floor pump ($\phi_{inside}$60–19.3 mm, length 500 mm) according to the invention of which the transversal cross-sections are chosen so that the operating force remains approximately constant and is chosen in accordance with ergonomic demands: e.g. as in the Figure: 277 N. Other force sizes can also be chosen. This is only giving the starting point for the quantification of a floorpump according to the invention as a constant operating force may not be ergonomically correct. As a comparison the cross-sections of an existing low pressure floor pump ($\varnothing_{inside}$ 32 mm, length 470 mm) is shown in dotted lines, and that of an existing high pressure floor pump ($\varnothing_{inside}$ 27 mm, length 550 mm) is shown in dashed lines. It is clearly shown that the floor pump according to the invention both has a bigger stroke volume, thus faster inflating tyres, and a lower operating force than existing pumps. The chamber according to the invention can be tailored to ergonomic demands during the entire stroke.

FIGS. 4A,B,C,D,E,F show details of the second preferred embodiment. The sealing portion of the piston means is made of an elastically deformable material supported by a support means which can rotate around an axis parallel to the center axis of the chamber. The consequence of this movement is that it supports a larger area of the sealing means the higher the pressure is in the chamber. The loading portion for the support portion initiates the movement of the support means. The loading portion in the form of a flat-shaped spring can change dimensions in a direction perpendicular to the centre line of the chamber. The spring becomes more and more stiff the higher the pressure in the chamber. It can also be a spring on the axis where the support means turns around. By decreasing the diameter of the sealing portion it increases its length. This is the case with an elastically deformable material which is only a bit compressable, like e.g. rubber. Therefore the piston rod sticks out of this sealing means at the beginning of a stroke. If other material for the sealing portion is chosen, its length may remain unchangend or may decrease by decreasing its diameter.

FIG. 4A shows a piston pump with a pressurizing chamber 21 with portions of different 1; transversal cross-section areas. The chamber has cooling ribs 22 at the high-pressure side. The chamber can be (injection) moulded. The piston rod 23. The cap 24 guides the said piston rod. The piston 36 at the beginning and 36' at the end of a pump stroke.

FIG. 4B shows the elastically deformable sealing portion 25 which is fastened to the piston rod 23 by means 26 (not drawn). A part 27 of the piston rod 23 is sticking out of the sealing portion 25. Support portion 28 is hanged up on ring 29 which is fastened to the piston rod 23. Support portion 28 can turn around axis 30. Loading portion 31 comprises a spring which is fastened in a hole 32 onto the piston rod 23. The sealing edge 38.

FIG. 4C shows that part 27 of piston rod 23 is almost covered by the elastically deformed sealing means 25', which has now increased its length and decreased its diameter. The sealing edge 38'. The distance a' between the sealing edge 38 and the central axis 19 of the chamber is approximately 40% of that of distance a in the shown transversal cross-section.

FIG. 4D shows section A—A of FIG. 4B. The loading portion 31 is fastened at one end in the hole 32 of the piston rod 23. The support portion 28 and the ring 29. The support portion is stopped by a stop surface 33 (not drawn). The support portion 28 is guided by the guiding means 34 (not drawn).

FIG. 4E shows section B—B of FIG. 4C. The support means 28 and the loading means 31 are moved towards the piston rod 23. The rib 22.

Figure 4F:
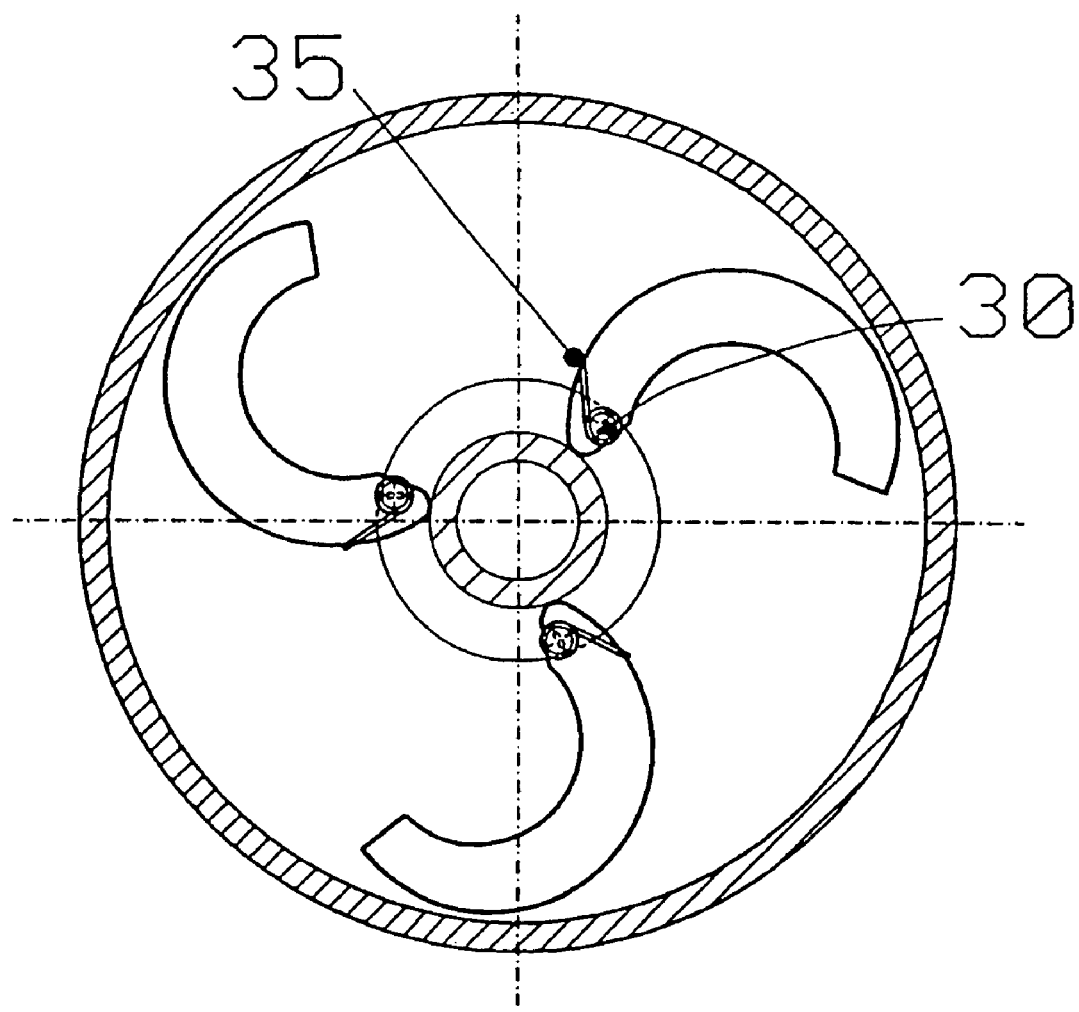
FIG. 4F shows an alternative solution for the loading portion of FIG. 4D.

FIG. 4F shows an alternative for the loading means 31. It comprises springs 35 on each axis 30.

FIGS. 5A,B,C,D,E,F,G,H show details of the third embodiment. It is a variant of the first embodiment. The sealing portion comprises a flexible impervious membrane for gaseous and/or liquid media. This material can change its dimensions in three directions without folds. This sealing portion is mounted in an O-ring which seals to the wall of the chamber. The O-ring is loaded to the wall by a loading means, e.g. a spring in the circumference. The O-ring and spring are further supported by a support means which can rotate around an axle fastened to the piston rod. This support means can be loaded by a spring.

FIG. 5A shows a longitudinal cross-section of a piston pump analog to that of FIG. 3A. The piston 49 at the beginning and 49' at the end of the pump stroke.

FIG. 5B shows a piston means at the beginning of a stroke comprising a sealing means 40: e.g. a stressed skin, that is fastened to a sealing means 41: e.g. an O-ring. This O-ring is loaded by a spring 42 which is positioned on the circumference of the sealing menas 41 and sealing means 40. The central axis 39 of the spring 42. The O-ring 41 and/or spring 42 is supported by support means 43 that can rotate on axis 44 which is attached to the piston rod 45 and positioned perpendicular to the central axis 19. It comprises a certain amount of separate members 43', loaded in compression during the (compression) pump stroke. These are positioned around the circumference of the sealing means 40,41 and the loading means 42, which they support. The support means 43 can be loaded by a spring 46. The angle $\beta_2$ between the wall of the chamber 2 and the support means 43. The piston rod 45 is without an inlet or a valve. A supporting ring and/or loading ring in the form of a spring can be mounted in the O-ring as an alternative for spring 42 (not drawn). The sealing edge 48.

FIG. 5C shows the piston means at the end of the stroke. The sealing means 40', 41' is thicker than at the beginning of a stroke: 40,41. The spring 46'. The Angle $\beta_2$ between the wall 5 and the support means 43 at the end of a stroke. The distance a' between the sealing edge 48 and the central axis 19 of the chamber is approximately 22% of the distance a at the beginning of the stroke in the shown cross-section. Smaller distances e.g. 15%, 10% or 5% are possible, and depend only on the construction of the suspension of the piston on the piston rod. Therefore, this is also valid for all other embodiments.

Figure 5D:
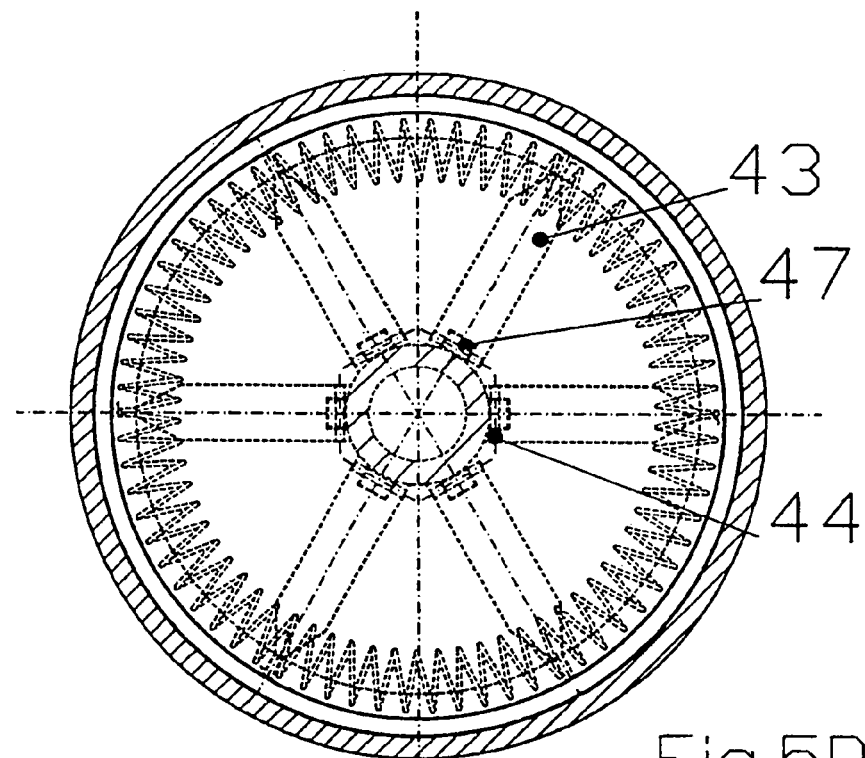
FIG. 5D shows section C—C of FIG. 5A.

FIG. 5D shows section C—C of FIG. 5A with support means 43, axle 44 and bracket 47.

Figure 5E:
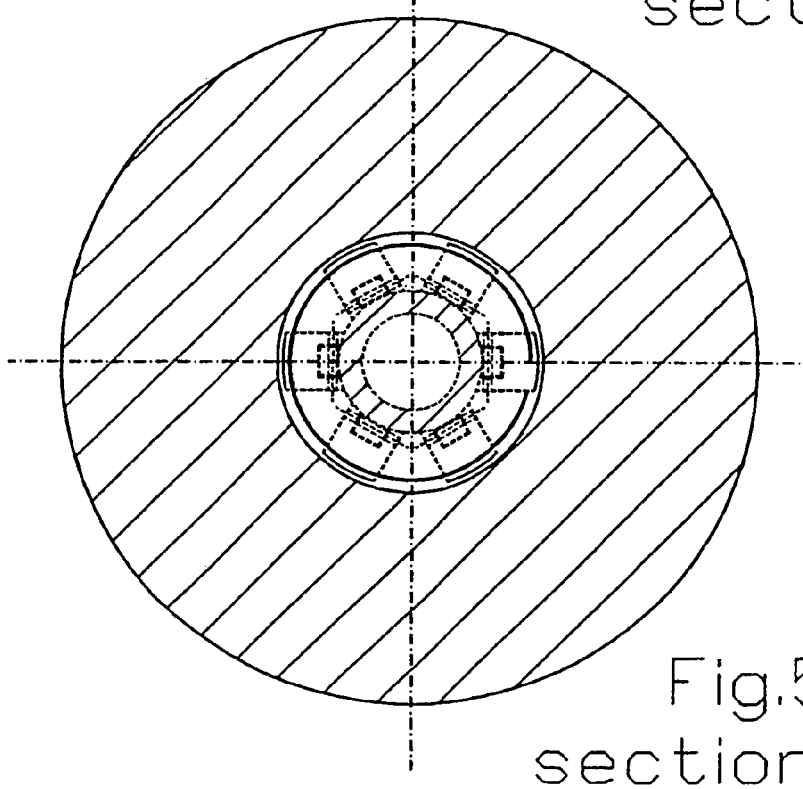
FIG. 5E shows section D—D of FIG. 5A.

FIG. 5E shows section D—D from FIG. 5A.

FIG. 5F shows the two positions of the piston 118 of FIGS. 5G and 118' of FIG. 5H in a chamber.

FIG. 5G shows a piston which is made of a composite of materials. It comprises a skin 110 of elastic impervious material and fibers 111. The fiber architecture results in the dome-form when it is under internal pressure. This form stabilizes the piston movement. As an alternative the sealing means may comprise a liner, fibers and a cover (not drawn). If the liner is not tight, an impervious skin may be added (not drawn). All materials at the compressed side of the piston comply with the specific environmental demands of the chamber. The skin is mounted in a sealing portion 112. Within the skin and the sealing portion a spring-force ring 113 may be mounted and which can elastically deform in its plane, and which enhances the loading of the ring 114. The sealing edge 117.

FIG. 5H shows the piston of FIG. 5G at the end of a pump stroke. The dome has been compressed into shape 115, if there is still full overpressure. Shape 110' is a result if the overpressure is decreased e.g. after the media has been released.

FIGS. 6A,B,C show details of the fourth embodiment. The piston means comprises a rubber tube which has a reinforcement, e.g. in the form of a textile yarn or cord wound around. The neutral angle between the tangent of the reinforcement winding and the centre line of the hose (=so-called braid angle) is mathematically calculated to be 54° 44'. A hose under internal pressure will not change dimensions (length, diameter), assuming no elongation of the reinforcement. In this embodiment, the diameter of the piston means decreases in relation to the decreasing diameter of the cross-section of the chamber at increasing pressures. The braid angle should be wider than neutral. The shape of the main part of the longitudinal cross-section of the pressurizing chamber is approximately a cone shape due to the behaviour of the piston means. At the end of the pump stroke, when the compressed medium has been removed from the chamber, the piston means increases its diameter and its length is decreased. The diameter increase is no practical problem. The sealing force from the piston to the wall of the pressurizing chamber ought to increase by increasing pressure. This may e.g. be done by the choice of a braid angle so that the piston diameter decreases a bit less than the decrease in diameter of the transversal cross-section of the chamber. Therefore, the braid angle may also be chosen to be smaller than neutral and/or being neutral. In general, the choice of the braid angle depends entirely on the design specification, and therefore the braid angle may be wider and/or smaller and/or neutral. It is even possible that the braid angle changes from place to place in the piston. Another possibility is that in the same cross-section of the piston several reinforcement layers are present with identical and/or different braid angles. Any type of reinforcement material and/or reinforcement pattern can be used. The place of the reinforcement layer(s) may be anywhere in the longitudinal cross-section of the piston. The amount of linings and/or covers may be more than one. It is also possible that a cover is absent. The piston means may also comprise loading and supporting means, e.g. those showed earlier. In order to be able to adapt to larger changes in the areas of cross-sections of the chamber a bit different construction of the piston means is necessary. The cone comprises now fibers which are under tension. These are coiled together in the top of the cone near the piston rod, and at the open side of the cone at the bottom of the piston rod. These may also be fastened to the piston rod itself. The pattern of the fibers is designed e.g. so that these are under higher tension the higher the pressure is in the chamber of pump where the media is to be compressed. Other patterns are of course possible, just depending on the specifcation. They deform the skin of the cone, so that it adapt itself to the cross-section of the chamber. The fibers may lie loose on the liner or loose in channels between a liner and a cover or they may be integrated on one of the two or in both. It is necessary to have a loading means in order to obtain an appropriate sealing to the wall if there is no pressure under the cone yet. The loading member e.g. a spring force member in the form of a ring, a plate etc. may be build in the skin e.g. by inserting in a moulding process. The suspension of the cone on the piston rod is better than of the foregoing embodiments because the piston will now be loaded by tension. Therefore being more in balance and less material is needed. The skin and the cover of the piston may be made of elastically deformable material which comply with the specific environmental conditions, while the fibers may be elastically or stiff, made of an appropriate material.

FIG. 6A shows a longitudinal cross-section of a pump with chamber 60. The wall portions 61,62,63,64,65 are both cylindrical 61,65 and cone-shaped 62,63,64. Transitions 66,67,68,69 between the said portions. The piston 59 at the beginning and 59' at the end of a pump stroke.

FIG. 6B shows piston means 50, a hose with a reinforcement 51. The hose is fastened to the piston rod 6 by clamp 52 or similar. The piston 6 has ribs 56 and 57. Ribs 56 prevent the movement of the piston means 50 relative to the piston rod 6 towards the cap 7, while ribs 57 prevent the movement of the piston means 50 relative to the piston rod 6 away from the cap 7. Other configurations of the fitting may be possible (not shown). On the outside of the hose, a protrusion 53 seals against the wall 61 of the chamber 60. Besides the reinforcement 51 the hose comprises lining 55. As an example cover 54 is shown too. The shape of the longitudinal cross-section of the piston means is an example. The sealing edge 58.

FIG. 6C shows the piston means at the end of the stroke, where the gaseous and/or liquid medium is under pressure. The piston means may be designed in such a way that the diameter change only takes place via a radial change (not shown).

Figure 6F:
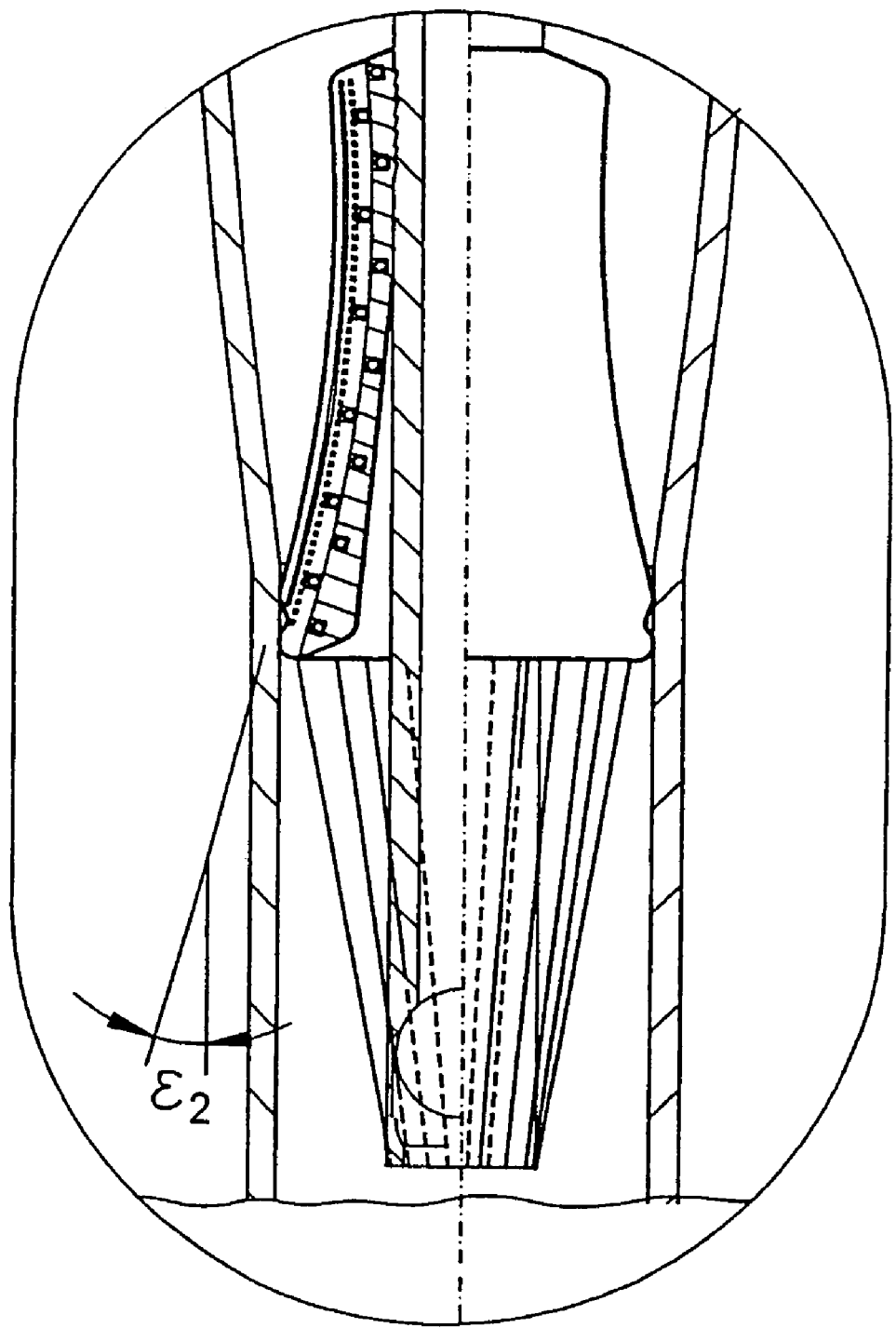
FIG. 6F shows an enlargement of the piston arrangement of FIG. 6D at the end of a stroke.

FIG. 6D shows the piston 189 of FIG. 6E and 189' of FIG. 6F at the beginning and at the end respectively of a pump stroke in a chamber of FIG. 6A.

FIG. 6E shows a piston means which has approximately the general shape of a cone with top angle $2\epsilon_1$. It is shown when there is no overpressure at the side of the chamber. It is mounted in its top on a piston rod 180. The cone is open at the pressurized side of the piston. The cover 181 comprises a sealing portion shown as a protrusion 182 with a sealing edge 188 and an inserted spring force member 183, fibers 184 as support means and a liner 185. The member 183 provides a loading to the cover, so that said protrusion 182 seals the wall of the chamber if there is no overpressure at the side of the chamber. The fibers 184 can lie in channels 186, and these are shown situated between the cover 181 and the liner 185. The liner 185 can be impervious—if not, a seperate layer 209 (not shown) at the pressurized side is mounted on the liner 185. The fibers are mounted in the top 187 of the cone to the piston rod 180 and/or to each other. The same is the case at the bottom end of the piston rod 180.

FIG. 6F shows the piston means at the end of a stroke. The top angle is now $2\epsilon_2$ and the distance a' between the sealing edge 188 and the central axis 19 of the chamber is now approximately 44% of that distance a at the beginning of the stroke in the shown cross-section.

FIGS. 7A,B,C,D,E show details of the fifth embodiment of the pump, with a piston which is constructed as another composite structure, comprising a basic material which is very elastic in all three dimensions, with a very high degree of relaxation. If it is not tight of itself, it may be made tight with e.g. a flexable membrane on the pressurized side of the piston means. The axial stiffness is accomplished by several integrated stiffeners, which in a transversal cross-section lie in a pattern, which optimally fills this section, while the in-between distance is reduced the smaller the diameter of the transversal cross-sectional section is, which in most cases means the higher the pressure in the pressurizing chamber is. In the longitudinal section of the piston the stiffeners lie in several angles between an axial direction and the direction of the surface of the piston means. The higher the pressure rates are, the more these angles are reduced and come near the axial direction. Now therefore the forces are being transferred to the support means, e.g. a washer, which is connected to the piston rod. The piston means can be mass-produced and is inexpensive. The stiffeners and, if necessary, the sealing means in the form of said flexable membrane, may be injection moulded together with said basic material in one operation. E.g. may the stiffeners be bonded together in the top, which makes handling easier. It is also possible to make the membrane by 'burning' it in said basic material, during or after injection moulding. This is specifically convenient if the basic material is a thermoplast. The hinges should than not be 'burned'.

Figure 7D:
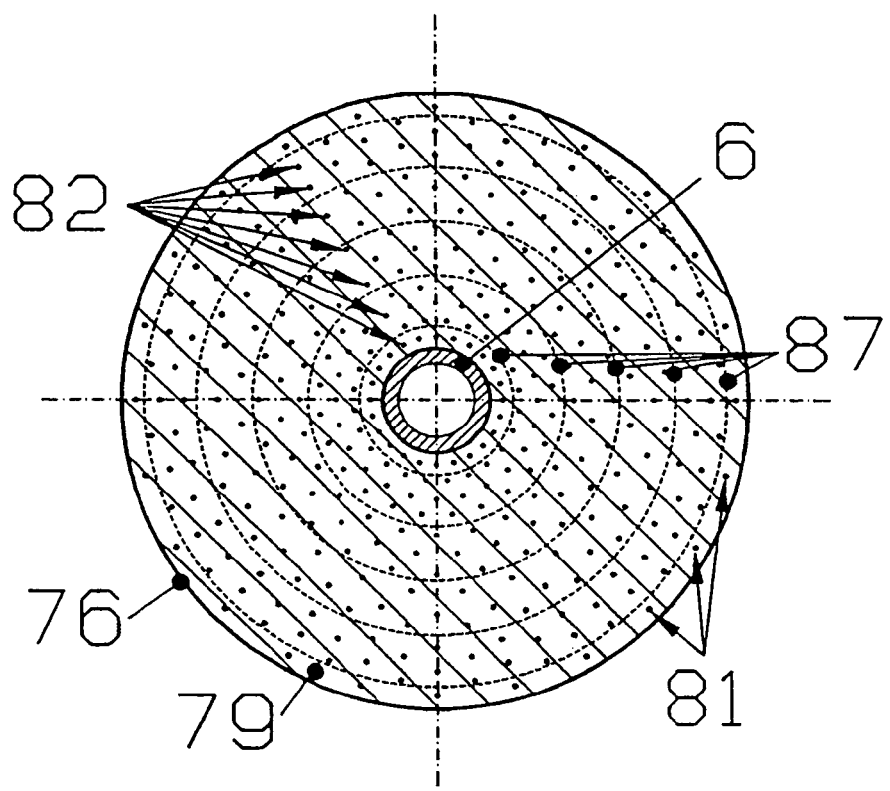
FIG. 7D shows section E—E of FIG. 7B.
Figure 7E:
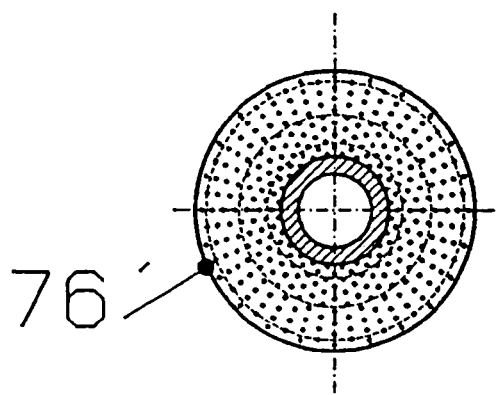
FIG. 7E shows section F—F of FIG. 7C.
Figure 7F:
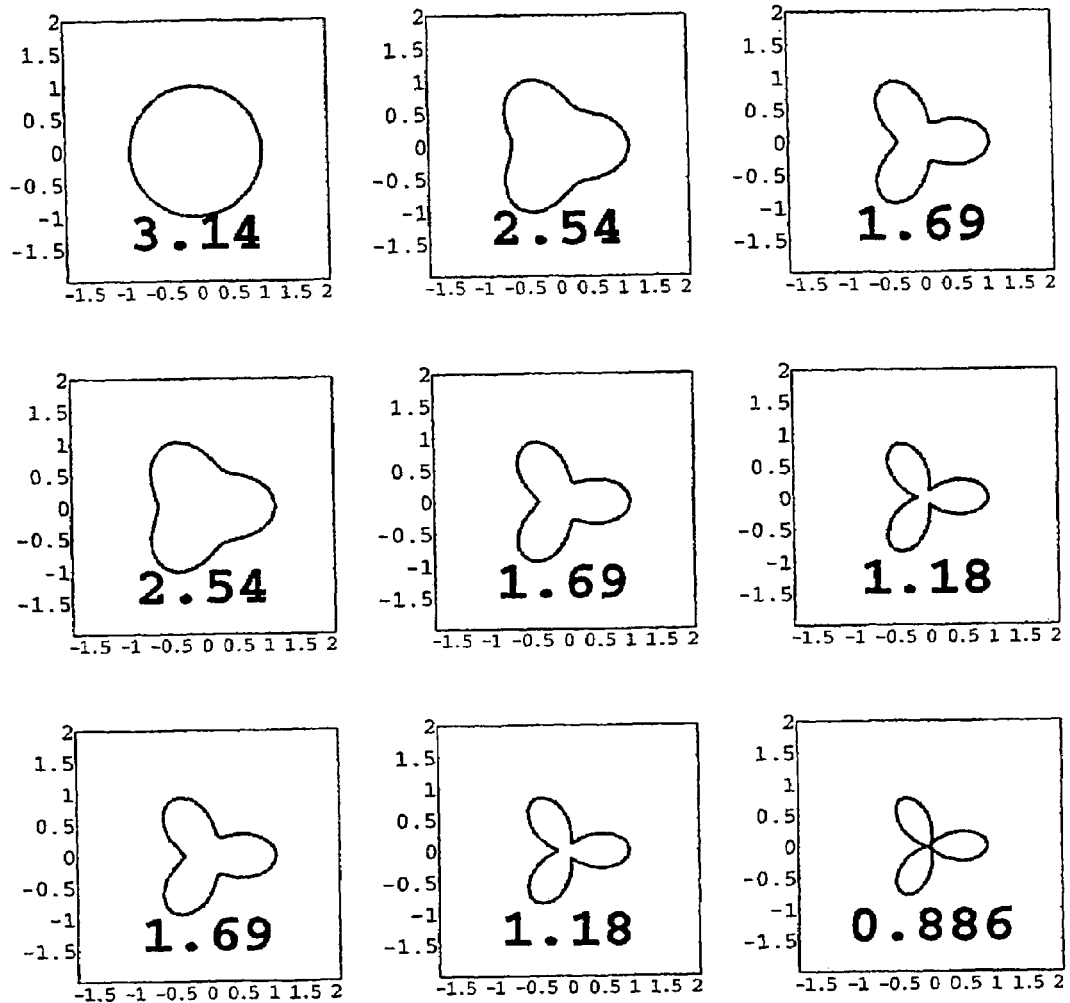
FIG. 7F shows examples of transversal cross-sections made by Fourier Series Expansions of a pressurizing chamber of which the transversal cross-sectional area decreases, while the circumpherical size remains constant.

FIGS. 7F,G,H,I,J,K,L,M shows embodiments of the chamber and a sixth embodiment of the piston, fitting to this chamber. The sixth embodiment of the piston is a variant on the one of FIGS. 7A,B,C,D,E. If the change of the area of a transversal cross-section of the piston and/or the chamber between two positions in the direction of movement is continuous but still so big that this results in leakages, it is advantageous to minimize the change of the other parameters of the cross-section. This can be illustrated by using e.g. a circular cross-section (fixed shape): the circumference of a circle is $\pi D$, while the area of a circle is $\frac{1}{4}\pi D^2$ (D=diameter of the circle). That is to say, a reduction of D will only give a linear reduction of the circumference and a quadratic reduction of the area. It is even possible to also maintain the circumference and only reduce the area. If also the shape is fixed e.g. of a circle there is a certain minimum area. Advanced numeric calculations where the shape is a parameter can be made by using the below mentioned Fourier Series expansions. The transversal cross-section of the pressurizing chamber and/or the piston can have any form, and this can be defined by at least one curve. The curve is closed and can approximately be defined by two unique modular parametrisation Fourier Series expansions, one for each co-ordinate function:

$$f(x) = \frac{c_0}{2} + \sum_{p=0}^{\infty} c_p \cos(px) + \sum_{p=0}^{\infty} d_p \sin(px)$$

where $$c_p = \frac{2}{\pi} \int_0^\pi f(x)\cos(px)\,dx$$

$$d_p = \frac{2}{\pi} \int_0^\pi f(x)\sin(px)\,dx$$

$0 \leq x \leq 2\pi$, $x \in R$ $p \geq 0$, $p \in N$ $c_p$=cos-weighted average values of f(x),
$d_p$=sin-weighted average values of f(x),
p=representing the order of trigonometrical fineness FIGS. 7F,7K show examples of said curves by using a set of different parameters in the following formulas. In these examples only two parameters have been used. If more coefficients are used, it is possible to find optimized curves which comply to other important demands as e.g. curved transitions of which the curves have a certain maximum radii and/or e.g. a maximum for the tension in the sealing portion which under given premises may not exceed a certain maximum. As an example: FIGS. 7L,7M show optimized convex curves and non-convex curves to be used for possible deformations of a bounded domain in a plane under the constraints that the length of the boundary curve is fixed, and its numerical curvature is minimized. By using a starting area, and a starting bourdary-length it is possible to count on a smallest possible curvature for a certain desired target area.

The pistons shown in a longitudinal cross-section of the chamber have been drawn mainly for the case that the boundary curve of the transversal cross-section is circular. That is to say: in the case that the chamber has transversal cross-sections according to e.g. those non-circular of FIGS. 7F,7K,7L,7M the shape of the longitudinal cross-section of the pistons may be different.

All kinds of closed curves can be described with this formula, e.g. a C-curve (see PCT/DK97/00223, FIG. 1A). One characteristic of these curves is that when a line is drawn from the mathematical pole which lies in the section plane it will intersect the curve at least one time. The curves are symmetrical towards a line in the section plane, and could also have been generated by the single Fourier Series expansion which follow. A piston or chamber will be more easy to produce when the curve of the transversal cross-section is symmetric with reference to a line which lies in the section plane through the mathematical pole. Such regular curves can approximately be defined by a single Fourier Series expansion:

$$f(x) = \frac{c_0}{2} + \sum_{p=0}^{\infty} c_p \cos(px)$$

where $$c_p = \frac{2}{\pi} \int_0^\pi f(x)\cos(px)\,dx$$

$0 \leq x \leq 2\pi$, $x \in R$ $p \geq 0$, $p \in N$ $c_p$=weighted average values of f(x),
p=representing the order of trigonometrical fineness.

When a line is drawn from the mathematical pole it will always intersect the curve only one time.

Specific formed sectors of the cross-section of the chamber and/or the piston can approximately be defined by the following formula:

$$f(x) = \frac{c_0}{2} + \sum_{p=0}^{\infty} c_p \cos(3px)$$

where $$f(x) = r_0 + a \cdot \sqrt[2m]{\sin^2\left(\frac{n}{2}\right)x}$$

$$c_p = \frac{6}{\pi} \int_0^{\frac{\pi}{3}} f(x)\cos(3px)\,dx$$

$0 \leq x \leq 2\pi$, $x \in R$ $p \geq 0$, $p \in N$ $c_p$=weighted average values of f(x),
p=representing the order of trigonometrical fineness and where this cross-section in polar co-ordinates approximately is represented by the following formula:

$$r = r_0 + a \cdot \sqrt[m]{\left|\sin\left(\frac{n}{2}\varphi\right)\right|}$$

where $r_0 \geq 0$, $a \geq 0$, $m \geq 0$, $m \in R$, $n \geq 0$, $n \in R$, $0 \leq \varphi \geq 2\pi$, and where
r=the limit of the "petals" in the circular cross section of the activating pin,
$r_0$=the radius of the circular cross section around the axis of the activating pin,
a=the scale factor for the length of the "petals",
$r_{max}=r_0+a$
m=the parameter for definition of the "petal" width
n=the parameter for definition of the number of "petals"
$\varphi$=the angle which bounds the curve.

The inlet is placed close to the end of the stroke due to the nature of the sealing portion of the piston means.

These specific chambers may be produced by injection moulding, and e.g. also by the use of so-called superplastic forming methods, where aluminium sheets are heated and pressed by air pressure either forced in a tool cavity or formed using also tool movement.

FIG. 7A shows a piston pump with a pressurizing chamber 70 in a longitudinal section with a cilindrical portion 71, a transition 72 to a continuous concave curved portion 73, another transition 74 to an almost cylindrical portion 75. The piston means 76 and 76' is shown at the beginning respectively at the end of the pump stroke. At the end of the outlet channel 77 a check valve 78 can be mounted (not shown).

FIG. 7B shows the piston means 76 comprising an elastic material 79 which gives the longitudinal section of the piston at low pressures the form of approximately a cone. The material 79 functions also as a loading means. The bottom comprises a sealing means 80, which can be folded radially—this sealing means 80 is partially also working as a loading means. The main support means comprises of stiffeners 81 and 82, of which the stiffeners 81 mainly support the sealing edge 83 of the piston means to the wall of the pressurizing chamber 70 while the other stiffeners 82 transfer the load from the sealing means 80 and the basic material 79 to the support means 84 e.g. a washer which is itself supported by the piston rod 6. The sealing means 80 is in this position of the piston means 76 still a little bit folded, so that fold 85 will load the sealing edge 83 the more the higher the pressure will be in the chamber 70. Stiffeners 82 are joined together in the top by joint 86. In this position of the piston means 70 the stiffeners 81 and 82 having angles between γ and δ with the central axis 19, where δ is approximately parallel with the central axis 19 of the pressurizing chamber 70. The angle $\phi_l$ between the surface of the piston 76 and the central axis 19.

FIG. 7C shows the piston means 76' at the end of the pump stroke. The sealing means 80 has been folded together, while the elastic material 79 has been squeezed together, resulting in the stiffeners 81,82 are directed approximately parallel with the central axis 19. The angle $\Phi_2$ between the surface of the piston means 76' and the central axis 19 is positive, but almost zero. The distance a' between the sealing edge 83 and the central axis 19 in the shown cross-section is 39% of that distance a at the beginning of the stroke. The sealing means 80'.

FIG. 7D shows a transversal cross-section E—E of the piston means 76, showing the basic elastic material 79, stiffeners 81 and 82, folds 87 of the sealing means 80. Piston rod 6.

FIG. 7E shows a transversal cross-section F—F of the piston means 76', showing the basic elastic material 79, stiffeners 81 and 82, folds 87 of the sealing means 80. Clearly shown is that the elastic material 79 is squeezed together.

FIG. 7F shows a series of transversal cross-sections of a chamber where the area decreases in certain steps, while the circumference remains constant—these are defined by two unique modular parametrisation Fourier Series expansions, one for each co-ordinate function. At the top left is the cross-section which is the start cross-section of said series. The set of parameters used is shown at the bottom of the figure. This series show decreasing area's of the transversal cross-section. The numbers in bold in the figures show the decreasing cross-sectional area's of the different shapes, with the one in the corner left up as the starting area size. The area of the shape of the cross-section bottom, right is approximately 28% of the one of the top, left.

Figure 7G:
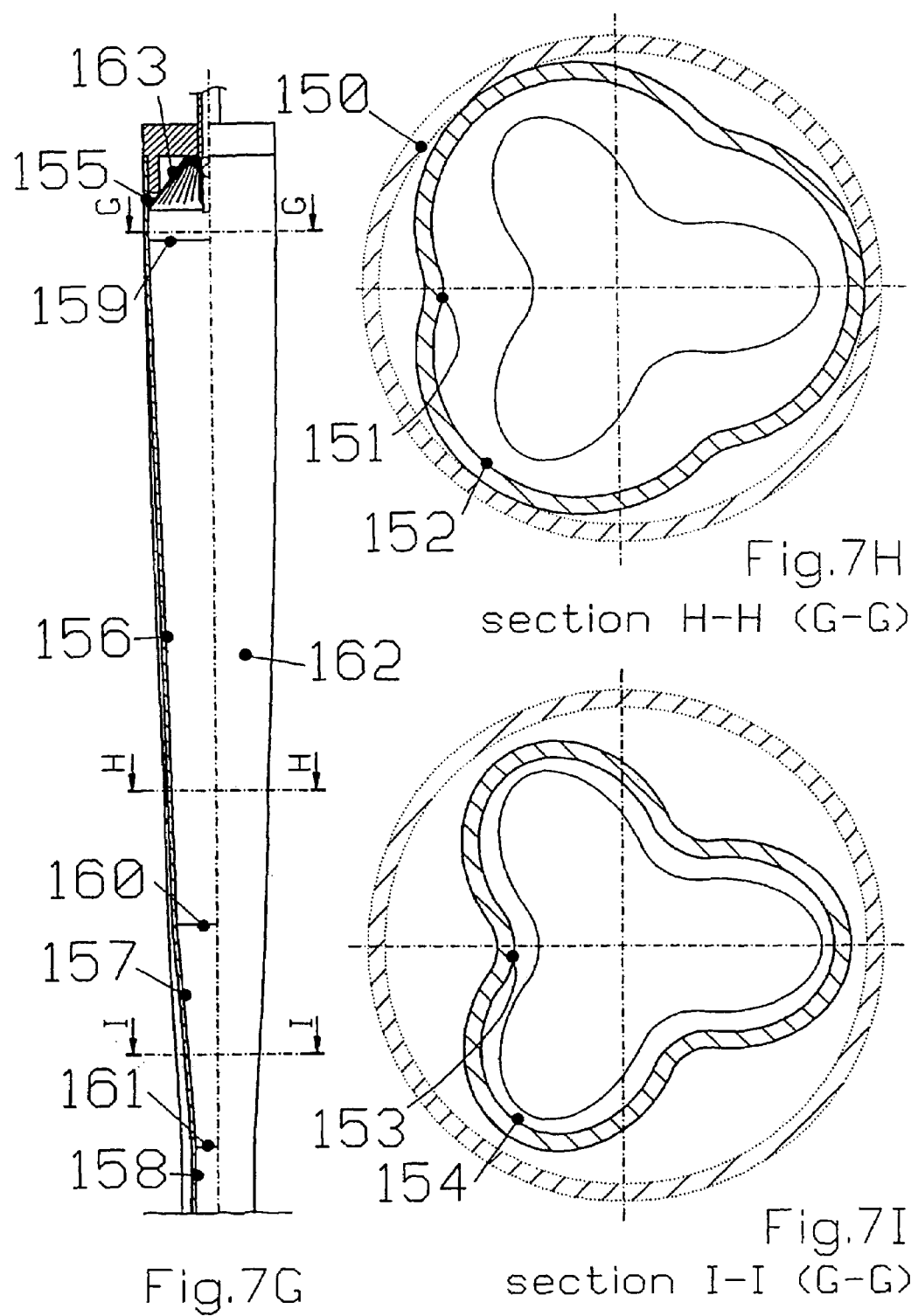
FIG. 7G shows a variant of the pressurizing chamber of FIG. 7A, which has now a longitudinal cross-section with fixed transversal cross-sections which are designed in such a way that the area decreases while the circumference of it approximately remains constant or decreases in a lower degree during a pump stroke.

FIG. 7G shows a longitudinal cross-section of the chamber 162, of which the transversal cross-sectional area changes by remaining circumference along the central axis. The piston 163. The chamber has portions of different cross-sectional area's of its transversal cross-section of wall sections 155,156,157,158. The transitions 159,160,161 between said wall sections. Shown are cross-sections G—G, H—H and I—I. Cross-section G—G has a circelround cross-section, while cross-section H—H 152 has approximately an area between 90–70% of the one of cross-section G—G.

FIG. 7H shows transversal cross-section H—H 152 of FIG. 7G and in dotted lines as a comparison cross-section G—G 150. Cross-section H—H has approximately an area between 90–70% of that of cross-section G—G. The transition 151, which is made smooth. Also shown is the smallest part of the chamber, which has approximately 50% of the cross-sectional area of cross-section G—G.

FIG. 7I shows a transversal cross-section I—I of FIG. 7G and in dotted lines as a comparison cross-section G—G. The cross-section I—I has approximately an area of 70% of that of cross-section G—G. The transition 153 is made smooth. Also shown is the smallest part of the chamber.

Figure 7J:
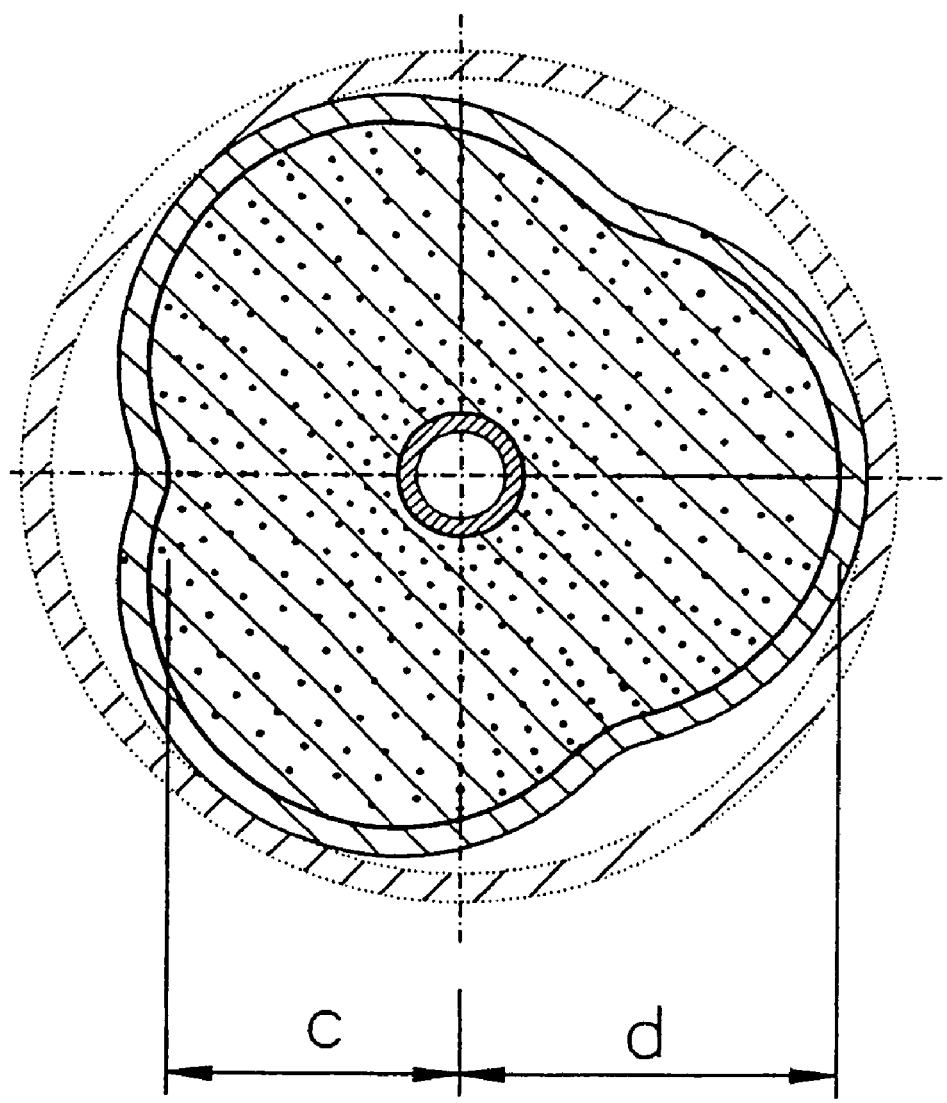
FIG. 7J shows a variant of the piston of FIG. 7B, in section H—H of FIG. 7H.
Figure 7L:
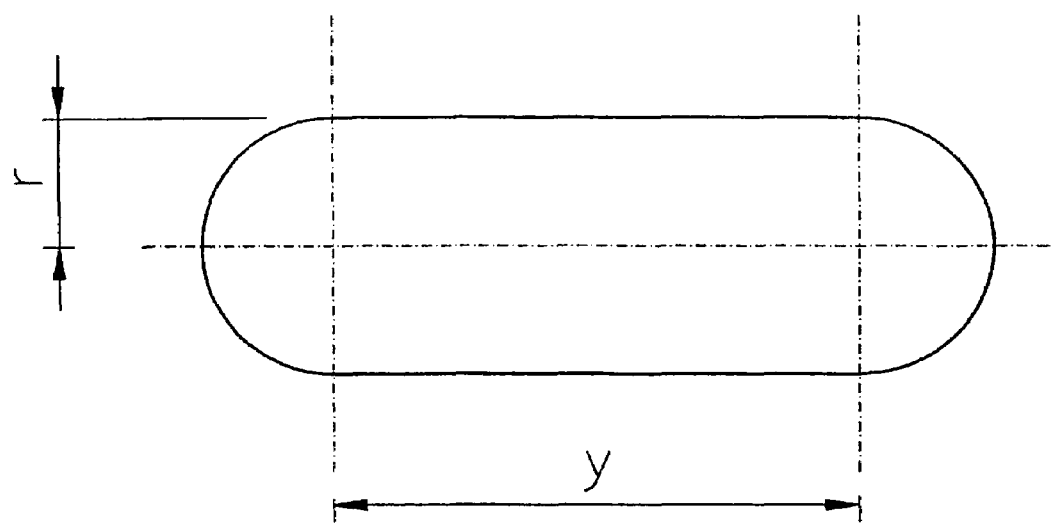
FIG. 7L shows an example of an optimized convex shape of the transversal cross section under certain contraints.
Figure 7M:
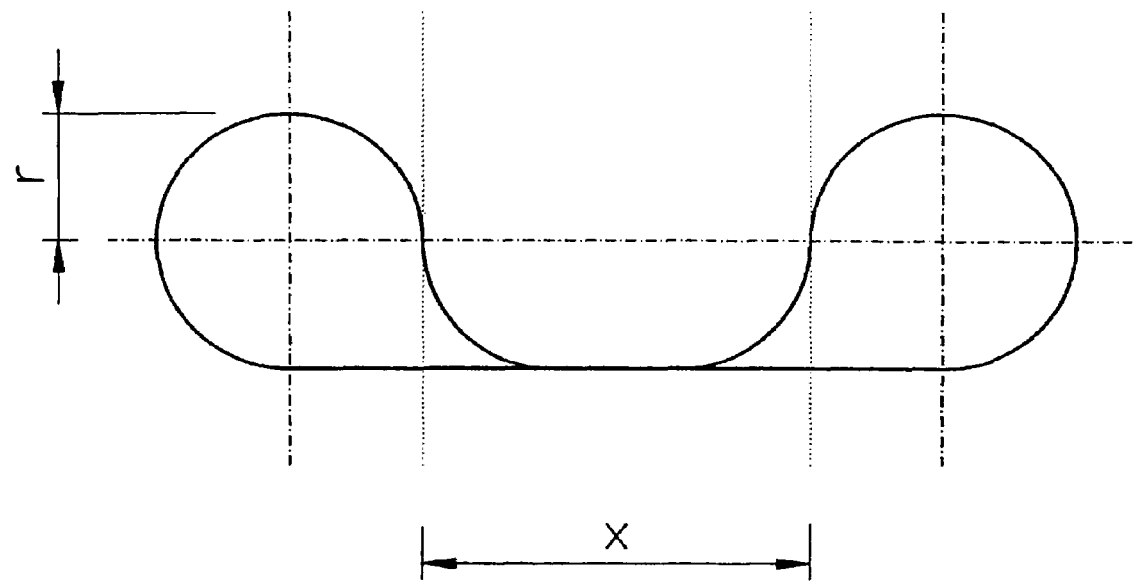
FIG. 7M shows an example of an optimized non-convex shape of the transversal cross section under certain contraints.

FIG. 7J shows a variant of the piston of FIGS. 7A–C in cross-section H—H from FIG. 7G. The piston is now made of elastic material which is also impervious so that a separate sealing means is not necessary. The distance c and d are different and by that the deformations of the piston in the same transversal cross-section H—H.

FIG. 7K shows a series of transversal cross-sections of a chamber where the area decreases in certain steps, while the circumference remains constant—these are defined by two unique modular parametrisation Fourier Series expansions, one for each co-ordinate function. At the top left is the cross-section which is the start cross-section of said series. The set of parameters used is shown at the bottom of the figure. This series show decreasing area's of the transversal cross-section, but it is also possible to increase these areas by remaining the circumference constant. The numbers in bold in the figures show the decreasing cross-sectional area's of the different shapes, with the one in the corner left up as the starting area size. The size of the cross-sectional area bottom right is approximately 49% of the starting area size left, top.

FIG. 7L shows a convex curve optimized for a certain fixed length of the boundary curve, and a smallest possible curvature. The general formula for the smallest radius of curvature, corresponding to the largest curvature of the figure shown in FIG. 7L is:

$$r = \frac{1}{2}\pi(L - \sqrt{L^2 - (4\pi A_1)})$$

The length specified by y is determined by:

$$y = \frac{1}{2}\sqrt{L^2 - 4\pi A_1}$$

where
r=smallest radius of curvature
L=boundary-length=constant
$A_1$=decreased value of the starting domain area $A_0$ As an example from FIG. 3D: Domain area $A_0=\pi(30)^2$ and boundary length $L=60\pi=188.5$ corresponding to the area and boundary length of a disk of radius 30. The length is required to be constant, but the area is decreased to the value A, to be specified. The desired final configuration should have the area $A_1=\pi(19/2)^2=283.5$. The convex curve with the smallest possible curvature of the boundary curve is now:

r=1.54

κ=1/r=0.65 x=89.4

The curve on the Figure is not on scale and the Figure shows only the principle. The curve may further be optimized by exchanging the straight lines by curves which may improve the sealing of the piston to the wall.

FIG. 7M shows a non-convex curve optimized for a certain fixed length of the boundary curve, and a smallest possible curvature. The general formula for the smallest radius of curvature, corresponding to the largest curvature of the figure shown in FIG. 7L is:

$$r = \sqrt{\frac{A_1}{\pi + 4}}$$

The length specified by x is determined by:

$$x = \frac{1}{2}L - (1+\pi)\sqrt{\frac{A_1}{\pi + 4}}$$

where
r=smallest radius of curvature
L=boundary-length=constant
$A_1$=decreased value of the starting domain area $A_0$ The non-convex curve (with obvious modifications of the string-like intermediate double curve) with the smallest possible curvature of the boundary curve:

r=6.3

κ=1/r=0.16 x=42

The curve on the Figure is not on scale and the Figure shows only the principle.

FIGS. 8A,B,C show a seventh embodiment of the pump, with a piston means which is constructed as another composite structure, comprising a compressable medium as e.g. a gaseous medium like for example air (also is possible: only a non-compressible medium as e.g. a liquid medium like water or a combination of compressable and a non-compressible medium) within a closed chamber which is constructed as e.g. a reinforced hose. It may be possible that the lining, reinforcement and cover at the pressurized side of the piston means is different from that of the non-pressurized side—here the skin can be built up as a pre-formed shaped skin, holding this shape during the pump stroke. It is also possible that the skin is made of two or more parts, which itself are pre-formed shaped, one at the non-pressurized side of the piston means, the other on the pressurized side (please see FIG. 8B part X resp. parts Y+Z). During the pump stroke the two parts hinge in each other (please see FIG. 8B XY and ZZ). The adaptation of the sealing edge to the chamber in the transversal cross-section may result in a change of the cross-section of the piston at its sealing edge, and this may result in a change of the volume inside the piston. This volume change may give a change in the pressure of the compressable medium and may result in a changend sealing force. Moreover, the compressable medium functions as a support portion as it transfers the load on the piston to the piston rod.

FIG. 8A shows a longitudinal section of the pressurizing chamber 90, comprising a contineous convex curve 91, with the piston 92 at the beginning of the pump stroke, and 92' at the end hereof. The high pressure part of the chamber 90 comprises an outlet channel 93 and an inlet channel 94 both with a check valve 95 and 96, respectively (not shown). For low pressure purposes the check valve 95 can be removed.

FIG. 8B shows piston 92 which is vulcanised directly on the piston rod 97, comprising a compressible medium 103 within a lining 99, a reinforcement 100 and a cover 101. Part X of the skin 99,100,101 is pre-shaped as it is with the parts Y and Z at the pressurized part of the piston means 92. A hinge XY is shown between part X and part Y of the skin. Part X has an average angle $\eta_1$ with the central axis 19 of the pressurized chamber 90. Part Y and Z are connected to each other and have an in-between angle $\kappa_1$, which is chosen so that the forces will be directed mainly to the piston rod. The angle λ between parts Y' and Z', and is chosen so that the higher the force in the chamber, the more this part is perpendicular to the central axis. Hinge ZZ between the half of part Z. The sealing edge 102.

Figure 8C:
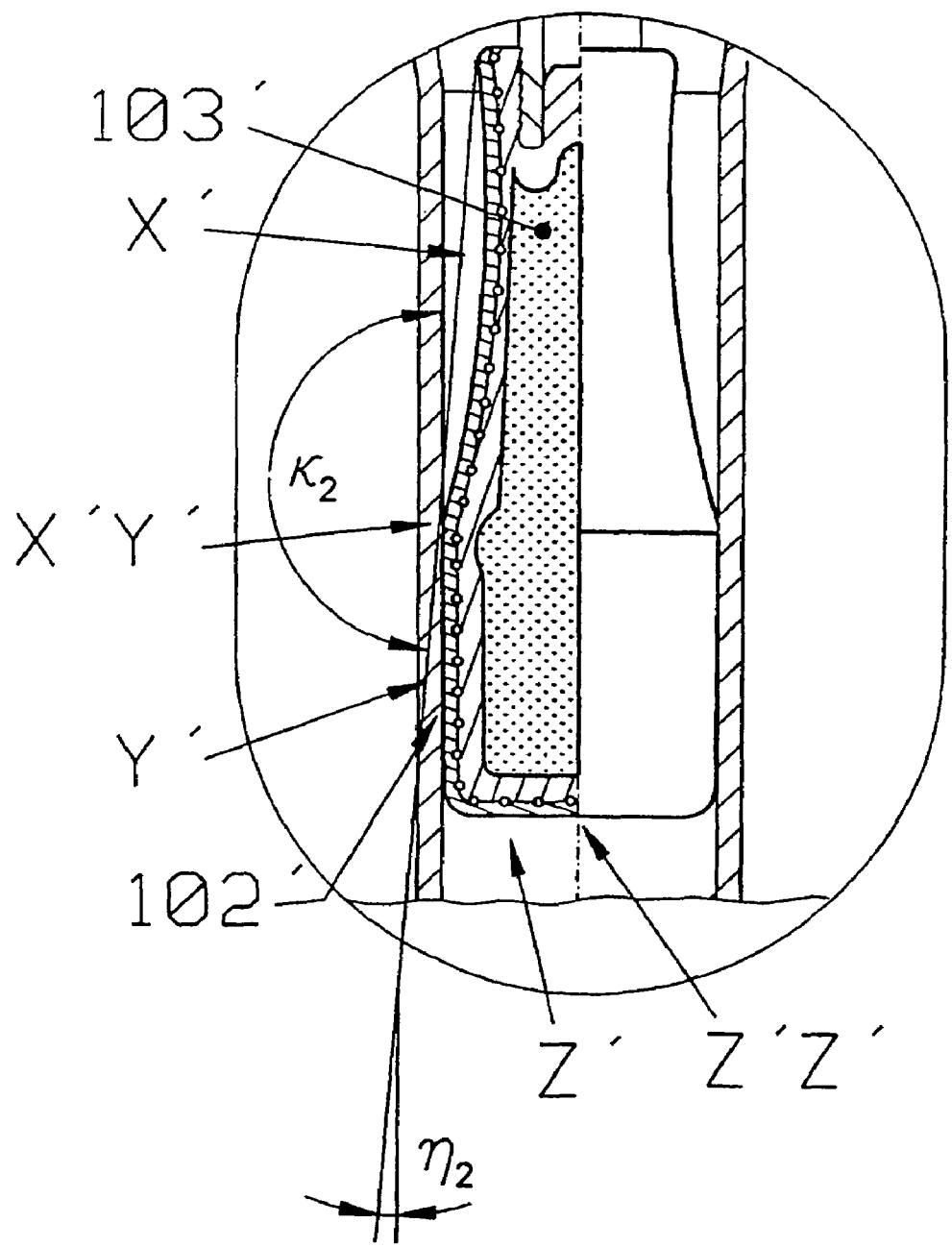
FIG. 8C shows an enlargement of the piston arrangement of FIG. 5A at the end of a stroke.

FIG. 8C shows the piston at the end of a stroke. Part X' of the skin has now an angle $\eta_2$ with the central axis, while parts X' and Y' has an in-between angle $\kappa_2$, and an approximately unchangend angle λ between Y' and Z'. The angle between the half parts of part Z is approximately zero. The distance a' between the sealing edge 102 and the cemtral axis 19 of the chamber in the shown transversal cross-section is approximately 40% of the distance a at the beginning of the stroke. The sealing edge 102' and compressed medium 103'.

FIGS. 9A,B,C,D show details of a combination of a pressurizing chamber with fixed dimensions and an eight embodiment of a piston which can change its dimensions. The piston is an inflatable body which fills a transversal cross-section of the chamber. During the stroke it may constantly change its dimensions on and nearby the sealing edge. The material may be a composite of an elastically deformable liner and a support means like e.g. fibers (e.g. glass, boron, carbon or aramid), fabric, filatement or the like. Depending on the fiber architecture and the total resulting loading on the piston—the piston is shown having a bit internal overpressure—it may result in approximately the form of a sphere or approximately an elleptical curve ('rugby ball'-like form) or any shape in between, and also other shapes. A decrease of the transversal cross-sectional area of e.g. the chamber causes a decrease in the size of the inflatable body in that direction and a 3-dimensional reduction is possible due to the fiber architecture, which is based on the 'trellis-effect' where fibers are shearing layerwise independantly from each other. The cover is also made of an elastically deformable material, suitable for the specific environmental conditions in the chamber. If the liner nor the cover is impervious it is possible to use a separate bladder inside the body, as the body contains an gaseous and/or liquid media. The support means as e.g. fibers can only give strength by themselves if the pressure inside the body is bigger than outside, because these are than in tension. This pressure condition may be preferable to obtain a suitable sealing and life time. As the pressure in the chamber can change constantly, the pressure inside the body should do the same and be a bit higher, or should always be higher at any point of the pump stroke by remaining constant. The last solution can only be used for low pressures as otherwise the piston may jam in the chamber. For higher pressures in the chamber an arrangement may be necessary so that the internal pressure vary accordingly to the variations of the pressure in the chamber+should be a bit higher. This may be achieved by several different arrangements—loading regulating means—which are based on the principles to change the volume and/or pressure of a medium inside the piston and/or to change the temperature of the medium inside—other principles are possible too, as e.g. the right choice of the material of the skin of the piston, e.g. a specific rubber type, where it is E-module which defines the deformability, or the right choice of the relative amount of the compressable part of the volume inside the inflatable body, and its compressability. Here a non-compressable medium is used inside the piston. By a change in the size of the transversal cross-sectional area at the sealing edge the volume of the piston may change, because the size of the piston in a direction of the movement is constant. This change causes the non-compressable medium to flow to or from the a spring-force operated piston inside the hollow piston rod. It is also possible that said spring-force operated piston is situated elsewhere. The combination of the pressure caused by the change of the volume of the piston and the change in the pressure due to said spring-force results in a certain sealing force. The said spring-force works as a fine-tuning for the sealing force. An improved load regulation may be achieved by exchanging the non-compressable medium by a certain combination of a compressable and a non-compressable medium, where the compressable medium works as a load regulating means. A futher improvement is when said spring is exchangend by the operation force of the piston of the chamber, as it makes the retraction of the piston easier, due to a lower sealing force and a lower friction. A temperature raise of a medium inside the piston may be achieved when specifically a medium is chosen which can quickly be warmed up.

Figure 9C:
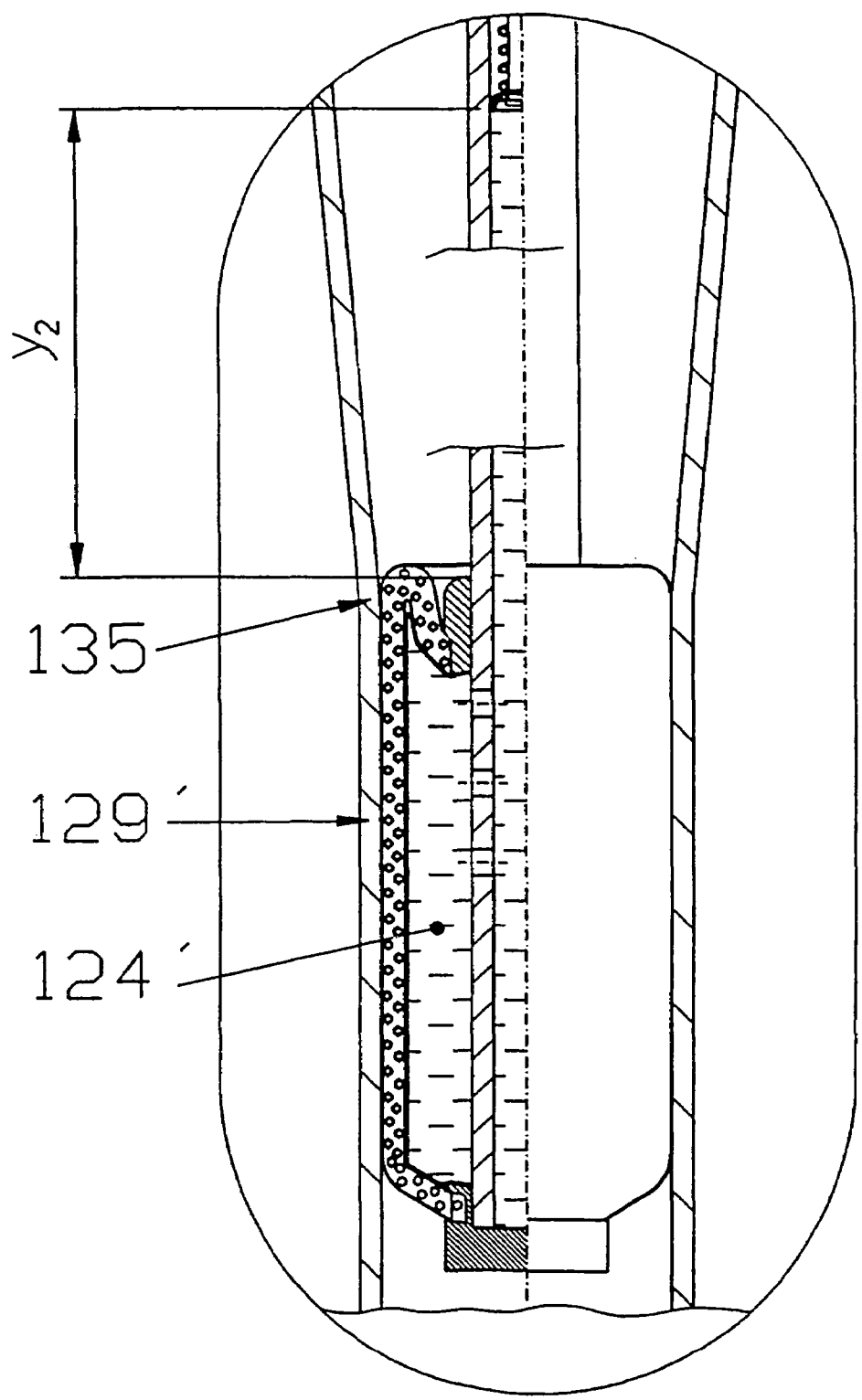
FIG. 9C shows an enlargement of the piston arrangement of FIG. 9A at the end of a stroke.

FIG. 9A shows the longitudinal cross-section of the pressurizing chamber of FIG. 8A with the piston 146 of FIG. 9B at the beginning of a stroke, and of FIG. 9C at the end 146' of a stroke.

FIG. 9B shows a piston 146 with an inflatable body having a wall comprising fibers 130 which have a pattern, so that the inflated body becomes a sphere. Cover 131 and liner 132. An impervious bladder 133 is shown inside the sphere. The sphere is directly mounted on the piston rod 120. It is locked at one end by a cap 121, and at the other end by cap 122. The hollow channel 125 of the piston rod 120 has a hole 123 in its side inside the sphere, so that the loading means being e.g. an incompressible medium 124 contained within the sphere can flow freely to and from the channel 125 of the piston rod 120. The other end of the channel 125 is closed by a movable piston 126 which is loaded by a spring 127. The spring is mounted on a piston rod 128. The spring 127 tunes the pressure in within the sphere and the sealing force. The sealing surface 129 is approximately in a line contact with the of the adjacent wall of the chamber. The fibers are only shown schematically (in all the drawings of this application).

FIG. 9C shows the piston of FIG. 9B at the end of a stroke where the area of the cross-section is smallest. The sphere has now a much bigger sealing surface 134 which is uniform with the adjacent walls of the chamber. The piston 126 has moved in relation to its position shown in FIG. 9B, as the non-compressible medium 124' has been squeezed out of the distorted sphere. In order to minimize the friction force it is possible that the cover at the sealing surface has ribs (not shown) or may have a low-frictional coating (as well as the wall of the chamber—not shown). As none of the caps 121 and 122 can move along the piston rod 120, the trellis effect only can be a part of the material surplus of the skin. The rest shows as a 'shoulder' 135 which may reduce the life time considerably, while it increases the friction as well. The sealing edge 129'. The distance a' between the sealing edge 129' and the central axis 19 of the chamber in the shown transversal cross-section is approximately 48% of the distance a of at the beginning of the stroke.

Figure 9D:
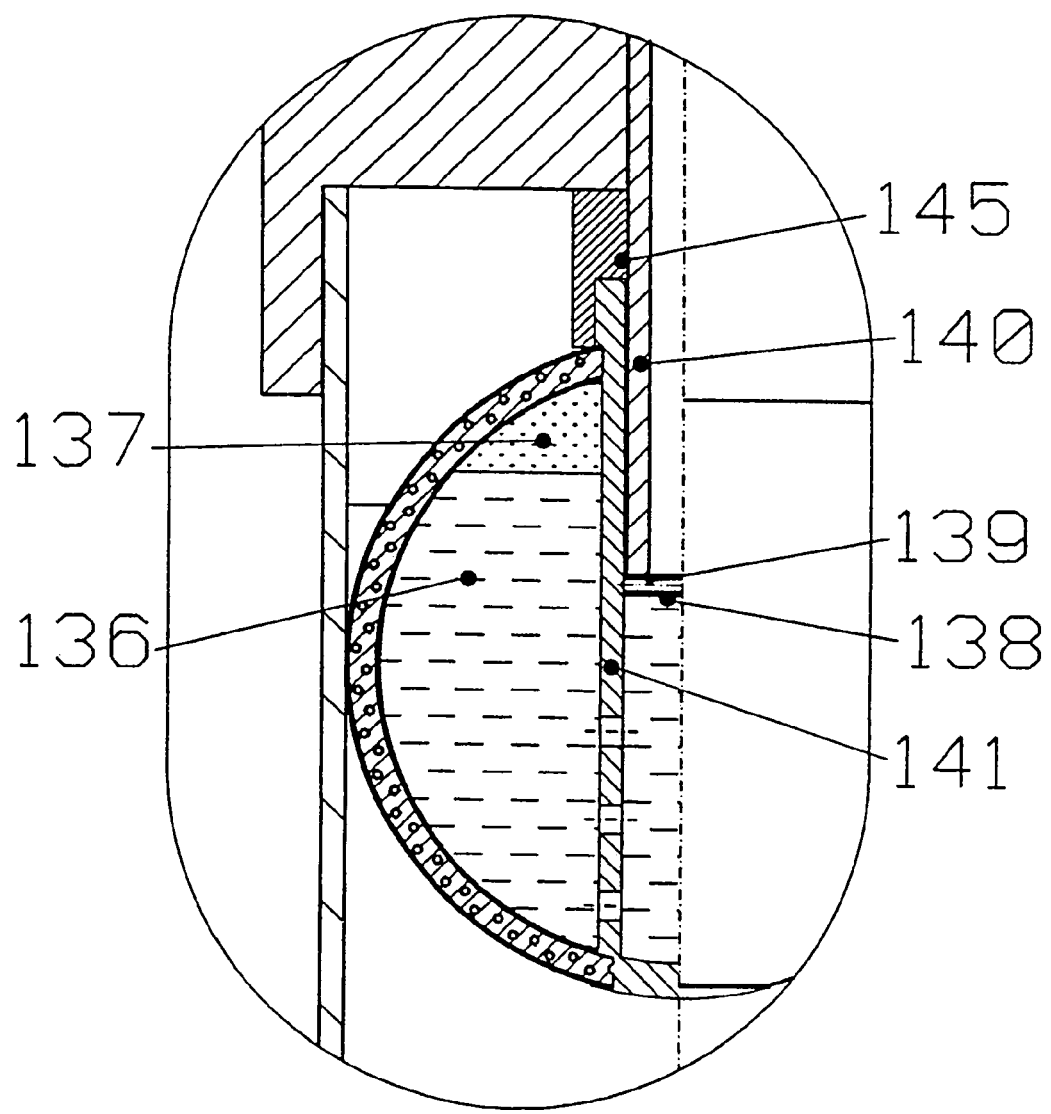
FIG. 9D shows the piston of FIG. 9B with a different tuning arrangement.

FIG. 9D shows an improved tuning of the sealing force, by having inside the sphere an incompressible medium 136 and a compressible medium 137. The pressure of the media is regulated by a piston 138 with a sealing ring 139 and a piston rod 140 which is directly connected to the operating force. The piston 138 can slide in the cylinder 141 of the sphere. The stop 145 secures the sphere on the piston rod 140.

FIGS. 10A,B,C show an improved piston where the surplus of the skin by small cross-sections of the chamber can be released which means an improved life time and less friction. This method concerns the fact that a suspension of the piston on the piston rod can translate and/or rotate over the piston rod to a position farther from the side of the piston where there is the biggest pressure in the chamber. A spring between the movable cap and a stop on the piston rod functions as another loading regulating means.

FIG. 10A shows a longitudinal cross-section of the chamber 169 of a pump according to the invention with two positions of the piston 168 respectively 168'.

FIG. 10B shows a piston with an inflatable skin with a fibers 171 in at least two layers with a fiber architecture which results in approximately a sphere—ellipsoide, when inflated. Inside the piston can be an impervious layer 172, if the skin is not tight. The media is a combination of a compressible medium 173, e.g. air, and an incompressable medium 174, e.g. water. The skin 170 is mounted at the end of the piston rod in cap 175 which is fastened to the piston rod 176. The other end of the skin is hingend fastened in a movable cap 177 which can glide over the piston rod 176. The cap 177 is pressed towards the pressurized part of the chamber 169 by a spring 178 which is squeezed at the other end towards a washer 179 which is fastened to the piston rod 176. The sealing edge 167.

Figure 10C:
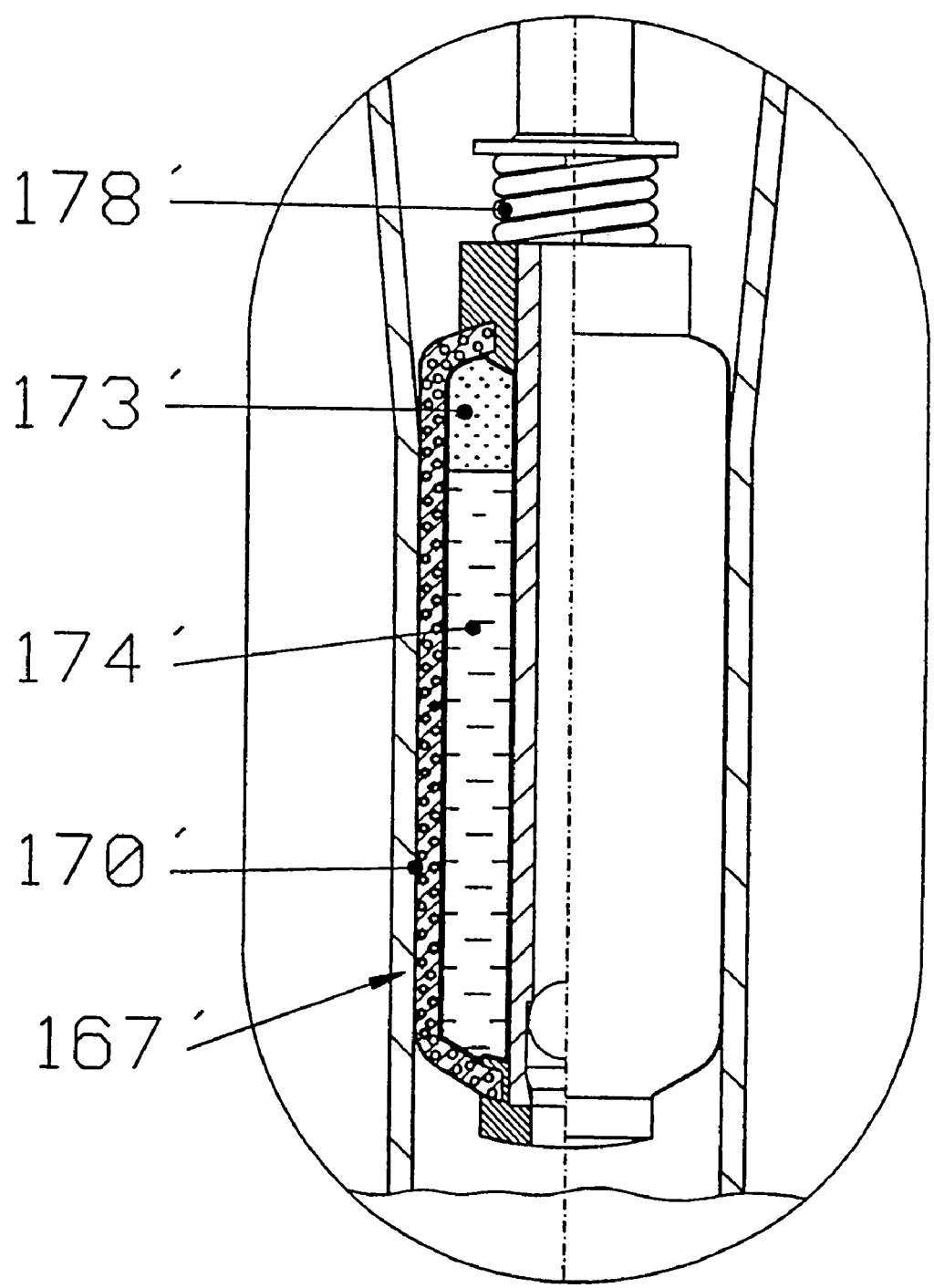
FIG. 10C shows an enlargement of the piston of FIG. 10A at the end of a stroke.

FIG. 10C shows the piston of FIG. 10B at the end of the pump stroke. The spring 178' is compressed. The same is valid for the incompressable medium 174' and the compressible medium 173'. The skin 170' is deformed, and has now a big sealing surface 167'. The distance a' between the sealing edge 167 and the central axis of the chamber is approximately 43% of the distance a at the beginning of the stroke.

Figures 11A, 11B, 11C:
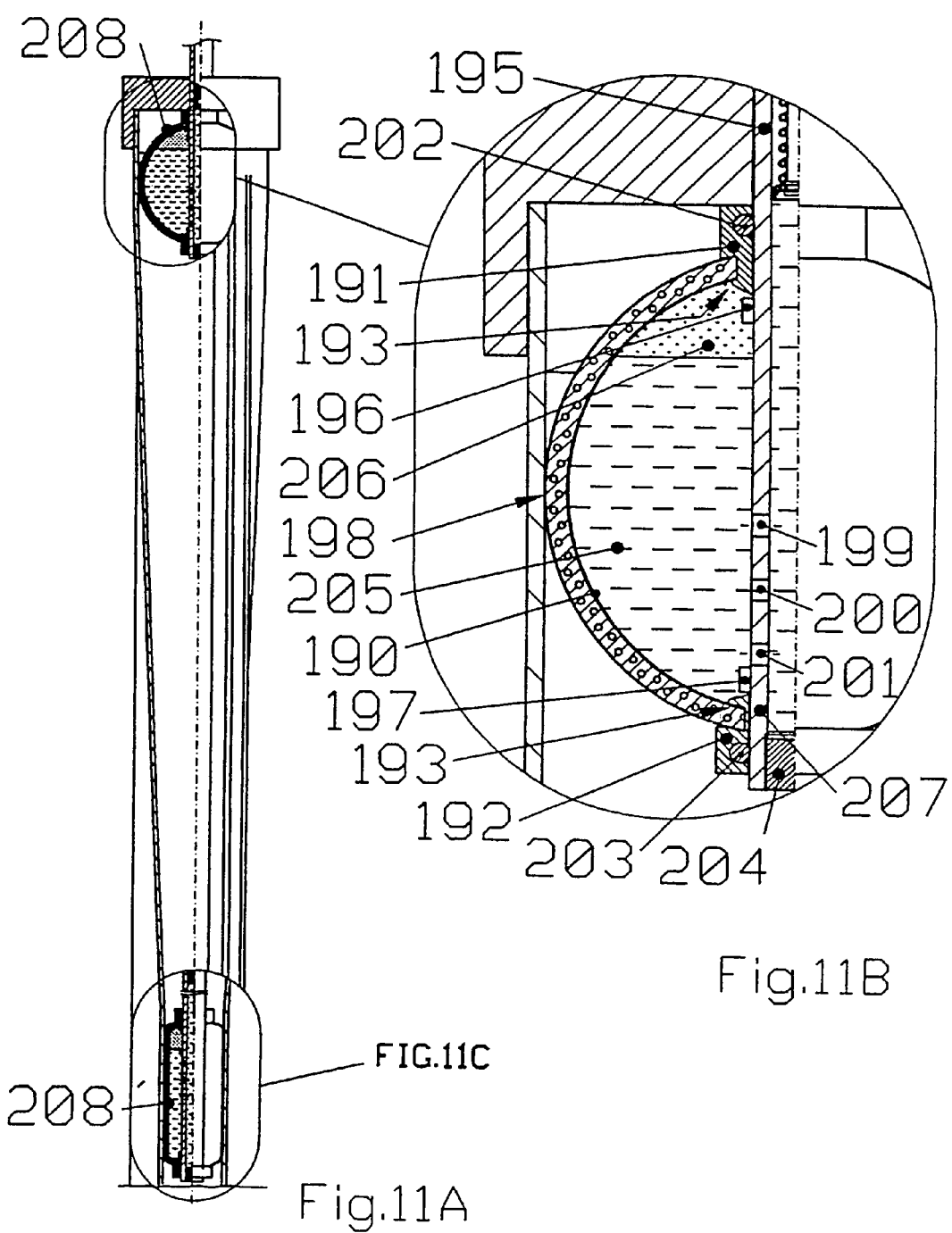
FIG. 11A shows a longitudinal cross-section of a pump with fixed different areas of the transversal cross-sections of the pressurizing chamber and an tenth embodiment of the piston with radially-axially changing dimensions during the stroke—the piston arrangement is shown at the beginning and at the end of a pump stroke.
FIG. 11B shows an enlargement of the piston of FIG. 11A at the beginning of a stroke.
FIG. 11C shows an enlargement of the piston of FIG. 11A at the end of a stroke.

FIGS. 11A,B,C show a piston which has at both of its ends in the direction of movement on the piston rod a movable cap which takes the surplus of material away. This is an improvement for a piston in a one-way piston pump, but specifically is it possible now to use the piston in a dual operating pump where any stroke, also the retraction stroke, is a pump stroke. The movement of the skin during the operation is indirectly limited due to stops on the piston rod. These are positioned so that the pressure of a medium in the chamber cannot strip the piston from the piston rod.

FIG. 11A shows a longitudinal cross-section of the chamber with an improved piston 208 at the beginning and at the end (208') of a stroke.

FIG. 11B shows a nineth embodiment of the piston 208. The skin of the sphere is comparable with the one of FIG. 10. An impervious layer 190 inside is now tightly squeezed in the cap 191 in the top and the cap 192 in the bottom. Details of said caps are not shown and all kinds of assembling methods may be used. Both caps 191,192 can translate and/or rotate over the piston rod 195. This can be done by various methods as e.g. different types of bearings which are not shown. The cap 191 in the top can only move upwards because of the existance of the stop 196 inside the piston. The cap 192 in the bottom can only move downstairs because the stop 197 prevent a movement upwards. The 'tuning' of the sealing force comprises a combination of an incompressable medium 205 and a compressible medium 206 inside the sphere, a spring-force operated piston 126 inside the piston rod 195. The media can freely flow through the wall 207 of the piston rod through holes 199, 200, 201. O-rings or the like 202, 203 in said cap in the top and in said cap in the bottom, respectively seal the caps 191,192 to the piston rod. The cap 204, showed as a screwed assembly at the end of the piston rod 195 thighthens said piston rod. Comparable stops can be positioned elsewhere on the piston rod, depending on the demanded movement of the skin.

FIG. 11C shows the piston of FIG. 11B at the end of a pump stroke. The cap 191 in the top is moved over a distance x" from the stop 196 while the bottom cap 192 is pressed against the stop 197. The compressable medium 206' and the non-compressable medium 205'.

Figures 12A, 12B, 12C:
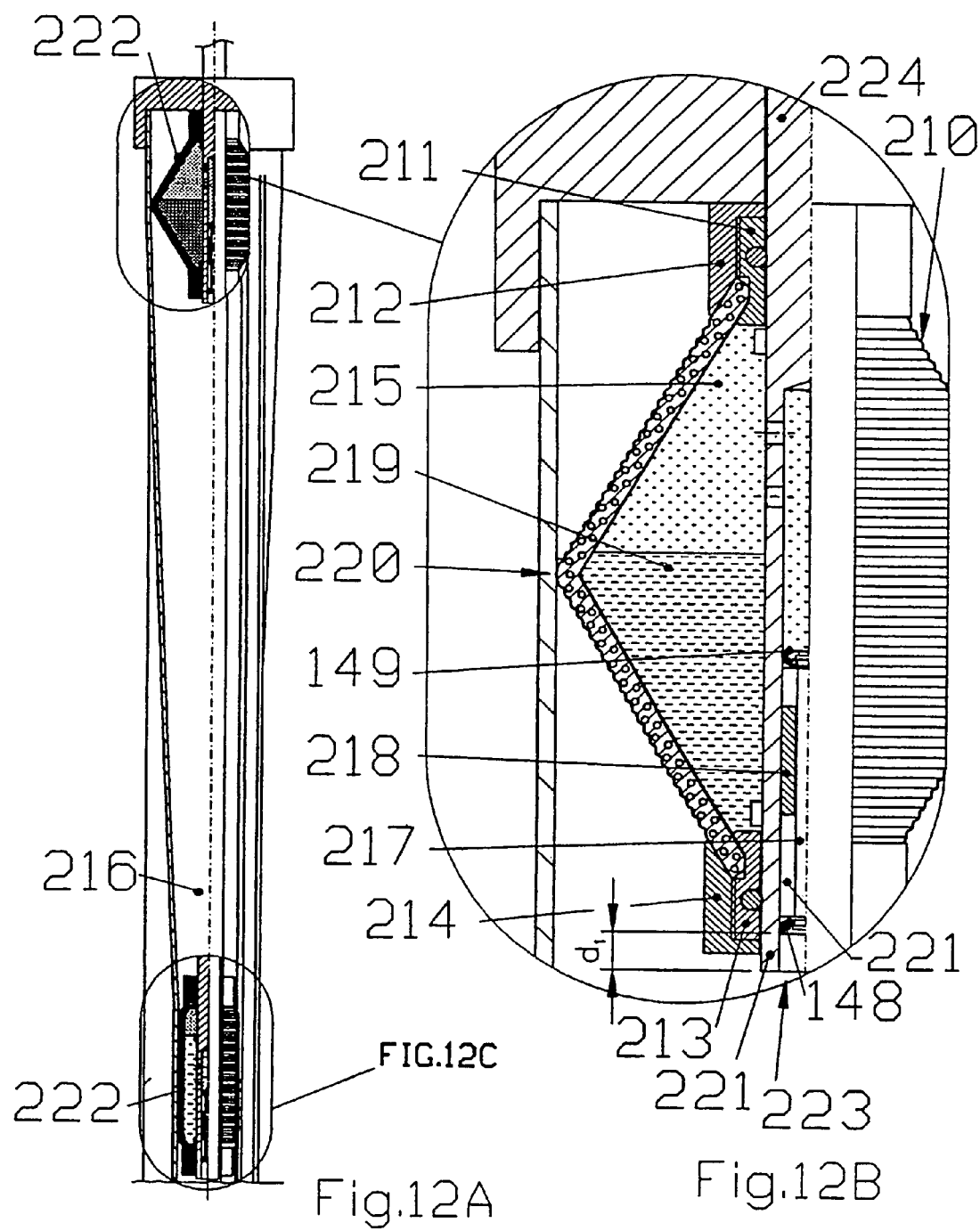
FIG. 12A shows a longitudinal cross-section of a pump with fixed different areas of the transversal cross-sections of the pressurizing chamber and an eleventh embodiment of the piston with radially-axially changing dimensions during the stroke—the piston arrangement is shown at the beginning and at the end of a pump stroke.
FIG. 12B shows an enlargement of the piston of FIG. 12A at the beginning of a stroke.
FIG. 12C shows an enlargement of the piston of FIG. 12A at the end of a stroke.

FIGS. 12A,B,C show an improved piston in relation to the earlier one's. The improvements have to do with a better tuning of the sealing force by the loading regulating means, a reduction of friction by a smaller sealing contact surface, specifically by smaller cross-sectional area's. The improved tuning concerns the fact that the pressure inside the piston now directly is influenced by the pressure in the chamber due to a pair of pistons on the same piston rod and which is by that independant of the existance of an operation force on the piston rod. This may be specifically advantageous during a stop in the pump stroke, if the operation force would change, e.g. increase, because the sealing force remains constant and no loss of sealing occurs. At the end of a pump stroke when the pressure in the chamber is decreased, the retraction will be more easy due to lower friction forces. In the case of a dual operating pump, the loading regulating means may be influenced by both sides of the piston, e.g. by a double arrangement of this load regulating means (not shown). The shown arrangement of the pistons is complying with a specification: e.g. an increase of the pressure in the chamber will give an increase of the pressure in the piston. Other specifications may result in other arrangements. The relation may be designed so that the increase can be different from a lineair relation. The construction is a pair of pistons which are connected by a piston rod. The pistons may have an equal area, different size and/or a changing area.

Due to a specific fiber architecture and the total resulting loading—it is shown with a bit internal overpressure—the shape of the piston in a longitudinal cross-section is a rhomboid figure. Two of its corners in this section work as a sealing surface, which gives a reduced contact area by smaller transversals cross-sections of the chamber. The size of the contact surface may still be increased by the existance of a ribbed outer surface of the skin of the piston. The wall of the chamber and/or the outside of the piston can have a coating as e.g. nylon or can be made of a low-friction material.

Not drawn is the possibility of a chamber which has transversal cross-sectional shapes according to e.g. those of FIG. 7F with a piston which has (in this case as an example) three seperate pistons according to e.g. FIGS. 12A–C which each seals in the first circular cross-sectional area (FIG. 7F top, left), each other and the boundary curve, while at another point of the longitudinal axis of the chamber each seal one of the three lobe-shaped parts and each other (FIG. 7F e.g. top, right), while at still another point each seal one of the three lobe-shaped parts only.

FIG. 12A shows a longitudinal cross-section of a piston chamber combination with a tenth embodiment of a piston 222 at the beginning and at the end (222') of a stroke in a chamber 216.

FIG. 12B shows a piston of which the main construction is described in FIGS. 11B and 11C. The skin comprises at the outside ribs 210. The skin and the impervious layer 190 at the inside are squeezed at the top between an inner part 211 and an outer part 212, which are screwed together. At the bottom the similar construction exists with the inner part 213 and the outer part 214. Inside the piston there is a compressable medium 215 and a non compressable medium 219. The pressure inside the piston is tuned by a piston arrangement which is directly activated by the pressure of the chamber 216. The piston 148 in the bottom which is connected to the pressurizing chamber 216 is mounted on a piston rod 217 while at the other side another piston 149 is mounted and which is connected to a medium of the piston 222. The piston rod 217 is guided by a slide bearing 218—other bearing types can also be used (not shown). The pistons on both sides of the piston rod 217 can have different diameters—it is even possible that the cylinder 221 in which these are moving, are exchanged by two chambers, which can be of a type according this invention—by that, the piston and/or pistons are also of a type according this invention. The sealing edge 220. The piston rod 224. Distance $d_1$ between the piston 148 and orifice 223.

FIG. 12C shows the piston of FIG. 12A at the end of a stroke, while there is still high pressure in the chamber 216. Sealing edge 220'. The load regulating means 148' have a different distance from the orifice 223 towards the chamber. Piston 148' and 149' are shown positioned at a larger distance than in FIG. 12B from the orifice 223: $d_2$.

FIGS. 13A,B,C show the combination of a pump with a pressurizing chamber with elastically deformable wall with different areas of the transversal cross sections and a piston with a fixed geometrical shape. Within a housing as e.g. cylinder with fixed geometrical sizes an inflatabel chamber is positioned which is inflatable by a medium (a non-compressable and/or a compressable medium). It is also possible that said housing can be avoided. The inflatable wall comprising e.g. a liner-fiber-cover composite or also added an impervious skin. The angle of the sealing surface of the piston is a bit bigger than the comparative angle of the wall of the chamber in relation to an axis parallel to the movement. This difference between said angles and the fact that the momentaneous deformations of the wall by the piston takes place a bit delayed (by having e.g. a viscose non-compressable medium in the wall of the chamber and/or the right tuning of load regulating means, which are similar to those which have been shown for the pistons) provides a sealing edge, of which its distance to the central axis of the chamber during the movement between two piston and/or chamber positions may vary. This provides a cross-sectional area change during a stroke, and by that, a designable operation force. The cross-section of the piston in the direction of the movement however may also be equal, or with a negative angle in relation to the angle of the wall of the chamber—in these cases the 'nose' of the piston ought to be rounded of. In the last mentioned cases it may be more difficult to provide a changing cross-sectional area, and by that, a designable operation force. The wall of the chamber may be equiped with all the already shown loading regulating means the one showed on FIG. 12B, and if necessary with the shape regulating means. The velocity of the piston in the chamber may have an effect on the sealing.

FIG. 13A shows piston 230 at four positions of the piston in a chamber 231. Around an inflatable wall a housing 234 with fixed geometrical sizes. Within said wall 234 a compressable medium 232 and a non-compressable medium 233. There may be a valve arrangement for inflation of the wall (not shown). The shape of the piston at the non-pressurized side is only an example to show the principle of the sealing edge. The distance between the sealing edge at the end and at the beginning of the stroke in the shown transversal cross-section is approximately 39%. The shape of the longitudinal cross-section may be diferent from the one shown.

FIG. 13B shows the piston after the beginning of a stroke. The distance from the sealing edge 235 and the central axis 236 is $z_1$. The angle $\xi$ between the piston sealing edge 235 and the central axis 236 of the chamber. The angle $v$ between the wall of the chamber and the central axis 236. The angle $v$ is shown smaller than the angle $\xi$. The sealing edge 235 arranges that the angle $v$ becomes as big as the angle $\xi$. Other embodiments of the piston are not shown.

FIG. 13C shows the piston during a stroke. The distance from the sealing edge 235 and the central axis 236 is $Z_2$—this distance is smaller than $z_2$.

FIG. 13D shows the piston almost at the end of stroke. The distance from the sealing edge 235 and the central axis 236 is $z_3$—this distance is smaller than $z_2$.

Figure 14:
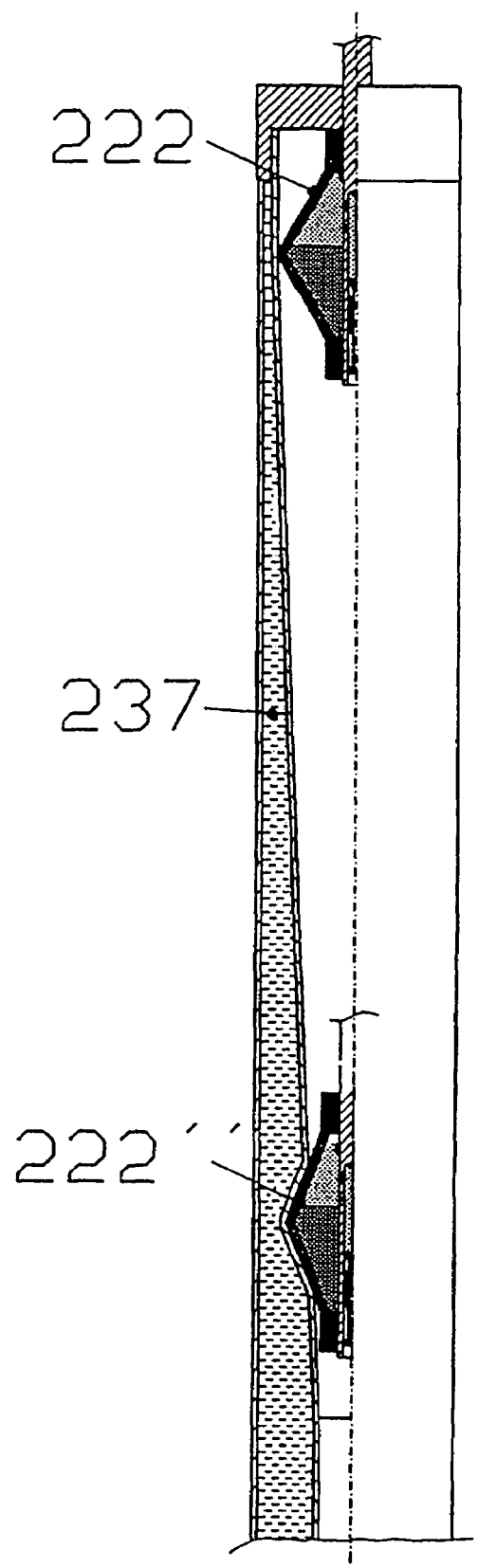
FIG. 14 shows a longitudinal cross-section of a pump with variable different areas of the transversal cross-section of the pressurizing chamber and a piston with variable geometrical sizes—the arrangement of the combination is shown at the beginning, during and at the end of the pump stroke.

FIG. 14 shows a combination of a wall of the chamber and the piston which have changeable geometrical shapes, which adapt to each other during the pump stroke, enabling a continuous sealing. Shown is the chamber of FIG. 13A now with only a non-compressable medium 237 and piston 222 at the beginning of a stroke, while the piston 222" is shown just before the end of a stroke. Also all other embodiments of the piston which can change dimensions can be used here too. The right choice of velocity of the piston and the viscosity of the medium 237 may have a positive effect on operations. The longitudinal cross-sectional shape of the chamber shown in FIG. 14 may also be different.

REFERENCE NUMBERS

A combination of a chamber and a piston, a pump, a motor, shock absorber and a transducer incorporating the combination.

| 1 | chamber (pressurizing) | FIG. | 3 | A |
|---|---|---|---|---|
| 2 | wall section | FIG. | 3 | A |
| 3 | wall section | FIG. | 3 | A |
| 4 | wall section | FIG. | 3 | A |
| 5 | wall section | FIG. | 3 | A |
| 6 | piston rod | FIG. | 3 | A |
| 7 | cap | FIG. | 3 | A |
| 8 | sealing portion | FIG. | 3 | B |
| 8' | sealing portion | FIG. | 3 | C |
| 9 | loading portion | FIG. | 3 | B |
| 9' | loading portion | FIG. | 3 | C |
| 9.1 | segment | FIG. | 3 | B |
| 9.2 | segment | FIG. | 3 | B |
| 9.3 | segment | FIG. | 3 | B |
| 10 | support portion | FIG. | 3 | B |
| 11 | locking means | FIG. | 3 | B |
| 12 | inlet | FIG. | 3 | B |
| 13 | valve | FIG. | 3 | B |
| 14 | outlet channel | FIG. | 3 | C |
| 15 | means | FIG. | 3 | C |
| 16 | transition | FIG. | 3 | A |
| 17 | transition | FIG. | 3 | A |
| 18 | transistion | FIG. | 3 | A |
| 19 | central axis | FIG. | 3 | A |
| 20 | piston | FIG. | 3 | A |
| 20' | piston | FIG. | 3 | A |
| 21 | chamber (pressurizing) | FIG. | 4 | A |
| 22 | cooling ribs | FIG. | 4 | A |
| 23 | piston rod | FIG. | 4 | A |
| 24 | cap | FIG. | 4 | A |
| 25 | sealing portion | FIG. | 4 | B |
| 25' | sealing means | FIG. | 4 | C |
| 26 | means | FIG. | 4 | B |
| 27 | part (of piston rod) | FIG. | 4 | B |
| 28 | support portion | FIG. | 4 | B |
| 29 | ring | FIG. | 4 | B |
| 30 | axis | FIG. | 4 | B |
| 31 | loading portion | FIG. | 4 | B |
| 32 | hole | FIG. | 4 | B |
| 33 | stop surface | FIG. | 4 | D |
| 34 | guiding means | FIG. | 4 | D |
| 35 | spring | FIG. | 4 | C |
| 36 | piston | FIG. | 4 | A |
| 36' | piston | FIG. | 4 | A |
| 37 | sealing edge | FIG. | 3 | B |
| 38 | sealing edge | FIG. | 4 | B |
| 38' | sealing edge | FIG. | 4 | C |
| 39 | central axis | FIG. | 5 | B |
| 40 | sealing means | FIG. | 5 | B |
| 40' | sealing means | FIG. | 5 | C |
| 41 | sealing means/O-ring | FIG. | 5 | B |
| 41' | sealing means | FIG. | 5 | C |

-continued

| | | | | |
|---|---|---|---|---|
| 42 | spring | FIG. | 5 | B |
| 43 | support means | FIG. | 5 | B |
| 43' | support means | FIG. | 5 | B |
| 44 | axis | FIG. | 5 | B |
| 45 | piston rod | FIG. | 5 | B |
| 46 | spring | FIG. | 5 | B |
| 46' | spring | FIG. | 5 | C |
| 47 | bracket | FIG. | 5 | D |
| 48 | sealing edge | FIG. | 3 | B |
| 49 | piston | FIG. | 3 | A |
| 49' | piston | FIG. | 3 | A |
| 50 | piston means | FIG. | 6 | B |
| 50' | piston means | FIG. | 6 | C |
| 51 | reinforcement | FIG. | 6 | B |
| 52 | clamp | FIG. | 6 | B |
| 53 | protrusion | FIG. | 6 | B |
| 54 | cover | FIG. | 6 | B |
| 54' | cover | FIG. | 6 | C |
| 55 | lining | FIG. | 6 | B |
| 55' | lining | FIG. | 6 | C |
| 56 | rib | FIG. | 6 | B |
| 57 | rib | FIG. | 6 | B |
| 58 | sealing edge | FIG. | 6 | B |
| 59 | piston | FIG. | 6 | A |
| 59' | piston | FIG. | 6 | A |
| 60 | chamber (pressurizing) | FIG. | 6 | A |
| 61 | wall portion | FIG. | 6 | A |
| 62 | wall portion | FIG. | 6 | A |
| 63 | wall portion | FIG. | 6 | A |
| 64 | wall portion | FIG. | 6 | A |
| 65 | wall portion | FIG. | 6 | A |
| 66 | transition | FIG. | 6 | A |
| 67 | transition | FIG. | 6 | A |
| 68 | transition | FIG. | 6 | A |
| 69 | transition | FIG. | 6 | A |
| 70 | chamber (pressurizing) | FIG. | 7 | A |
| 71 | portion (cylindrical) | FIG. | 7 | A |
| 72 | transition | FIG. | 7 | A |
| 73 | portion (concave curve) | FIG. | 7 | A |
| 74 | transition | FIG. | 7 | A |
| 75 | portion (cylindrical) | FIG. | 7 | A |
| 76 | piston | FIG. | 7 | A |
| 76' | piston | FIG. | 7 | C |
| 77 | outlet channel | FIG. | 7 | C |
| 78 | check valve | FIG. | 7 | A |
| 79 | loading means/material | FIG. | 7 | D |
| 80 | sealing means | FIG. | 7 | B |
| 80' | sealing means | FIG. | 7 | C |
| 81 | stiffener | FIG. | 7 | B |
| 82 | stiffener | FIG. | 7 | B |
| 83 | sealing edge | FIG. | 7 | B |
| 84 | support means | FIG. | 7 | B |
| 85 | fold | FIG. | 7 | B |
| 86 | joint | FIG. | 7 | B |
| 87 | folds | FIG. | 7 | C |
| 90 | chamber (pressurizing) | FIG. | 8 | A |
| 91 | portion (convex curve) | FIG. | 8 | A |
| 92 | piston | FIG. | 8 | A |
| 92' | piston | FIG. | 8 | A |
| 93 | outlet channel | FIG. | 8 | A |
| 94 | inlet channel | FIG. | 8 | A |
| 95 | check valve | FIG. | 8 | A |
| 96 | check valve | FIG. | 8 | A |
| 97 | piston rod | FIG. | 8 | B |
| 99 | lining | FIG. | 8 | B |
| 100 | reinforcement | FIG. | 8 | B |
| 101 | cover | FIG. | 8 | B |
| 102 | sealing edge | FIG. | 8 | B |
| 102' | sealing edge | FIG. | 8 | C |
| 103 | medium (compressable) | FIG. | 8 | B |
| 103' | medium (compressable) | FIG. | 8 | C |
| 110 | skin | FIG. | 5 | G |
| 110' | skin | FIG. | 5 | H |
| 111 | fibers | FIG. | 5 | G |
| 112 | sealing portion | FIG. | 5 | G |
| 113 | spring-force ring | FIG. | 5 | G |
| 114 | ring | FIG. | 5 | G |
| 115 | shape | FIG. | 5 | H |
| 117 | sealing edge | FIG. | 5 | G |
| 118 | piston | FIG. | 5 | F |
| 118' | piston | FIG. | 5 | F |
| 120 | piston rod | FIG. | 9 | B |
| 121 | cap | FIG. | 9 | B |
| 122 | cap | FIG. | 9 | B |
| 123 | hole | FIG. | 9 | B |
| 124 | medium (incompressable) | FIG. | 9 | B |
| 124' | medium (incompressable) | FIG. | 9 | C |
| 125 | enclosed space | FIG. | 9 | B |
| 126 | piston (movable) | FIG. | 9 | B |
| 127 | spring | FIG. | 9 | B |
| 128 | piston rod (**) | FIG. | 9 | B |
| 129 | sealing edge | FIG. | 9 | B |
| 130 | fibers | FIG. | 9 | B |
| 131 | cover | FIG. | 9 | B |
| 132 | liner | FIG. | 9 | B |
| 133 | bladder (impervious) | FIG. | 9 | B |
| 134 | sealing surface | FIG. | 9 | C |
| 135 | shoulder | FIG. | 9 | C |
| 136 | medium (incompressable) | FIG. | 9 | D |
| 137 | medium (compressable) | FIG. | 9 | D |
| 138 | piston | FIG. | 9 | D |
| 138' | piston | FIG. | 9 | D |
| 139 | ring (sealing) | FIG. | 9 | D |
| 140 | piston rod | FIG. | 9 | D |
| 141 | cylinder | FIG. | 9 | D |
| 143 | piston rod | FIG. | 9 | D |
| 145 | stop | FIG. | 9 | D |
| 146 | piston | FIG. | 9 | A |
| 146' | piston | FIG. | 9 | A |
| 148 | piston (movable) | FIG. | 12 | B |
| 148' | piston (movable) | FIG. | 12 | C |
| 149 | piston (movable) | FIG. | 12 | B |
| 149' | piston (movable) | FIG. | 12 | C |
| 150 | cross-section G—G | FIG. | 7 | H |
| 151 | transition | FIG. | 7 | H |
| 152 | cross-section H—H | FIG. | 7 | G |
| 153 | transition | FIG. | 7 | I |
| 154 | cross-section | FIG. | 7 | I |
| 155 | wall section | FIG. | 7 | G |
| 156 | wall section | FIG. | 7 | G |
| 157 | wall section | FIG. | 7 | G |
| 158 | wall section | FIG. | 7 | G |
| 159 | transition | FIG. | 7 | G |
| 160 | transition | FIG. | 7 | G |
| 161 | transition | FIG. | 7 | G |
| 162 | chamber | FIG. | 7 | G |
| 163 | piston | FIG. | 7 | G |
| 167 | sealing edge | FIG. | 10 | B |
| 167' | sealing edge | FIG. | 10 | B |
| 168 | piston | FIG. | 10 | A |
| 168' | piston | FIG. | 10 | A |
| 169 | chamber (pressurizing) | FIG. | 10 | A |
| 170 | skin | FIG. | 10 | B |
| 170' | skin | FIG. | 10 | C |
| 171 | fibers | FIG. | 10 | B |
| 172 | layer (impervious) | FIG. | 10 | B |
| 173 | medium (compressable) | FIG. | 10 | B |
| 173' | medium (compressable) | FIG. | 10 | C |
| 174 | medium (incompressable) | FIG. | 10 | B |
| 174' | medium (incompressable) | FIG. | 10 | C |
| 175 | cap | FIG. | 10 | B |
| 176 | piston rod | FIG. | 10 | B |
| 177 | cap (movable) | FIG. | 10 | B |
| 178 | spring | FIG. | 10 | B |
| 178' | spring | FIG. | 10 | C |
| 179 | stop | FIG. | 10 | B |
| 180 | piston rod | FIG. | 6 | E |
| 181 | cover | FIG. | 6 | E |
| 182 | protrusion | FIG. | 6 | E |
| 183 | spring-force member | FIG. | 6 | E |
| 184 | support means/fibers | FIG. | 6 | E |
| 185 | liner | FIG. | 6 | E |
| 186 | channels | FIG. | 6 | E |
| 187 | top (of the cone) | FIG. | 6 | E |
| 188 | sealing edge | FIG. | 6 | E |
| 189 | piston | FIG. | 6 | D |
| 189' | piston | FIG. | 6 | D |
| 190 | layer (impervious) | FIG. | 11 | B |

-continued

Figure 11C:
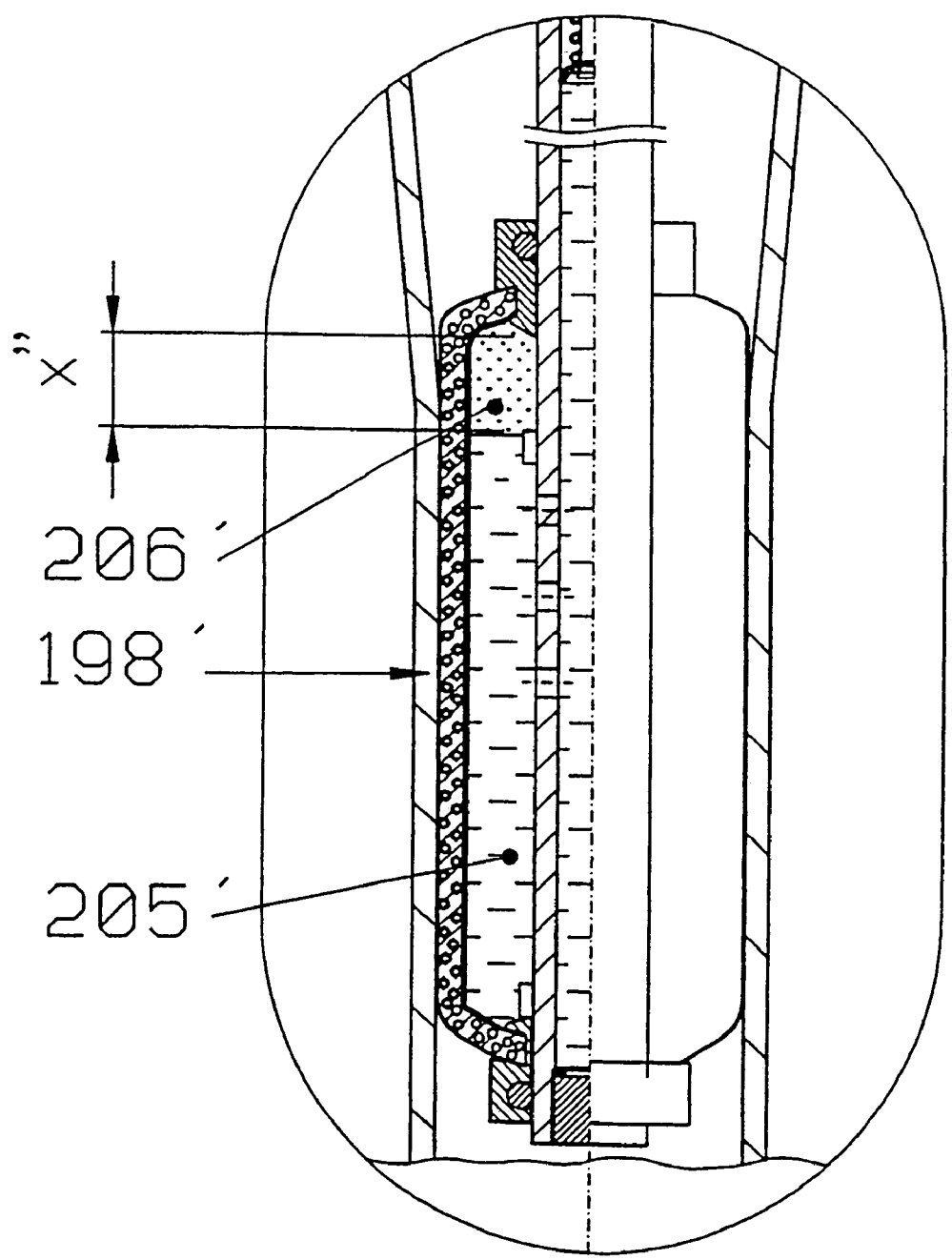
Figure 12C:
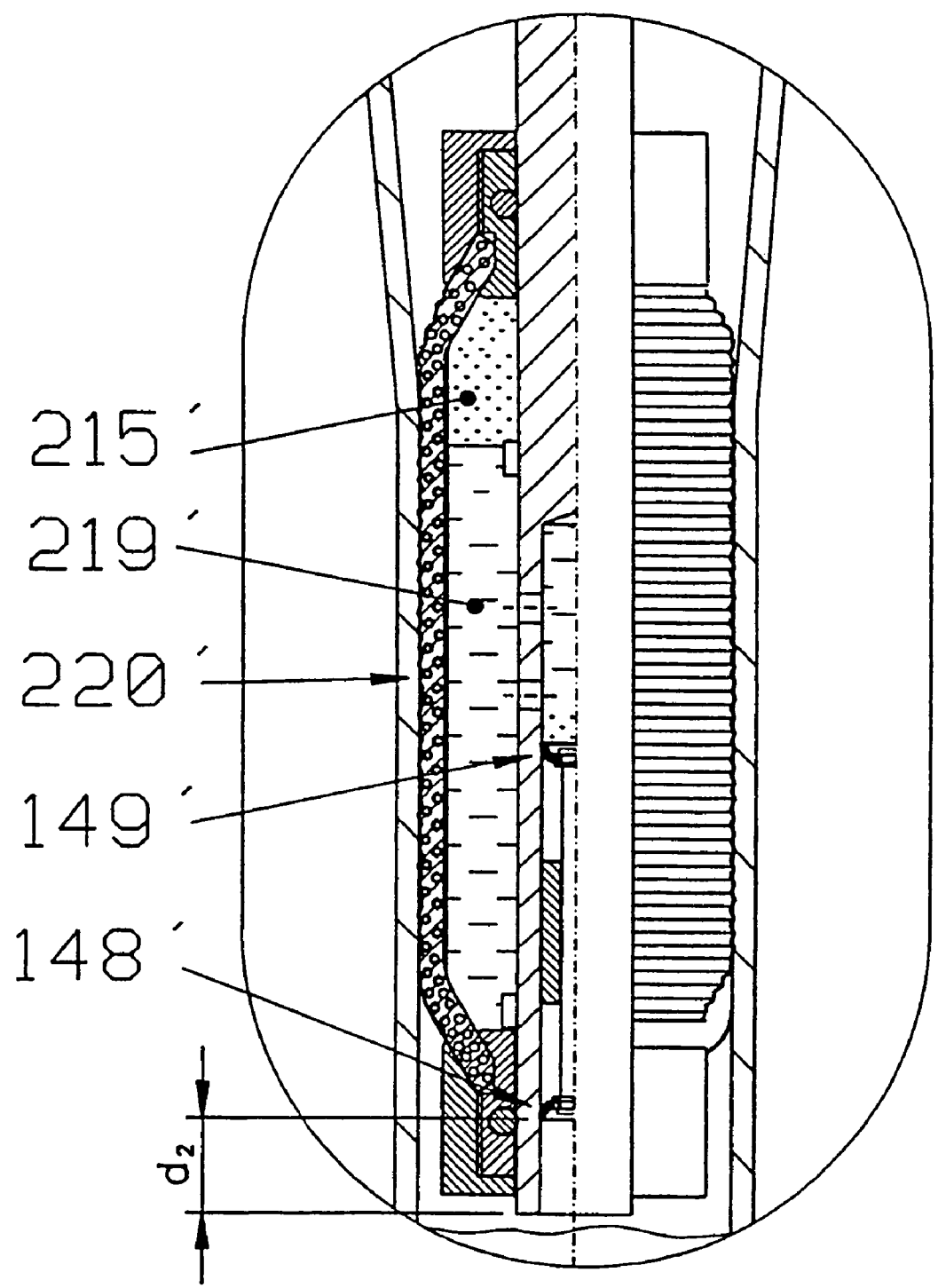

| | | | | |
|---|---|---|---|---|
| 191 | cap (movable) | FIG. 11 | B |
| 192 | cap (movable) | FIG. 11 | B |
| 193 | edge (tightly squeezed) | FIG. 11 | B |
| 194 | edge (tightly squeezed) | FIG. 11 | B |
| 195 | piston rod | FIG. 11 | B |
| 196 | stop | FIG. 11 | B |
| 197 | stop | FIG. 11 | B |
| 198' | sealing edge | FIG. 11 | C |
| 199 | hole | FIG. 11 | B |
| 200 | hole | FIG. 11 | B |
| 201 | hole | FIG. 11 | B |
| 202 | O-ring | FIG. 11 | B |
| 203 | O-ring | FIG. 11 | B |
| 204 | cap (not movable) | FIG. 11 | B |
| 205 | medium (non-compressable) | FIG. 11 | B |
| 206 | medium (compressable) | FIG. 11 | B |
| 207 | wall | FIG. 11 | B |
| 208 | piston | FIG. 11 | A |
| 208' | piston | FIG. 11 | A |
| 209 | layer (impervious) | FIG. 6 | E |
| 210 | rib | FIG. 12 | B |
| 211 | part (inner) | FIG. 12 | B |
| 212 | part (outer) | FIG. 12 | B |
| 213 | part (inner) | FIG. 12 | B |
| 214 | part (outer) | FIG. 12 | B |
| 215 | medium (compressable) | FIG. 12 | B |
| 215' | medium (compressable) | FIG. 12 | C |
| 216 | chamber | FIG. 12 | A |
| 217 | piston rod (**) | FIG. 12 | B |
| 218 | bearing (slide) | FIG. 12 | B |
| 219 | medium (non-compressable) | FIG. 12 | B |
| 219 | medium (non-compressable) | FIG. 12 | C |
| 220 | sealing edge | FIG. 12 | B |
| 220' | sealing edge | FIG. 12 | C |
| 221 | cylinder | FIG. 12 | B |
| 222 | piston | FIG. 12 | A |
| 222' | piston | FIG. 12 | A |
| 223 | orifice | FIG. 12 | B |
| 224 | piston rod | FIG. | |
| 230 | piston | FIG. 13 | A |
| 231 | chamber | FIG. 13 | A |
| 232 | medium (compressable) | FIG. 13 | A |
| 233 | medium (non-compressable) | FIG. 13 | A |
| 234 | housing | FIG. 13 | A |
| 235 | sealing edge | FIG. 13 | A |
| 236 | central axis | FIG. 13 | A |
| 237 | medium (non-compressable) | FIG. 14 | |
| 238 | wall | FIG. 13 | A |
| X | part (of skin) | FIG. 8 | B |
| X' | part | FIG. 8 | C |
| Y | part (of skin) | FIG. 8 | B |
| Y' | part | FIG. 8 | C |
| Z | part (of skin) | FIG. 8 | B |
| Z' | part | FIG. 8 | C |
| XY | hinge | FIG. 8 | B |
| X'Y' | hinge | FIG. 8 | C |
| ZZ | hinge | FIG. 8 | B |
| Z'Z' | hinge | FIG. 8 | C |
| $\alpha_1$ | angle | FIG. 3 | B |
| $\alpha_2$ | angle | FIG. 3 | C |
| $\beta_1$ | angle | FIG. 5 | B |
| $\beta_2$ | angle | FIG. 5 | C |
| $\epsilon_1$ | angle | FIG. 6 | E |
| $\epsilon_2$ | angle | FIG. 6 | F |
| $\delta$ | angle | FIG. 7 | B |
| $\gamma$ | angle | FIG. 7 | B |
| $\lambda$ | angle | FIG. 8 | B |
| $\kappa_1$ | angle | FIG. 8 | B |
| $\kappa_2$ | angle | FIG. 8 | C |
| $\eta_1$ | angle | FIG. 8 | B |
| $\eta_2$ | angle | FIG. 8 | C |
| $\xi$ | angle | FIG. 13 | B |
| $\nu$ | angle | FIG. 13 | B |
| a | distance | FIG. 3 | B |
| a' | distance | FIG. 3 | C |
| x | length | FIG. 7 | L, M |
| x" | distance | FIG. 11 | C |
| y | length | FIG. 7 | L, M |
| $y_1$ | distance | FIG. 9 | B |
| $y_2$ | distance | FIG. 9 | C |
| $z_1$ | distance | FIG. 13 | B |
| $z_2$ | distance | FIG. 13 | C |
| $z_3$ | distance | FIG. 13 | D |
| $d_1$ | distance | FIG. 12 | B |
| $d_2$ | distance | FIG. 12 | C |
| r | radius | FIG. 7 | L, M |
| L | boundary length | FIG. 7 | L, M |

What is claimed is:

1. A piston-chamber combination comprising an elongate chamber which is bounded by an inner chamber wall and comprising a piston in said chamber to be sealingly movable relative to said chamber at least between first and second longitudinal positions of said chamber,
   said chamber having cross-sections of different cross-sectional areas at the first and second longitudinal positions of said chamber and at least substantially continuously differing cross-sectional areas at intermediate longitudinal positions between the first and second longitudinal positions thereof, the cross-sectional area at the first longitudinal position being larger than the cross-sectional area at the second longitudinal position,
   said piston including a piston body and sealing means supported by the piston body for sealing on said inner chamber wall, the piston body being designed to adapt itself and said sealing means to said different cross-sectional areas of said chamber during the relative movements of said piston from the first longitudinal position through said intermediate longitudinal positions to the second longitudinal position of said chamber,
   an elastically deformable material being adapted to adapt itself to the different cross-sectional areas of the chamber between the first and second longitudinal positions thereof, and
   a coiled flat spring having a central axis at least substantially along the longitudinal axis of the chamber, the spring being positioned adjacently to the elastically deformable material so as to support the elastically deformable material in the longitudinal direction.

2. A combination according to claim 1, wherein the piston further comprises a number of flat supporting means positioned between the elastically deformable material and the spring, the supporting means being rotatable along an interface between the spring and elastically deformable material.

3. A combination according to claim 2, wherein the supporting means are adapted to rotate from the first position to a second position wherein, in the first position, an outer boundary thereof may be comprised within the cross-sectional area of the chamber in the first longitudinal position thereof and wherein, in the second position, an outer boundary thereof may be comprised within the cross-sectional area of the chamber in the second longitudinal position thereof.

* * * * *